US007973960B2

(12) United States Patent
Furuta et al.

(10) Patent No.: US 7,973,960 B2
(45) Date of Patent: *Jul. 5, 2011

(54) DOCUMENT PROCESSING SYSTEM

(75) Inventors: Toshiyuki Furuta, Kanagawa (JP);
Tomohiko Beppu, Kanagawa (JP);
Naoki Kozuka, Kanagawa (JP); Satoshi Suga, Kanagawa (JP); Sadao Takahashi, Kanagawa (JP); Yasuhiro Sato, Kanagawa (JP); Takashi Ohkuma, Kanagawa (JP); Yasuhiro Ono, Kanagawa (JP); Hirofumi Horikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 183 days.

This patent is subject to a terminal disclaimer.

(21) Appl. No.: 12/353,800

(22) Filed: Jan. 14, 2009

(65) Prior Publication Data

US 2009/0190168 A1 Jul. 30, 2009

Related U.S. Application Data

(63) Continuation of application No. 10/891,364, filed on Jul. 15, 2004, now Pat. No. 7,489,415.

(30) Foreign Application Priority Data

Jul. 16, 2003 (JP) ................................. 2003-197851
Sep. 26, 2003 (JP) ................................. 2003-336055
May 26, 2004 (JP) ................................. 2004-156241

(51) Int. Cl.
*G06F 15/00* (2006.01)
*G06F 12/00* (2006.01)

(52) U.S. Cl. ...................................... 358/1.15; 235/181

(58) Field of Classification Search ................. 358/1.15, 358/1.14, 1.13, 1.16, 462; 235/181, 463, 235/436, 380, 487, 462.04; 382/162, 260, 382/173; 707/200, E17.01; 706/16, 23, 25; 345/173, 177
See application file for complete search history.

(56) References Cited

U.S. PATENT DOCUMENTS 5,057,925 A 10/1991 Tsutsui et al.
(Continued)

FOREIGN PATENT DOCUMENTS

JP 06-309481 11/1994
(Continued)

OTHER PUBLICATIONS

U.S. Appl. No. 07/971,476, filed Nov. 4, 1992, Furuta, et al.
(Continued)

*Primary Examiner* — Saeid Ebrahimi Dehkordy
(74) *Attorney, Agent, or Firm* — Oblon, Spivak, McClelland, Maier & Neustadt, L.L.P.

(57) ABSTRACT

A document processing system is disclosed that is capable of processing both fixed-format and unfixed-format hand written paper documents. The document processing system includes an encoding unit that encodes a sheet ID for identifying a hand written first document on a sheet to generate a coded sheet ID; a decoding unit that decodes the coded sheet ID; a document-sheet ID association unit that associates the sheet ID with a document ID assigned to a computerized second document; a printing unit that acquires the sheet ID and prints the coded sheet ID on the first document; a sheet ID management unit that manages the sheet ID; an information acquisition unit that acquires the sheet ID decoded by the decoding unit, and hand-written data from the first document on which the coded sheet ID is printed; and a process-sheet ID association unit that associates the sheet ID with a process ID of a process for processing the hand-written data acquired by the information acquisition unit.

32 Claims, 60 Drawing Sheets

U.S. PATENT DOCUMENTS

| | | | |
|---|---|---|---|
| 5,131,073 A | 7/1992 | Furuta et al. | |
| 5,167,006 A | 11/1992 | Furuta et al. | |
| 5,185,851 A | 2/1993 | Furuta et al. | |
| 5,191,637 A | 3/1993 | Furuta et al. | |
| 5,259,064 A | 11/1993 | Furuta et al. | |
| 5,274,747 A | 12/1993 | Furuta et al. | |
| 5,283,855 A | 2/1994 | Motomura et al. | |
| 5,324,991 A | 6/1994 | Furuta et al. | |
| 5,327,522 A | 7/1994 | Furuta et al. | |
| 5,333,241 A | 7/1994 | Furuta et al. | |
| 5,349,646 A | 9/1994 | Furuta et al. | |
| 5,481,646 A | 1/1996 | Furuta et al. | |
| 5,504,838 A | 4/1996 | Furuta et al. | |
| 5,508,477 A | 4/1996 | Kato et al. | |
| 5,519,813 A | 5/1996 | Furuta et al. | |
| 5,581,662 A | 12/1996 | Furuta et al. | |
| 5,588,090 A | 12/1996 | Furuta et al. | |
| 5,619,617 A | 4/1997 | Furuta et al. | |
| 5,815,205 A | 9/1998 | Hashimoto et al. | |
| 5,825,937 A | 10/1998 | Ohuchi et al. | |
| 5,902,968 A | 5/1999 | Sato et al. | |
| 5,911,004 A | 6/1999 | Ohuchi et al. | |
| 5,981,884 A | 11/1999 | Sato et al. | |
| 6,005,547 A | 12/1999 | Newman et al. | |
| 6,084,577 A | 7/2000 | Sato et al. | |
| 6,229,102 B1 | 5/2001 | Sato et al. | |
| 6,418,102 B1 | 7/2002 | Suga | |
| 6,432,518 B1 | 8/2002 | Torii et al. | |
| 6,518,960 B2 | 2/2003 | Omura et al. | |
| 6,634,559 B2 | 10/2003 | Shioda et al. | |
| 6,651,894 B2 | 11/2003 | Nimura et al. | |
| 6,677,273 B2 | 1/2004 | Torii et al. | |
| 6,686,954 B1 | 2/2004 | Kitaguchi et al. | |
| 6,744,916 B1 * | 6/2004 | Takahashi | 382/162 |
| 6,781,622 B1 | 8/2004 | Sato et al. | |
| 6,898,329 B1 | 5/2005 | Takahashi | |
| 6,930,708 B1 | 8/2005 | Sato et al. | |
| 6,935,565 B2 | 8/2005 | Nimura et al. | |
| 6,940,542 B2 | 9/2005 | Kitazawa et al. | |
| 6,948,654 B2 | 9/2005 | Shioda et al. | |
| 6,959,866 B2 | 11/2005 | Takahashi et al. | |
| 6,974,917 B2 | 12/2005 | Hattori et al. | |
| 6,992,700 B1 | 1/2006 | Sato et al. | |
| 7,001,024 B2 | 2/2006 | Kitaguchi et al. | |
| 7,012,719 B1 | 3/2006 | Takahashi | |
| 7,489,415 B2 * | 2/2009 | Furuta et al. | 358/1.15 |
| 7,505,160 B2 | 3/2009 | Furuta et al. | |
| 2002/0065853 A1 | 5/2002 | Takahashi et al. | |
| 2008/0198405 A1 | 8/2008 | Honda et al. | |
| 2008/0225334 A1 | 9/2008 | Hamada et al. | |

FOREIGN PATENT DOCUMENTS

| | | |
|---|---|---|
| JP | 09-016753 | 1/1997 |
| JP | 9-134442 | 5/1997 |
| JP | 10-63820 A | 3/1998 |
| JP | 10-063870 | 3/1998 |
| JP | 11-96166 A | 4/1999 |
| JP | 3219251 B2 | 8/2001 |
| JP | 2002-183520 A | 6/2002 |
| JP | 2002-215768 A | 8/2002 |
| JP | 2002-222075 A | 8/2002 |
| JP | 2002-281179 A | 9/2002 |
| JP | 2002-312478 A | 10/2002 |
| JP | 2003-196357 | 7/2003 |

OTHER PUBLICATIONS

U.S. Appl. No. 08/310,078, filed Sep. 22, 1994, Ohuchi, et al.
U.S. Appl. No. 08/616,775, filed Mar. 15, 1996, Ohuchi.
U.S. Appl. No. 08/147,488, filed Nov. 5, 1993, Fujisawa, et al.

* cited by examiner

FIG.11A

<REGISTRATION FORM>

NAME
MEMBERSHIP NO.
REQUEST
☐ RESIGNATION    ☐ DELETE
COMMENT

FIG.11B

<REGISTRATION FORM>

NAME            YAMATA TAROU
MEMBERSHIP NO.  56 – 381
REQUEST
☐ RESIGNATION   ☑ DELETE
COMMENT
RESIGN DUE TO MOVING

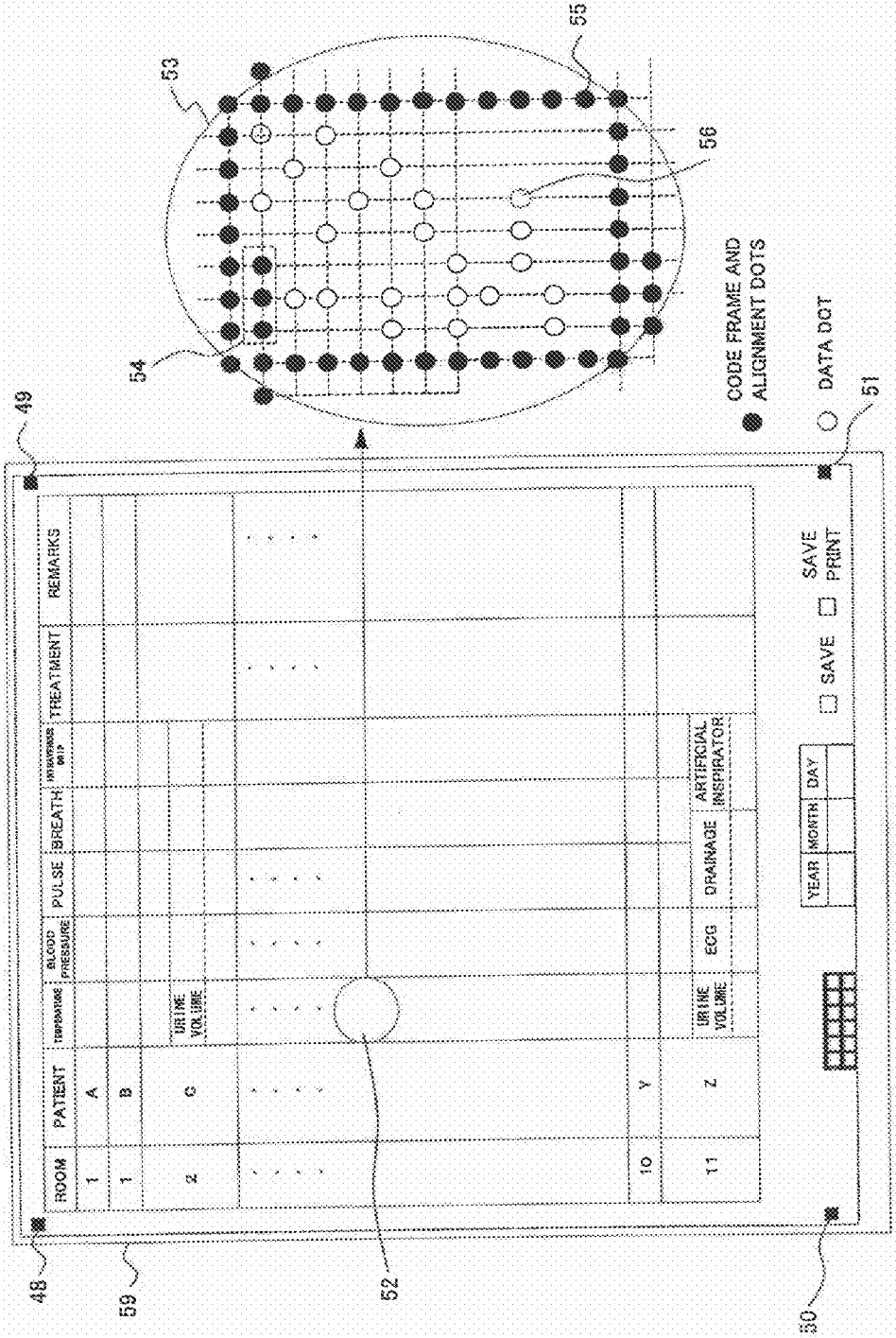

FIG.21

ABCDE
FGHIJ
KLMNO
PQRST
UVWXY

FIG.31

| DEVICE ID | PAPER ID | WRITING X COORDINATE | WRITING Y COORDINATE | PEN UP/DOWN |
|---|---|---|---|---|
| 0001 | 0001 | 10 | 25 | U |
| 0001 | 0002 | 52 | 130 | D |
| 0001 | 0002 | 860 | 200 | U |
| ⋮ | ⋮ | ⋮ | ⋮ | ⋮ |

$$\begin{cases} xsi = \dfrac{b1xri + b2yri + b3}{b7xri + b8yri + 1} \quad (5) \\ \\ ysi = \dfrac{b4xri + b5yri + b6}{b7xri + b8yri + 1} \quad (6) \end{cases}$$

<REGISTRATION FORM>

175 — NAME  YAMATA TAROU — 170

MEMBERSHIP NO.  56 - 381 — 171

REQUEST

173 —  ☐ RESIGNATION  ☑ DELETE — 172

COMMENT
— 174
RESIGN DUE TO MOVING

FIG.56

| | REGISTRATION INFORMATION | | | PROCESSING INFORMATION | | | |
|---|---|---|---|---|---|---|---|
| ID | NAME | MEMBERSHIP NO. | | NAME | MEMBERSHIP NO. | PROCESS | COMMENT |
| 0001 | YAMATA TAROU | 56-381 | | YAMATA TAROU | 56-381 | DELETE | ... |
| 0002 | HANAKO NAKAMORI | 45-277 | | | | | |
| ... | ... | ... | | | | | |

FIG.57

```
<Data ID=0002>
    <Layout>
            <Container>1200,400,2200,500</Container>
            <Contents>1220,420,2180,480</Contents>
        <Type>Textbox<Type>
        <String></String>
        <Border>Outskirt</Border>
    </Layout>

<Input>
        <Enable>True</Enable>
         <Transform>True<Transform>
          <Knowledge1>Japanese </Knowledge1>
           <Knowledge2>Handwriting </Knowledge2>
            <Knowledge3>Person Name </Knowledge3>
         <Result></Result>
    </Input>

<Registration>
            <Server>DATA SERVER</Server>
        <Database>DATABASE1</Database>
        <Table>INFORMATION TABLE</Table>
        <Field>4 </Field>
            <Match Record>Result</Match Record>
    </Registration.
</Data>
```

FIG.60

| ID | 0001 | 0002 | ... |
|---|---|---|---|
| CONTENT BEGINNING | 200,400 | 1200,400 | |
| CONTENT END | 600,500 | 2200,500 | |
| CONTENT BEGINNING | 220,420 | 1220,420 | |
| CONTENT END | 580,480 | 2180,480 | |
| TYPE | Label | Textbox | |
| CHARACTER | NAME | | |
| BORDER | NO | FRAME | |
| | | | |
| INPUT | DISABLED | ENABLED | |
| CONVERSION | NO | YES | |
| RECOGNITION KNOWLEDGE 1 | JAPANESE | JAPANESE | |
| RECOGNITION KNOWLEDGE 2 | PRINTED | HANDWRITING | |
| RECOGNITION KNOWLEDGE 3 | CHARACTER STRING | NAME | |
| RECOGNITION RESULT | | | |
| | | | |
| REGISTRATION SERVER | | DATA SERVER | |
| REGISTRATION DB | | DATABASE 1 | |
| REGISTRATION TABLE | | INFORMATION TABLE | |
| REGISTRATION FIELD | | 4 | |
| REGISTRATION RECORD | | NAME = $RECOGNITION RESULT | |

176: rows CONTENT BEGINNING through BORDER
177: rows INPUT through RECOGNITION RESULT
178: rows REGISTRATION SERVER through REGISTRATION RECORD

FIG.64

$$\begin{cases} \begin{pmatrix} u_1 \\ \nu_1 \end{pmatrix}, \begin{pmatrix} u_2 \\ \nu_2 \end{pmatrix} \quad \text{---(1)} \\ \\ u_1 = \dfrac{h_1 u_2 + h_2 \nu_2 + h_3}{h_7 u_2 + h_8 \nu_2 + 1} \quad \text{---(2)} \\ \\ \nu_1 = \dfrac{h_4 u_2 + h_5 \nu_2 + h_6}{h_7 u_2 + h_8 \nu_2 + 1} \quad \text{---(3)} \\ \\ H = \begin{bmatrix} h_1 & h_1 & h_3 \\ h_4 & h_5 & h_6 \\ h_7 & h_8 & 1 \end{bmatrix} \quad \text{---(4)} \end{cases}$$

DOCUMENT PROCESSING SYSTEM

CROSS-REFERENCE TO RELATED APPLICATIONS

This application is a continuation application of Ser. No. 10/891,364, filed Jul. 15, 2004, now U.S. Pat. No. 7,489,415, which is incorporated herein by reference and is based upon and claims benefit of priority from the prior Japanese Patent Application Numbers 2003-197851, filed on Jul. 16, 2003, 2003-336055, filed on Sep. 26, 2003, and 2004-156241, filed on May 26, 2004, the entire contents of each of which are incorporated herein by reference.

BACKGROUND OF THE INVENTION

1. Field of the Invention

The present invention relates to a document processing system for processing a hand written document on a sheet, and a method thereof.

2. Description of the Related Art

Along with the progress in computerization of office work, documents in electronic form (referred to as "electronic document" below where appropriate) are more and more widely used. However, because quality of characters displayed by a CRT (Cathode-Ray Tube) or a LCD (Liquid Crystal Display) is not as good as that printed on paper in many aspects, people usually print the electronic documents on paper for use ("documents printed on paper" is referred to as "paper document" below where appropriate).

For example, Japanese Patent Gazette No. 3219251 (referred to as "reference 1" hereinafter) discloses a document processing device for document creation and editing, which enables a number of authors and editors to easily access and edit original electronic documents via the paper documents obtained by printing these electronic documents, and enables acquiring the original electronic documents from the paper documents and exchanging of information of the original electronic documents and the paper documents.

Japanese Laid-Open Patent Application No. 10-63820 (referred to as "reference 2" hereinafter) discloses an apparatus and a method that makes original electronic documents in connection with the paper documents thereof, provides means for determining an original electronic document from the corresponding paper document and editing the original electronic document, and reflects the editing of the original electronic document on the paper document to make the original electronic document and the paper document are identical.

In Japanese Laid-Open Patent Application No. 2002-222075 (referred to as "reference 3" hereinafter), "bar code transformation means" and "first printing means" are disclosed functioning as means for assigning identifiers (ID) of documents and creating a form (paper document), a "management table" is disclosed to manage connections between identifiers (ID) of documents and electronic documents, a "printing sheet" is disclosed as means for acquiring paper ID and writing information, an "optical reading device" is disclosed as stroke-type input means, "bar-code decoding means" is disclosed as means for acquiring a paper ID from an image where a bar code is used as an identifier, and "additional edition reading processing means" is disclosed as means for interpreting a layout from an image of a manuscript with additional editing and performing appropriate processing in different regions.

In Japanese Laid-Open Patent Application No. 2002-312478 (referred to as "reference 4" hereinafter), means for assigning identifiers (ID) of documents and for creating a form (paper document) is disclosed in detail; the connection between electronic documents and identifiers (ID) on paper documents is illustrated in FIG. 15 of reference 4 with the description "search a format file data base via a document ID", and is described in detail in paragraphs No. 0056 and No. 0057; means for acquiring a paper ID and written information is illustrated in FIG. 26, FIG. 2, and FIG. 17 as a scanner, a pen-type panel, and a pad-type panel, and stroke-type input means is also disclosed in these figures.

Further, in reference 4, a code reader 15 is illustrated in FIG. 19 as means for acquiring a paper ID, and an identifier such as a bar code is described in paragraphs No. 0034 through No. 0036; means for interpreting a layout from an image of a manuscript with additional editing and performing appropriate processing in different regions is described by successive processing steps in FIG. 15. For example, there are descriptions like "clustering writing coordinates according to format information", "processing the clustered coordinate groups according to processing descriptions of format information (OCR, Image processing)", "registering data obtained by OCR processing with a record database", "saving the database obtained by Image processing to .shc and .tki files as coordinate data sequences"; and means for acquiring a paper ID and a document ID, and processing information is described in paragraphs No. 0077 and No. 0078.

Japanese Laid-Open Patent Application No. 2002-281179 (referred to as "reference 5" hereinafter) discloses a method in which a device having communication functions and equipped with an optical reading device is used to read a bar code including an operation identifier and an object identifier, thereby providing services for customs according to the bar code information.

Japanese Laid-Open Patent Application No. 2002-183520 (referred to as "reference 6" hereinafter) discloses a method involving a check box for selection of commodity and selection of processing methods and text writing regions, and enabling providing services for customs by using a bar code obtained by coding a printed matter ID, an arrangement of the check box, and position information of the text writing regions, and enabling providing services desired by users by using printed matter and copier-facsimile complexes, which are familiar to the users.

Japanese Laid-Open Patent Application No. 2002-215768 (referred to as "reference 7" hereinafter) relates to a technique for providing services for customs, which involves distributing to custom paper provided with codes including information of addresses for communication destination, information indicating coordinates on the paper, and information of types of the paper, and thereby enabling the custom to write on the paper with the paper held in the hands of the custom. In addition, in reference 7, an input device is disclosed that is able to read the codes provided on the paper, and transmits the address information in the codes to the communication destination. This input device transmits the obtained information to a server, the server obtains the coordinate information and media identification information in the codes, and performs appropriate operations in response to the obtained information.

In the aforesaid reference 6, the custom need to read the printed matter, on which the additional editing is written, by a copier-facsimile complex. In contrast, in reference 7, it is the input device, such as writing materials, that reads and transmits the codes including various kinds of information.

Japanese Laid-Open Patent Application No. 11-96166 (referred to as "reference 8" hereinafter) discloses a document information management system that searches for and outputs document files from a database storing a number of electronic documents. Specifically, the document information management system uses a recording medium, which has a document information area for storing document information and a bar code information area for storing bar code information that is obtained by converting electric information corresponding to the document information, and a marking unit for selecting desired words from the recording medium and assigning a selection mark. Based on the selection mark and the bar code information, the document information management system searches the database and outputs the appropriate document files.

In reference 1, because editing is after all performed on the paper document, a user has to use a computer to call up the electronic document corresponding to the given paper document, and revises and edits contents of the document on the electric form document. There is not any problem in doing this work if the user is in his office. However, if the user is at his business travel destination or in a transportation facility, and even if the user desires to revise or edit documents in his spare time, usually the user cannot do that because usually the user does not carry with him an editing device able to efficiently and electrically edit documents.

For example, because a notebook personal computer has low portability due to large size and weight, and has low practical operability due to the short duration of the batteries, usually, one does not tend to carry the notebook personal computer with him in business travel. This is true also for a compact PDA (Personal Digital Assistant) which has a small display unit and an input device having poor input functions.

The apparatus or the method disclosed in reference 2 merely allows the additional editing made on a paper document to be inserted into an electronic document. For example, by simply inserting an additional image into the electronic document, the apparatus does nothing but eliminate differences between the electronic document and the paper document and create an electronic document having the same appearance as the paper document. Thus, the electronic document addressed in reference 2 is no more than a replacement of the paper document. Therefore, the created electronic document has not any practical use except being read.

For example, reference 2 allows one to read items filled out on a questionnaire, but one has to collect the questionnaires by himself, just like the conventional paper documents. This work is troublesome, and automatic collection is required.

In addition, automatic processing of additional editing is not limited to collecting questionnaires, but is usable in many applications. The technique disclosed in reference 2 cannot realize automatic processing of additional editing.

In the reference 3, the original electronic document is not connected with the additional editing, and the method disclosed in the reference 3 is neither configured to perform registration of a processing ID or other processing information, nor to edit the form itself, nor to acquire a paper ID, a document ID, or other processing information.

In reference 4, it is described that it is sufficient to make the original electronic document and patient information be connected with each other, but connection between the original electronic document and the additional editing is not addressed. In addition, the method disclosed in reference 4 is not configured to perform registration of a processing ID or other processing information, or to edit the form itself.

By the method disclosed in the reference 5, only services corresponding to the prepared bar code information can be provided, that is, the range of user's selection is quite limited.

The method disclosed in the reference 6 is capable of processing a document having a fixed format (referred to as "fixed-format document processing" below), but not capable of processing a document without a fixed format (referred to as "unfixed-format document processing" below). This is also true for the method disclosed in reference 7.

The method disclosed in the reference 8 allows direct access to an electronic document even from a paper document not in a hypertext form. This method is capable of fixed-format document processing specified beforehand, but is not capable of other processing. In addition, this method is specialized to search for document files in a database, but cannot be used for other applications.

SUMMARY OF THE INVENTION

It is a general object of the present invention to solve one or more problems of the related art.

A specific object of the present invention is to provide a document processing system capable of processing both fixed-format and unfixed-format hand written paper documents, and a method and a program thereof.

According to a first aspect of the present invention, there is provided a document processing system for processing a hand-written first document on a sheet. The document processing system includes an encoding unit configured to encode a sheet ID for identifying the first document to generate a coded sheet ID; a decoding unit configured to decode the coded sheet ID; a document-sheet ID association unit configured to associate the sheet ID with a document ID assigned to a computerized second document; a printing unit configured to acquire the sheet ID and print the coded sheet ID on the first document; a sheet ID management unit configured to manage the sheet ID; an information acquisition unit configured to acquire the sheet ID decoded by the decoding unit, and hand-written data from the first document on which the coded sheet ID is printed; and a process-sheet ID association unit configured to associate the sheet ID with a process ID of a process for processing the hand-written data acquired by the information acquisition unit.

According to a second aspect of the present invention, there is provided a document processing system for processing a hand-written first document on a sheet. The document processing system includes an encoding unit configured to encode a sheet ID for identifying the first document to generate a coded sheet ID; a decoding unit configured to decode the coded sheet ID; a document-sheet ID association unit configured to associate the sheet ID with a document ID assigned to a computerized second document; a printing unit configured to acquire the sheet ID and print the coded sheet ID on the first document; a sheet ID management unit configured to manage the sheet ID; an information acquisition unit configured to acquire the sheet ID decoded by the decoding unit and hand-written data from the first document on which the coded sheet ID is printed; a process-sheet ID association unit configured to associate the sheet ID with a process ID of a process for processing the hand-written data acquired by the information acquisition unit; and an ID conversion unit configured to convert the sheet ID to the document ID and the process ID.

According to a third aspect of the present invention, there is provided a document processing system for processing a hand-written first document on a sheet. The document processing system includes an encoding unit configured to encode a sheet ID for identifying the first document to generate a coded sheet ID; a decoding unit configured to decode the coded sheet ID; a printing unit configured to acquire the sheet ID and print the coded sheet ID on the first document; a document-sheet ID association unit configured to associate the sheet ID with a document ID assigned to a second document, said second document being a computerized document having a predetermined format; a sheet ID management unit configured to manage the sheet ID; an information acquisition unit configured to acquire the sheet ID decoded by the decoding unit and the hand-written data from the first document on which the coded sheet ID is printed; a process-sheet ID association unit configured to associate the sheet ID with a process ID of a process for processing the hand-written data acquired by the information acquisition unit; a process ID management unit configured to manage the process ID; and a decomposition storage unit configured to decompose the hand-written data acquired by the information acquisition unit based on layout information of the predetermined format and the process ID, and store the decomposed hand-written data.

As an embodiment, the printing unit comprises a printing service unit that prints the first document based on the second document. The printing service unit includes a first unit that acquires the sheet ID assigned to the first document; a second unit that sends the acquired sheet ID to the encoding unit to generate the coded sheet ID; and a third unit that superposes the coded sheet ID on the second document.

As an embodiment, the printing unit includes a first unit that acquires the sheet ID assigned to the first document; a second unit that sends the acquired sheet ID to the encoding unit to generate the coded sheet ID; a third unit that superposes the coded sheet ID on the second document; and a printing service unit that outputs the second document superposed with the coded sheet ID for printing the first document.

As an embodiment, the printing unit comprises a printing service unit that prints the first document based on a printing image. The printing service unit includes a document conversion unit that converts the second document to the printing image; a first unit that acquires the sheet ID assigned to the first document; a second unit that sends the acquired sheet ID to the encoding unit to generate the coded sheet ID; and a third unit that superposes the coded sheet ID on the printing image.

As an embodiment, the printing unit comprises a document conversion unit that converts the second document to a printing image or a page description language sequence; and a printing service unit that prints the first document based on the printing image or the page description language sequence. The printing service unit includes a first unit that acquires the sheet ID assigned to the first document; a second unit that sends the acquired sheet ID to the encoding unit to generate the coded sheet ID; and a third unit that superposes the coded sheet ID on the printing image.

As an embodiment, the sheet ID management unit stores document-sheet ID association information in a non-volatile storage unit, the document-sheet ID association information is used for associating the second document with the sheet ID.

As an embodiment, the document-sheet ID association information is accessible from a communication network.

As an embodiment, the sheet ID management unit associates the second document with the sheet ID in response to a request transmitted from a communication network.

As an embodiment, the sheet ID management unit associates a document title of the second document with the sheet ID in management.

As an embodiment, the sheet ID management unit stores the second document associated with a sheet ID.

As an embodiment, the information acquisition unit includes an image pick-up unit that picks up an image of an object including the first document; a driving unit that drives the image pick-up unit relative to the first document; a control unit that controls the driving unit to divide the first document into a plurality of regions for image picking-up; and a combination unit that combines images of the divided regions of the first document into one image.

As an embodiment, the information acquisition unit comprises a sheet ID image pick-up unit that picks up an image of the coded sheet ID.

As an embodiment, the information acquisition unit comprises an image pick-up unit that picks up an image of an object including the first document; a driving unit that drives the image pick-up unit relative to the first document; a detection unit that detects a position of the coded sheet ID on the object; and a control unit that determines a position of the image pick-up unit so that the image pick-up unit is able to pick up an image of the coded sheet ID, and determines a magnification to be applied for picking up an image of the coded sheet ID. The image obtained by the image pick-up unit is associated with the sheet ID obtained from the image of the coded sheet ID.

As an embodiment, the information acquisition unit comprises an image pick-up unit that picks up an image of an object including the first document; and a detection unit that detects a position of the coded sheet ID on the object. The sheet ID obtained from an image of the coded sheet ID taken by the image pick-up unit is associated with the document ID and the process ID by the ID conversion unit.

As an embodiment, the information acquisition unit comprises an image pick-up unit that picks up an image of an object including the first document; and a sheet ID display unit provided in the object for displaying the coded sheet ID, said sheet ID display unit being storable and including the coded sheet ID.

As an embodiment, the information acquisition unit comprises an image pick-up unit that picks up an image of an object including the first document; and an optical projecting unit that optically projects the coded sheet ID so as to allow the image pick-up unit to pick up an image of the coded sheet ID.

As an embodiment, the information acquisition unit comprises an image pick-up unit that picks up an image of an object including the first document; and a display unit provided in the object for displaying an image of the coded sheet ID taken by the image pick-up unit.

As an embodiment, the process ID management unit manages program-process ID association information that associates the process ID with a program for executing the process for processing the hand-written data.

As an embodiment, the process ID management unit stores the program-process ID association information in a non-volatile storage unit.

As an embodiment, the program-process ID association information is stored in a database accessible from a communication network.

As an embodiment, the program-process ID association information includes information of a position of storing data to be processed by the program.

As an embodiment, the program-process ID association information includes information of a position of a service to be provided by executing the program.

As an embodiment, the process ID management unit associates the process ID with the program in response to a request transmitted from a communication network.

According to a fourth aspect of the present invention, there is provided a document processing method for processing a hand-written first document on a sheet. The document processing method includes the steps of associating a sheet ID with a process ID, the sheet ID being used for identifying the first document, the process ID being used for indicating a process for processing hand-written data on the first document; associating the sheet ID with a document ID assigned to a computerized second document; assigning the sheet ID to the first document; encoding the sheet ID to generate a coded sheet ID; and acquiring the coded sheet ID and the handwritten data from the first document, the coded sheet ID being printed on the first document.

According to a fifth aspect of the present invention, there is provided a document processing method for processing a hand-written first document on a sheet. The document processing method includes the steps of associating a sheet ID with a process ID, the sheet ID being used for identifying the first document, the process ID being used for indicating a process for processing hand-written data on the first document; associating the sheet ID with a document ID assigned to a computerized second document; associating the process ID with a program for executing the process for processing the hand-written data; assigning the sheet ID to the first document; encoding the sheet ID to generate a coded sheet ID; printing the first document with the coded sheet ID thereon; acquiring the coded sheet ID and the hand-written data from the first document, the coded sheet ID being printed on the first document; and converting the sheet ID to the document ID and the process ID.

According to a sixth aspect of the present invention, there is provided a document processing method for processing a hand-written first document on a sheet. The document processing method includes the steps of associating a sheet ID with a process ID, the sheet ID being used for identifying the first document, the process ID being used for indicating a process for processing hand-written data on the first document; associating the sheet ID with a document ID assigned to a computerized second document having a predetermined format; assigning the sheet ID to the first document; encoding the sheet ID to generate a coded sheet ID; and acquiring the coded sheet ID and the hand-written data from the first document, the coded sheet ID being printed on the first document; and decomposing the hand-written data based on layout information of the predetermined format and the process ID and storing the decomposed hand-written data.

According to a seventh aspect of the present invention, there is provided a program executable in a computer for processing a hand-written first document on a sheet. The program makes the computer execute the steps of associating a sheet ID with a process ID, the sheet ID being used for identifying the first document, the process ID being used for indicating a process for processing hand-written data on the first document; associating the sheet ID with a document ID assigned to a computerized second document; assigning the sheet ID to the first document; encoding the sheet ID to generate a coded sheet ID; and acquiring the coded sheet ID and the hand-written data from the first document, the coded sheet ID being printed on the first document.

According to an eighth aspect of the present invention, there is provided a program executable in a computer for processing a hand-written first document on a sheet. The program makes the computer execute the steps of associating a sheet ID with a process ID, the sheet ID being used for identifying the first document, the process ID being used for indicating a process for processing hand-written data on the first document; associating the sheet ID with a document ID assigned to a computerized second document; associating the process ID with a program for executing the process for processing the hand-written data; assigning the sheet ID to the first document; encoding the sheet ID to generate a coded sheet ID; printing the first document with the coded sheet ID thereon; acquiring the coded sheet ID and the hand-written data from the first document, the coded sheet ID being printed on the first document; and converting the sheet ID to the document ID and the process ID.

According to a ninth aspect of the present invention, there is provided a program executable in a computer for processing a hand-written first document on a sheet. The program makes the computer execute the steps of associating a sheet ID with a process ID, the sheet ID being used for identifying the first document, the process ID being used for indicating a process for processing hand-written data on the first document; associating the sheet ID with a document ID assigned to a computerized second document having a predetermined format; assigning the sheet ID to the first document; encoding the sheet ID to generate a coded sheet ID; and acquiring the coded sheet ID and the hand-written data from the first document, the coded sheet ID being printed on the first document; and decomposing the hand-written data based on layout information of the predetermined format and the process ID and storing the decomposed hand-written data.

According to a 10th aspect of the present invention, there is provided a document processing system for processing a hand-written first document on a sheet. The document processing system comprises a document-sheet ID association unit configured to associate a sheet ID for identifying the first document with a document ID assigned to a computerized second document; and a sheet ID management unit configured to manage the sheet ID based on document-sheet ID association information, which is used for associating the second document with the sheet ID.

According to the present invention, it is possible to provide a document processing system capable of processing both fixed-format and unfixed-format hand written documents on a sheet, and provide a method and a program of the system.

These and other objects, features, and advantages of the present invention will become more apparent from the following detailed description of preferred embodiments given with reference to the accompanying drawings.

BRIEF DESCRIPTION OF THE DRAWINGS

FIGS. 11A and 11B are views showing an example of a paper document;

FIG. 12 is a view showing another example of the paper document;

FIG. 21 is a view showing a corrected image;

FIG. 31 is a table showing data stored and transmitted by the written information input device 60;

FIG. 36 is a diagram for schematically showing the operation of labeling the black pixels;

FIG. 37 is a diagram for schematically showing the operation of detecting coordinates of the circumscribing rectangle enclosing the black pixels having the same label;

FIG. 49 shows equations (5) and (6) for calculating transformation coefficients;

FIG. 51 is view for schematically showing data arrangement in the two-dimensional code creation unit 23;

FIG. 55 is a view of an example of a paper document;

FIG. 56 is a view of an information table;

FIG. 57 is a view showing a form structure entity;

FIG. 60 is a view of a table including groups of properties of contents;

FIG. 64 shows equations (1) through (4) for calculating transformation coefficients.

DESCRIPTION OF THE PREFERRED EMBODIMENTS

Below, preferred embodiments of the present invention are explained with reference to the accompanying drawings.

A general description is made before explanation of an overall configuration of an embodiment of the present invention.

The document processing system according to an embodiment of the present invention connects documents on paper with documents in digital form. For example, in a conventional processing system, one opens a form on a screen from a Web site, types on the keyboard of his computer to input data to fill out the form, and strokes a "Submit" key to submit the filled-out form to a server. Then, the system processes, for example, for shopping.

Similarly, in the document processing system of the embodiment of the present invention, one can fill out a form on paper with a pen or other writing tools, and send the hand-written information filled out in the form to a server for the same subsequent processing as in the conventional system. In other words, the document processing system of the embodiment of the present invention enables hand-written information on paper to be processed in the same way as digital data input by a keyboard.

Figure 1:
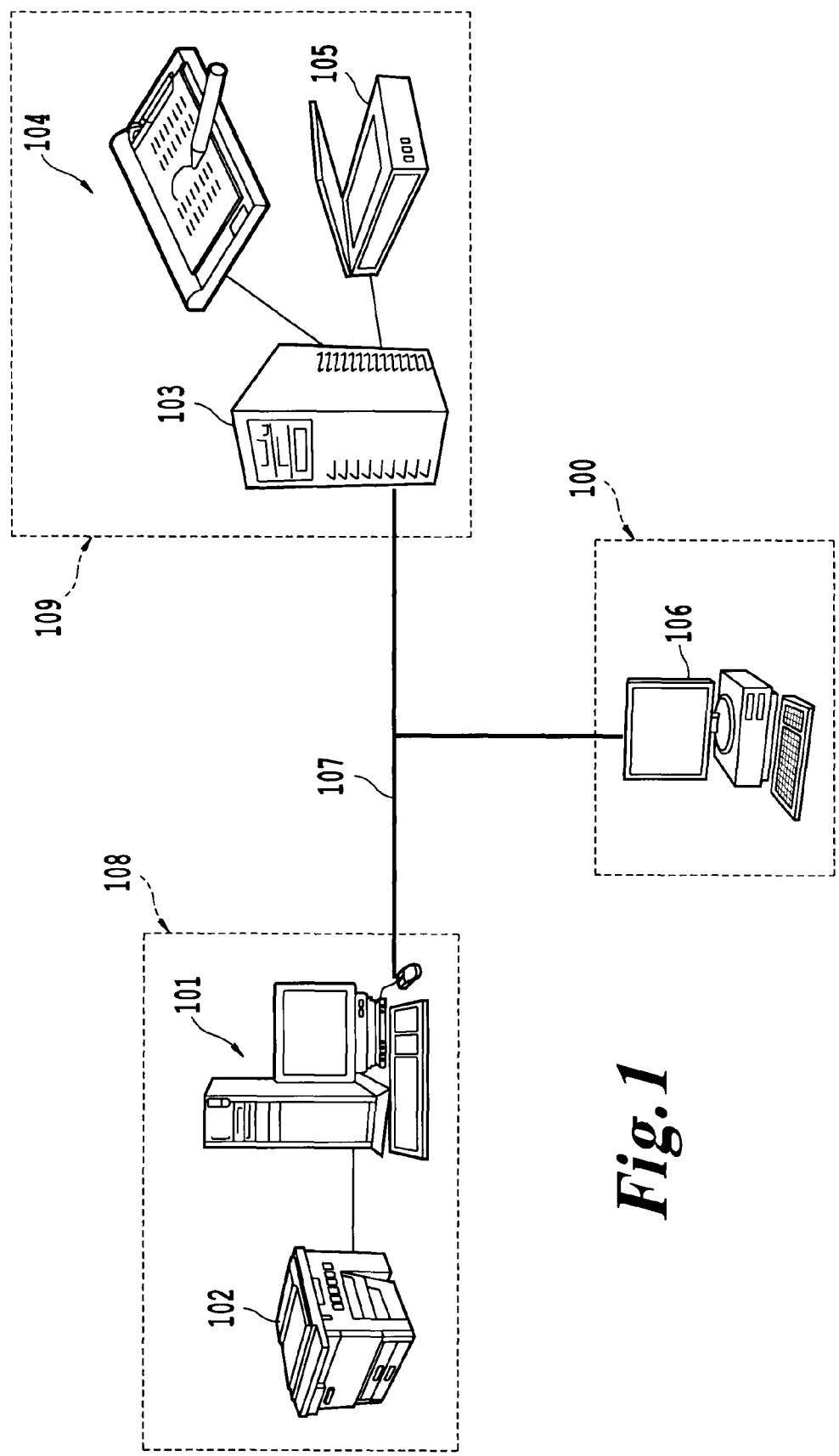
FIG. 1 is a schematic view showing an overall configuration of a document processing system of an embodiment according to the present invention.

FIG. 1 is a schematic view showing an overall configuration of the document processing system of an embodiment according to the present invention.

In FIG. 1, the document processing system includes a computer 101, for example, a personal computer, for preparing various forms, a printer 102, a computer 103, for example, a personal computer, for processing forms, a digital PAD 104, a scanner 105, a data server 106, and a communication network 107.

The computer 101 prepares paper forms, which are filled out by hand writing. The printer 102 prints the paper forms. Following the format of the paper form, the computer 103 processes the hand-written information on a filled-out paper form. The scanner 105 reads the hand-written paper form. The digital PAD 104 successively obtains coordinates of hand writing, and resultantly obtains information filled out on the paper form. The server 106 has a data base used when processing the filled out paper forms.

In the following description, the images of the forms produced by the scanner 105, and the hand writing coordinates obtained by the digital PAD 104 (that is, the stroke data) are generically referred to as "hand written information". In addition, in the following, when necessary, the computer 101 and the printer 102 are collectively referred to as "form preparation device 108", the computer 103, the scanner 105, and the digital PDA 104 are collectively referred to as "form processing device 109", the data server 106 is referred to as "storage device 100".

Figure 2:
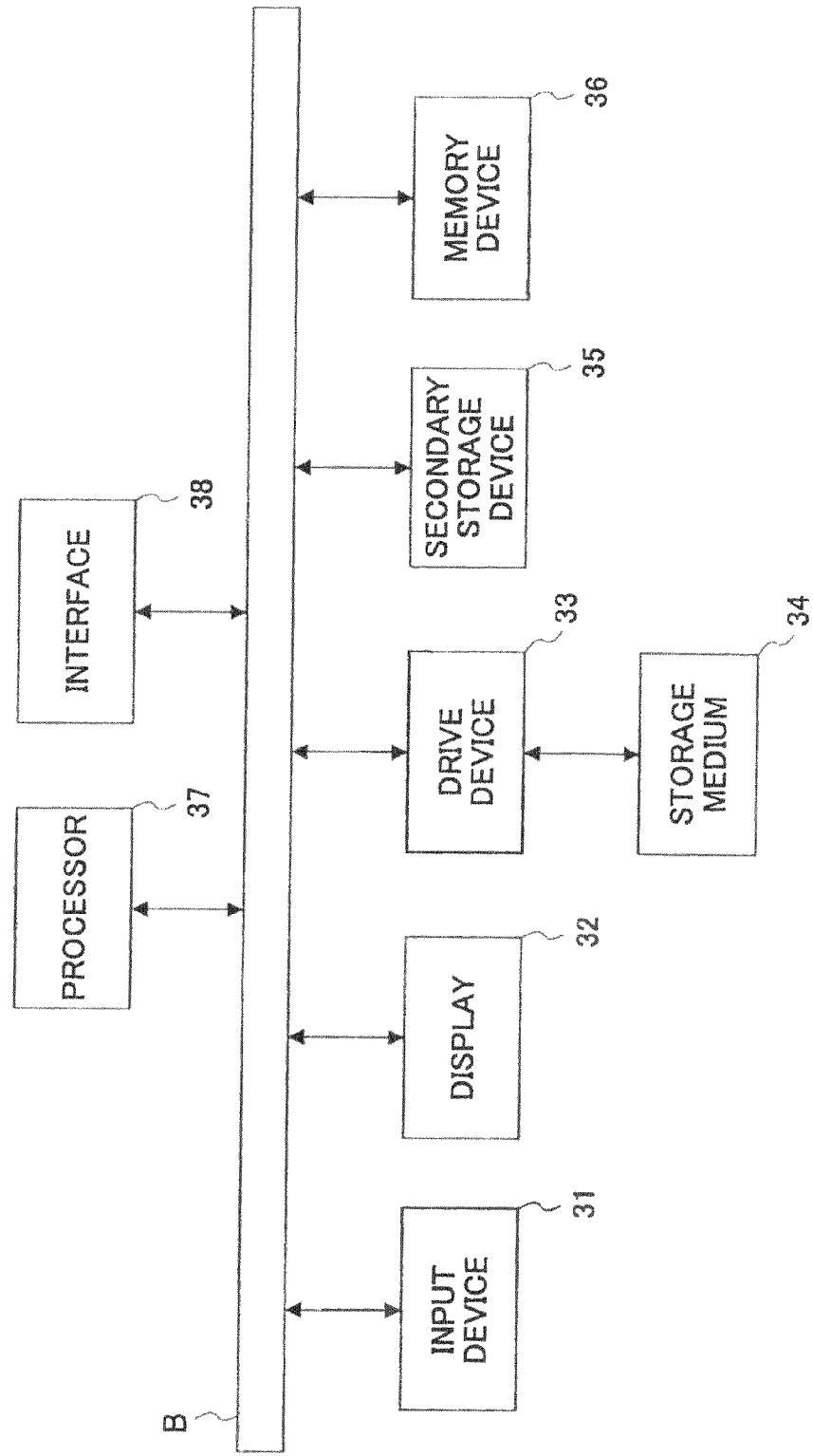
FIG. 2 is a block diagram showing a hardware configuration of the computer 101 or 103 in FIG. 1.

FIG. 2 is a block diagram showing a hardware configuration of the computer 101 or 103 in FIG. 1.

As illustrated in FIG. 2, the computer includes an input device 31, a display unit 32, a drive device 33, a storage medium 34, a secondary storage device 35, a memory device 36, a processor 37, and an interface 38.

The input device 31 may be a keyboard or a mouse operated by a user of the computer, and is used for inputting various kinds of data to the computer. The display unit 32 displays various windows and data for operating the computer. The interface 38 connects the computer to a communication network, and may be a Network Interface Card (NIC) or a modem.

Programs executing on the computer may be provided from the storage medium 34 such as a CD-ROM, or may be downloaded through the communication network. The storage medium 34 may be set in the drive device 33, and programs or data may be loaded to the secondary storage device 35 from the storage medium 34 through the drive device 33.

The secondary storage device 35 stores data, programs and other necessary files.

The memory device 36 loads programs from the secondary storage device 35 when starting up the computer. The processor 37 executes various processes in accordance with the programs loaded in the memory device 36.

The input device 31, the display unit 32, the drive device 33, the secondary storage device 35, the memory device 36, the processor 37, and the interface 38 are connected to a bus B.

Figure 3:
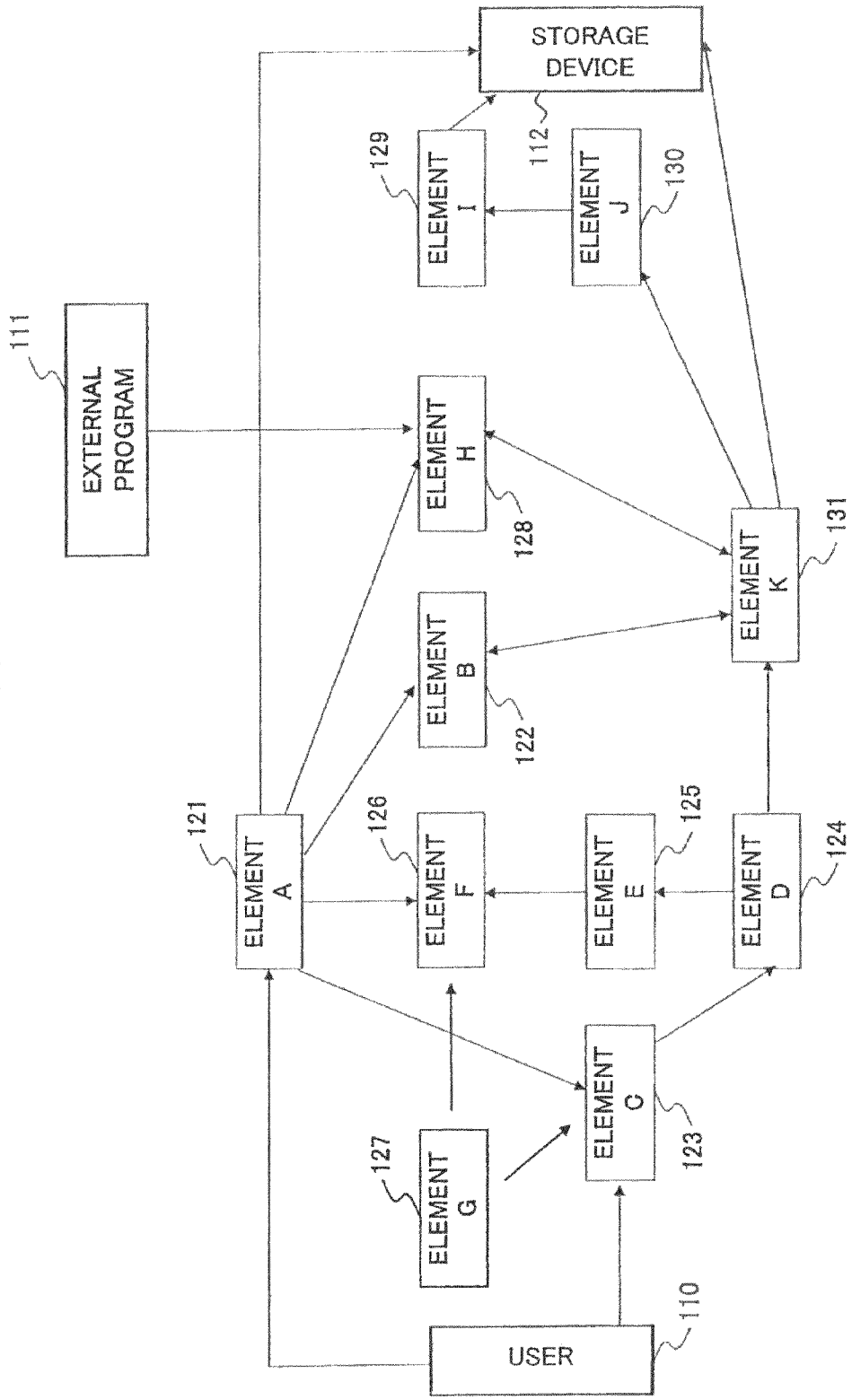
FIG. 3 is a block diagram showing functional constituent elements A through K of the document processing system according to the embodiment of the present invention.

FIG. 3 is a block diagram showing functional constituent elements A through K of the document processing system of the embodiment of the present invention.

As illustrated in FIG. 3, the document processing system includes functional constituent elements A through K. A user 110 uses the document processing system. An external program 111, which is prepared in advance, is executed according to the hand-written information. A storage device 112 stores various data. It may be a hard disk drive, a MO drive, or a semiconductor memory drive.

The element A 121 assigns a paper ID to a piece of paper, prints the paper ID on the paper, and associates the paper ID with a document ID and a process ID. These IDs are described below. The element B 122 manages the paper ID, and associates the paper ID with the document ID assigned to a digital document having a specified format. Below, the "digital document" is referred to as "electronic document".

The element C 123 is a form, or generally, a document on paper (referred to as a paper document), to which a paper ID has been assigned. The user 110 writes on the paper to fill out the form or modifies the document thereon. The element D 124 acquires data and the paper ID from the paper document. The element E 125 decodes the paper ID. The element F 126 encodes the paper ID. The element G 127 is the paper ID. The element H 128 associates the process ID with the external program 111, and manages the process ID. The element I 129 edits and manages layout information of the specified format of the electronic document and the process ID. The element J 130 decomposes the hand-written information based on layout information of the specified format of the electronic document and the process ID, and stores the decomposed hand-written information. The element K 131 converts the paper ID to the document ID and the process ID.

The elements A through K correspond to functions of the components shown in FIG. 1. Specifically, the elements A, B, E are functions given by the form preparation device 108, the element I 129 is the function of the storage device 100, and the elements D, F, J, K are functions given by the form processing device 109.

Further, the printing unit, the process-sheet ID association unit, the document-sheet ID association unit, and the printing service unit in the claims correspond to the element A 121. The sheet ID management unit corresponds to the element B 122. The information acquisition unit corresponds to the element D 124. The decoding unit corresponds to the element E 125. The encoding unit corresponds to the element F 126. The process ID management unit corresponds to the element H 128. The decomposition storage unit corresponds to the element J. The ID conversion unit corresponds to the element K 131. The coded sheet ID corresponds to the result of the element F 126 after encoding the paper ID.

In the following description, a two-dimensional code, or a code, or a coded paper ID is just abbreviated as "paper ID" where it is apparent in the context or in figures.

The elements A through K may be realized by either hardware or software. In the following description, components of the elements are expressed as "modules" where appropriate.

As for the several types of IDs mentioned in the above, a paper ID is uniquely assigned to a piece of paper, and different pieces of paper have different paper IDs. Alternatively, when printing multiple copies of a page in an electronic document having a certain document ID, it may be specified that these copies have the same paper ID. The process ID is assigned to a process for processing the hand-written information in the document processing system. The document ID is assigned to an electronic document, and sometimes referred to as "original document ID" below.

Next, operations of the document processing system of the embodiment of the present invention are described in connection with the elements A through K.

The external program 111 is created in compliance with the interface between the external program 111 and the document processing system. The external program 111 can be classified into two types.

One type of the external program 111 decomposes the hand-written information into blocks of data according to the format of the paper document, and performs fixed-format document processing for the data blocks. The other type of the external program 111 processes the hand-written information itself, and is referred to as "unfixed-format document processing".

The form processing is one of fixed-format document processing, in which the format of the paper document is specified in advance, and fields, into which specified information should be entered, are specified in advance. Specifically, in an address field, an address should be written down, conversely, the item in the address field is treated as an address. Therefore, the fixed-format document processing indicates those operations related to specified writing positions.

Thus, the unfixed-format document processing is processing other than the fixed-format document processing. In the embodiment of the present invention, in the unfixed-format document processing, data files, which include the hand written information, are saved in specified folders. The external program 111 for unfixed-format document processing monitors the folders or the database regularly, obtains new files once the new files are newly generated, and processes the new files. Alternatively, the external program 111 for unfixed-format document processing may operate under an OS that generates an event each time a new file is stored in the folders or the database, and the external program 111 catches the event and processes the new file.

For example, the external program 111 for unfixed-format document processing may be a program that superposes hand written information on an electronic document, and sends the superposed electronic document as an attached file to a predetermined person via an email.

In the fixed-format document processing, because the hand written information is stored in a predetermined database in the present embodiment, the external program 111 for fixed-format document processing monitors the database regularly, obtains new files once the new files are newly generated, and then processes the new files. Alternatively, the external program 111 for fixed-format document processing may use a database that generates an event each time new data are registered with the database, and the external program 111 catches the event and processes the new file. For example, the external program 111 for fixed-format document processing may be a program that processes a questionnaire.

It is not required that both the external program 111 for fixed-format document processing and the external program 111 for unfixed-format document processing be provided, but at least one of them is necessary.

Below, the external program 111 for fixed-format document processing is referred to as "fixed-format document processing program" and indicated by 111*a*, and the external program 111 for unfixed-format document processing is referred to as "unfixed-format document processing program" and indicated by 111*b*.

The external program 111 is registered with the document processing system in order to be associated with the document processing system.

The components (modules) for registering the unfixed-format document processing program 111*b* are included in the element H 128. With these modules, processing information is registered.

Here, by "processing information", it is meant information indicating an interface between unfixed-format document processing program 111*b* and the document processing system. For example, it may be a name of a folder where data are stored. In this case, the format of the data is specified beforehand. Because it should be decided which external program 111 is to be selected at the time of printing, as described below, a caption for this operation is also registered. Due to the registration, a process ID is automatically assigned in the element H 128, and is re-used, as described below.

For the fixed-format document processing, a format should be determined. The components (modules) for determining the format are included in the element I 129. These modules edit and register layout information and processing information of each field of the format.

In the present embodiment, the process ID of the fixed-format document processing is registered to be 0 in advance. For example, the layout information may indicate positions of the input fields on the paper. The processing information may indicate which information should be registered to which data base, whether or not character recognition should be performed, and if yes, which kind of characters should be used.

The user 110 who uses the document processing system prints the paper document. For this purpose, first, the element A 121 is used to print the electronic document to be printed. The electronic document is stored as a file, and the title of the file includes an extension indicating functions of the file.

Because the electronic document for the fixed-format document processing includes a specified extension, from the extension it can be determined which of the fixed-format document processing and the unfixed-format document processing is to be run.

In the unfixed-format document processing, once an instruction for printing is sent to the aforesaid modules, the modules present information on the external processing program 111 that has been registered with the element H 128, and the modules require the user 110 to select the processing after hand writing. Depending on the selection, the process ID is determined.

Once the process ID is determined, the modules register the ID of the electronic document and the process ID with the element B 122 to obtain the paper ID. After that, the paper ID is printed on the paper document, thereby, the paper document assigned with the paper ID (that is, element C 123) is obtained.

In the fixed-format document processing, once a printing instruction is sent to the modules, different from the unfixed-format document processing, because the process ID is set to be 0, it is not necessary to require the user 110 to select the processing. The modules register the ID of the electronic document and the process ID with the element B 122 and obtain the paper ID. After that, the paper ID is printed on the paper document, thereby, the paper document assigned with the paper ID (that is, element C 123) is obtained.

Due to the above processing, the paper document, the corresponding electronic document, and the processing to be performed after hand writing are connected with each other. That is, the paper ID is attached on the paper document, the paper ID is connected to the corresponding document ID and process ID. As a result, the paper to be written and the processing after writing are registered with the document processing system.

The aforesaid original document is the document on which hand-written information has not be written.

Next, a description is given to the operations of the document processing system after hand writing. The user 110 writes on the created paper document (that is, the element C 123), and the paper document with the additional hand writing is read by the element D 124, for example, the scanner 105, or a scanner portion of a multi-function printer. Thereby, the paper ID is obtained by the element E 125 in the element D 124. The paper ID and the image are sent to the element K 131.

Alternatively, the user 110 sets the created paper document, corresponding to the element C 123, on a coordinate input device, corresponding to the element D 124, and then writes on the paper document. Then, the paper ID is obtained by the element E 125 in the element D 124. The paper ID and the image are sent to the element K 131.

Because the document ID and the process ID are registered with the element B 122, and the paper ID has been obtained, in the element K 131, by querying the element B 122 with the obtained paper ID, the document ID and the process ID can be determined.

Next, by querying the element H 128, the storage address of the hand written information is obtained from the process ID, then the document ID and the image are stored at this storage address.

When the process ID is 0, the fixed-format document processing is performed. Specifically, the document ID and the image are given to the element J 130, in the element J 130, by querying the element I 129, the document ID, and the layout information and processing information of the format can be obtained from the paper ID. Here, the processing information may include a storage destination, character recognition of the hand written information, or mark recognition.

With the layout information, the image is decomposed into parts corresponding to the input fields. If the scanner 105 is used as the element D 124, the image of the electronic document is compared with the image of the hand written paper document so as to obtain the hand written information only. Alternatively, if the digital PAD 104 is used as the element D 124, the coordinates of hand writing are obtained. After that, following the processing information, character recognition or mark recognition is performed, and the results are stored in the database.

The above is a detailed description of the document processing sequence. Next, the elements A through K are described in detail.

First, embodiments of the element A 121 are described.

Figure 4:
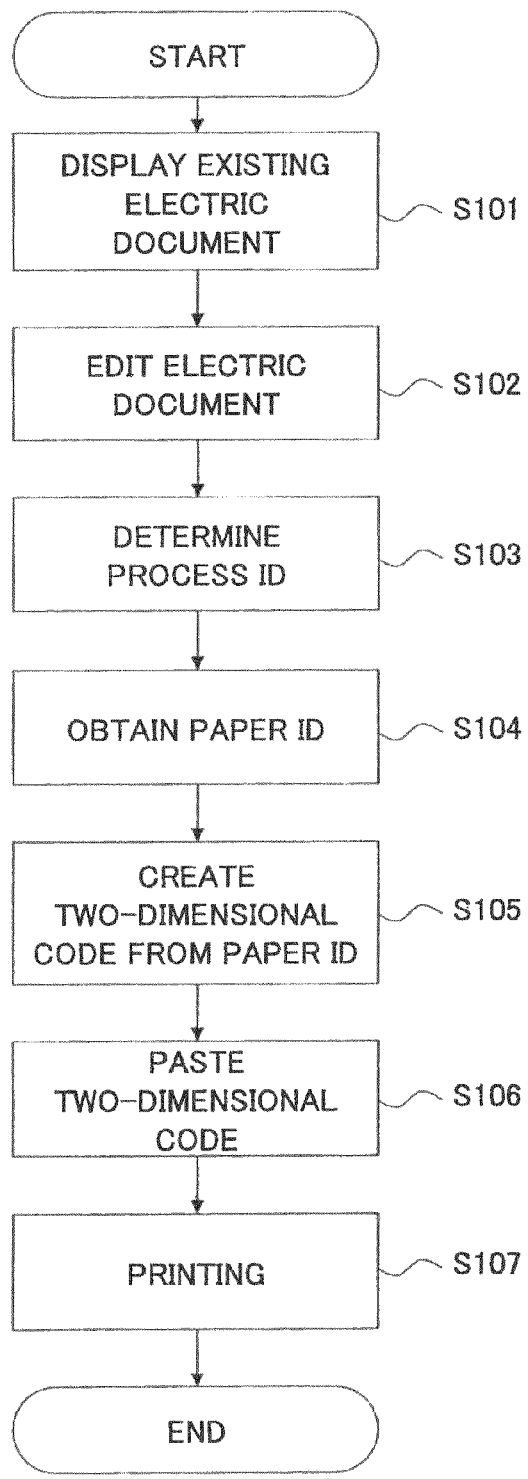
FIG. 4 is a flowchart showing a first embodiment of the element A 121.

FIG. 4 is a flowchart showing a first embodiment of the element A 121. In the first embodiment of the element A 121, a stand alone computer prints documents by itself without communication through a communication network.

In step S101, a layout editor is started up to display an existing electronic document. The layout editor is capable of reading or selecting the process ID, acquiring the paper ID, displaying, editing and printing the electronic document. This function is realized by cooperative operations of the element B 122, the element F 126, the element H 128, and the element I 129 (form preparation program) in the case of a fixed-format document, or a word processor application program in the case of an unfixed-format document.

In step S102, the electronic document is edited when necessary.

In step S103, when the user 110 makes a printing request, the type of the electronic document, that is, a fixed-format document or an unfixed-format document, is determined by the extension of the file name.

If the electronic document is an unfixed-format document, the registered information of the external program 111 with the element H 128 is presented to the user 110 to determine the process ID of the process after hand writing. If the electronic document is a fixed-format document, once an instruction for printing is delivered, different from the unfixed-format document processing, because the process ID is already set to be 0, it is not necessary to require the user 110 to select the processing.

In step S104, the paper ID is obtained.

In step S105, the paper ID is encoded into a two-dimensional code.

In step S106, the two-dimensional code is pasted at a specified position in the electronic document.

In step S107, the electronic document is printed.

When obtaining the paper ID in the above processing, the element B 122 is used to associate the paper ID with each page of the electronic document, and thus with the process ID; meanwhile, these IDs are managed by a management database. After the paper ID is obtained, the element F 126 generates the two-dimensional code from the paper ID.

The generated two-dimensional code is superposed at a specified position in the electronic document if the position of superposition is specified, or is superposed at a predetermine position in the electronic document if the position of superposition is not specified.

The sequence of operations from acquisition of the paper ID to insertion of the two-dimensional code into the electronic document may be executed automatically when the user 110 carries out a printing operation by using the word processor application program. Alternatively, this sequence of operations may be included in a menu, and the user 110 can explicitly execute the sequence of operations at any time.

If the word processor application program has a macro function, the above function can be realized by using macros. In this case, the element B 122 and the element G 127 are software modules. If they are COM modules of Windows (registered trade mark), they can be called by using the macro function. If the AddPicture method of the WordObjectLibrary module is utilized, the image can be inserted at any position in the electronic document. In this way, the element C 123, that is, the paper document, is printed.

Step S104 corresponds to the step of "associating the sheet ID with a document ID assigned to a computerized second document", and the step of "assigning the sheet ID to the first document" in the claims, and operations of management of the paper ID and document ID.

In step S104, the element B 122 is used to obtain the paper ID, specifically, the element B 122 controls the paper ID, associates the paper ID with the document ID, and the paper ID with the process ID.

Step S105 corresponds to the step of decoding, and step S107 corresponds to the step of printing in the claims.

Figure 5:
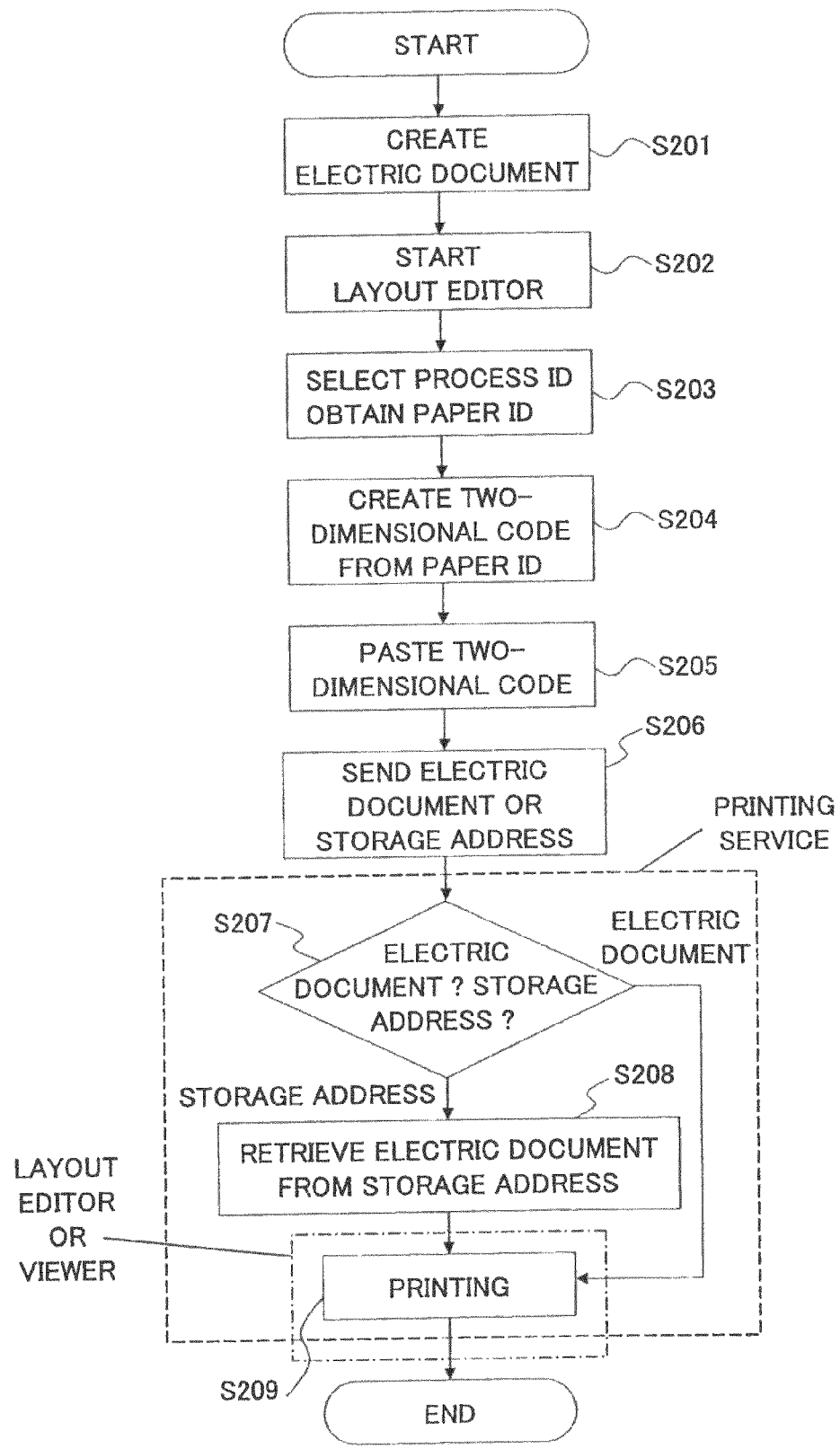
FIG. 5 is a flowchart showing a second embodiment of the element A 121.

FIG. 5 is a flowchart showing a second embodiment of the element A 121. The second embodiment relates to operations of printing an electronic document by a printing service after creating and editing the electronic document.

In step S201, the user 110 creates an electronic document, in which each constituent element (objects) and the characteristics thereof are described.

In step S202, the user 110 starts up a layout editor to display and edit an existing electronic document if necessary.

In step S203, using the layout editor, the process ID is selected, and the paper ID is acquired.

In this step, the element H 128 is used to select the process ID, and the element B 122 is used to obtain the paper ID. The element H 128 and the element B 122 associate the paper ID with each page of the electronic document, and thus with the process ID. Meanwhile, these IDs are managed by a management database.

The selection of the process ID is performed only in the unfixed-format document processing. In the fixed-format document processing, because the process ID is already set to be 0, it is not necessary to require the user 110 to select the processing.

In step S204, the element F 126 generates a two-dimensional code from the paper ID.

In step S205, the two-dimensional code is pasted at a specified position in the electronic document when the position of pasting is specified, or is pasted at a predetermine position in the electronic document when the position of pasting is not specified.

In step S206, the electronic document pasted with the two-dimensional code, or the storage address of the electronic document is sent to a printing service by SOAP (Simple Object Access Protocol). When sending the storage address of the electronic document, it is preferable that the electronic document pasted with the two-dimensional code be stored at an address which the printing service is able to access.

In step S207, it is determined which of the electronic document and the storage address of the electronic document is to be sent. Different processing is performed depending on the result. If the electronic document is to be sent, the electronic document is printed by using functions of the layout editor or a viewer in step S209.

In step S208, if it is determined that the storage address of the electronic document is to be sent, the electronic document is retrieved from the storage address in the printing service.

In step S209, the electronic document is printed by using functions of the layout editor or a viewer.

According to the second embodiment, printing is possible even if printer drivers or other software related to the printing functions are not installed in the computer for editing the layout.

The printing service is an environment for printing built on a specified computer, and this environment is open to other computers. Therefore, any computers able to access to the printing service are allowed to print electronic documents using the printing function. In other words, even a computer without the printing environment can deliver an instruction of printing an electronic document.

In addition, because editing is not necessary in the printing service, it is sufficient to install a viewer having printing commands in a computer on which the printing service is running.

Figure 6:
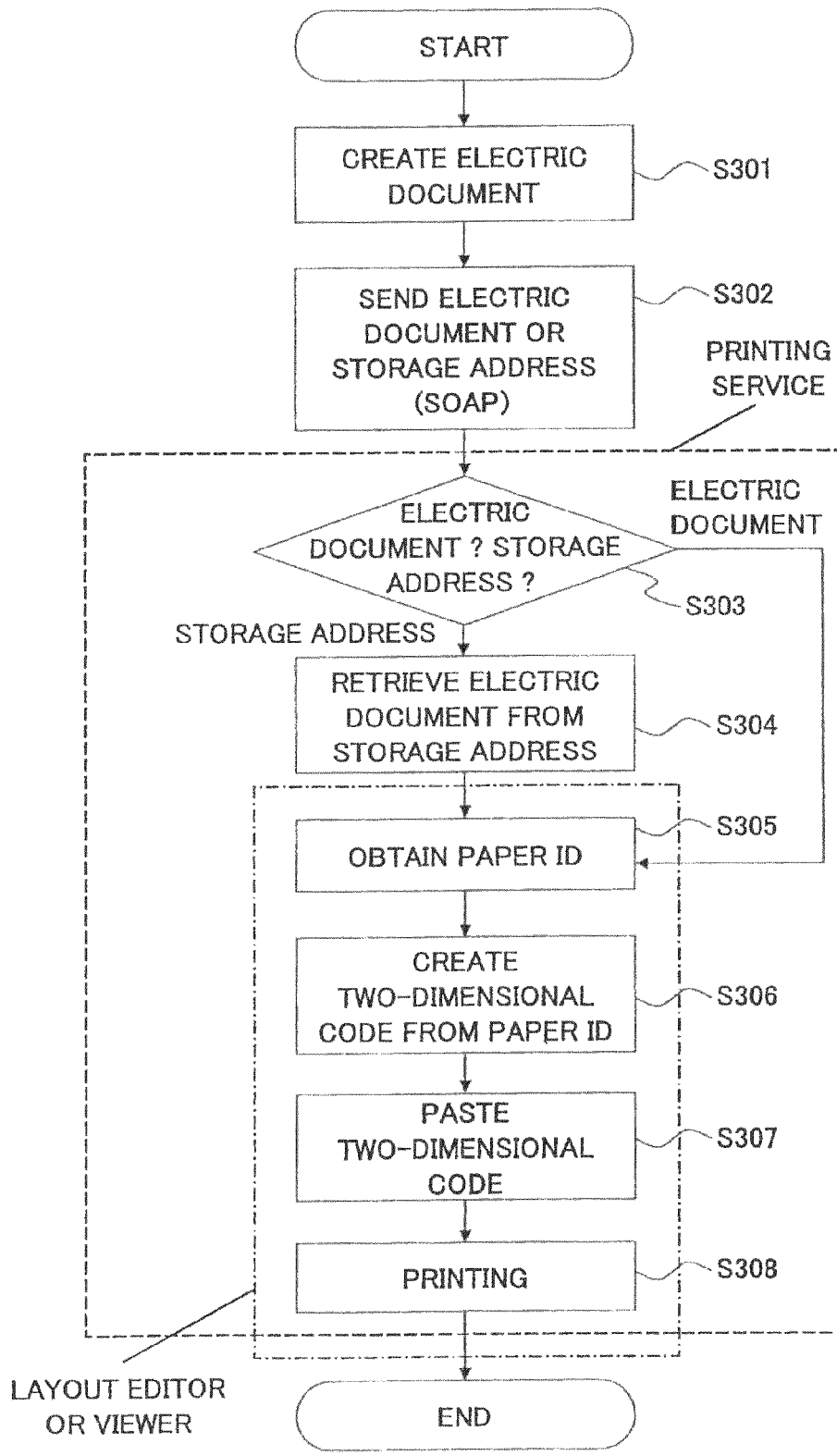
FIG. 6 is a flowchart showing a third embodiment of the element A 121.

FIG. 6 is a flowchart showing a third embodiment of the element A 121. The third embodiment relates to operations of printing an electronic document by using a printing service without editing the electronic document.

In step S301, the user 110 creates an electronic document.

In step S302, the electronic document, or the storage address of the electronic document is sent to a printing service by SOAP (Simple Object Access Protocol) together with the process ID.

When sending the storage address of the electronic document, it is preferable that the electronic document to be printed be stored at an address which the printing service is able to access.

If the electronic document is an unfixed-format document, the element H 128 obtains a list of the process IDs, and requires the user 110 to select the process ID to be sent. If the electronic document is a fixed-format document, the process ID is 0.

In step S303, it is determined which of the electronic document and the storage address of the electronic document is to be transmitted. Different processing is performed depending on the result.

If it is determined that the electronic document is to be transmitted, the routine proceeds to step S305.

If it is determined that the storage address of the electronic document is to be transmitted, the routine proceeds to step S304.

In step S304, the electronic document is retrieved from the storage address in the printing service.

In step S305, if the electronic document is transmitted, or after the electronic document is retrieved, the computer on which the printing service is running acquires the paper ID.

In this step, the element B 122 is used to obtain the paper ID, associate the paper ID with each page of the electronic document, and thus with the process ID. Meanwhile, these IDs are managed by a management database.

In step S306, the element F 126 generates a two-dimensional code from the paper ID.

In step S307, the two-dimensional code is pasted at a specified position in the electronic document when the position for pasting is specified, or is pasted at a predetermine position in the electronic document when the position of pasting is not specified.

In step S308, an image file for printing the electronic document pasted with the two-dimensional code is created and is printed on paper.

The steps of acquiring the paper ID, creating the two-dimensional code, pasting the two-dimensional code, and printing the electronic document are executed by using functions of a layout editor installed in the computer on which the printing service is running.

According to the third embodiment, printing an electronic document is possible even if a layout editor is not installed in the computer on which the electronic document is created. The printing service is running on a specified computer, and if the layout editor is installed in this specified computer, other computers can use this function to print electronic documents. In other words, even computers without the layout editor are able to deliver instructions of printing electronic documents.

Figure 7:
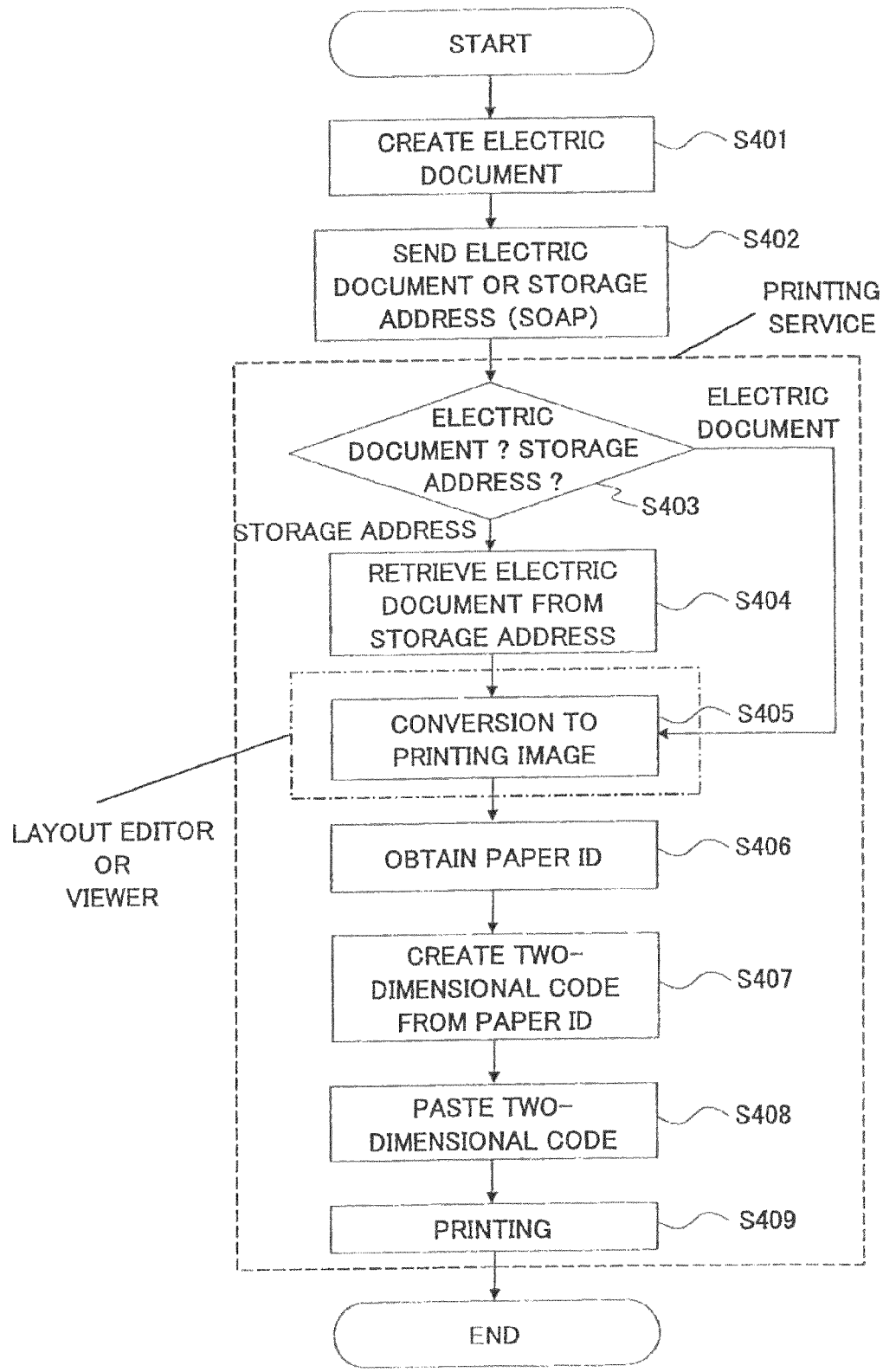
FIG. 7 is a flowchart showing a fourth embodiment of the element A 121.

FIG. 7 is a flowchart showing a fourth embodiment of the element A 121. The fourth embodiment relates to operations of printing an electronic document by using a printing service without editing the electronic document.

In step S401, the user 110 creates an electronic document.

In step S402, the electronic document, or the storage address of the electronic document is sent to a printing service by SOAP (Simple Object Access Protocol) together with the process ID.

When sending the storage address of the electronic document, it is preferable that the electronic document to be printed be stored at an address which the printing service is able to access.

If the electronic document is an unfixed-format document, the element H 128 obtains a list of the process IDs, and requires the user 110 to select the process ID to be sent. If the electronic document is a fixed-format document, the process ID is 0.

In step S403, it is determined which of the electronic document and the storage address of the electronic document is to be transmitted. Different processing is performed depending on the result.

If it is determined that the electronic document is to be transmitted, the routine proceeds to step S405.

If it is determined that the storage address of the electronic document is to be transmitted, the routine proceeds to step S404.

In step S404, the electronic document is retrieved from the storage address in the printing service.

In step S405, if the electronic document is to be transmitted, or after the electronic document is retrieved, the electronic document is converted into an image file for printing use.

In step S406, the computer, on which the printing service is running, acquires the paper ID.

In this step, the element B 122 is used to obtain the paper ID, associate the paper ID with each page of the electronic document, and thus with the process ID. Meanwhile, these IDs are managed by a management database.

In step S407, the element F 126 generates a two-dimensional code from the paper ID.

In step S408, the two-dimensional code is also converted into an image file for printing use. The image file of the two-dimensional code is pasted at a specified position in the image file of the electronic document when the position for pasting is specified, or is pasted at a predetermine position in the image file of the electronic document when the position of pasting is not specified.

In step S409, the image file of the electronic document pasted with the image file of the two-dimensional code is printed on paper.

According to the fourth embodiment, printing an electronic document is possible even if a layout editor is not installed in the computer on which the electronic document is created. The printing service is running on a specified computer, and if the layout editor is installed in this specified computer, other computers can use this function to print electronic documents. In other words, even computers without the layout editor are able to deliver instructions of printing electronic documents.

In addition, because the electronic document itself is not edited in the printing service, but an image pasting operation is performed by using image files for printing use, it is sufficient to install a viewer that has functions of outputting files by using printing commands in the computer on which the printing service is running.

Further, before pasting the two-dimensional code to the electronic document, the electronic document and the two-dimensional code are converted into respective image files for printing use first, and the image file of the two-dimensional code is pasted to the image file of the electronic document in the printing service, therefore, no matter what kind of file the original electronic document is, pasting of the two-dimensional code and outputting of the electronic document pasted with the two-dimensional code can be performed in the same way. This is an advantage of the fourth embodiment.

Figure 8:
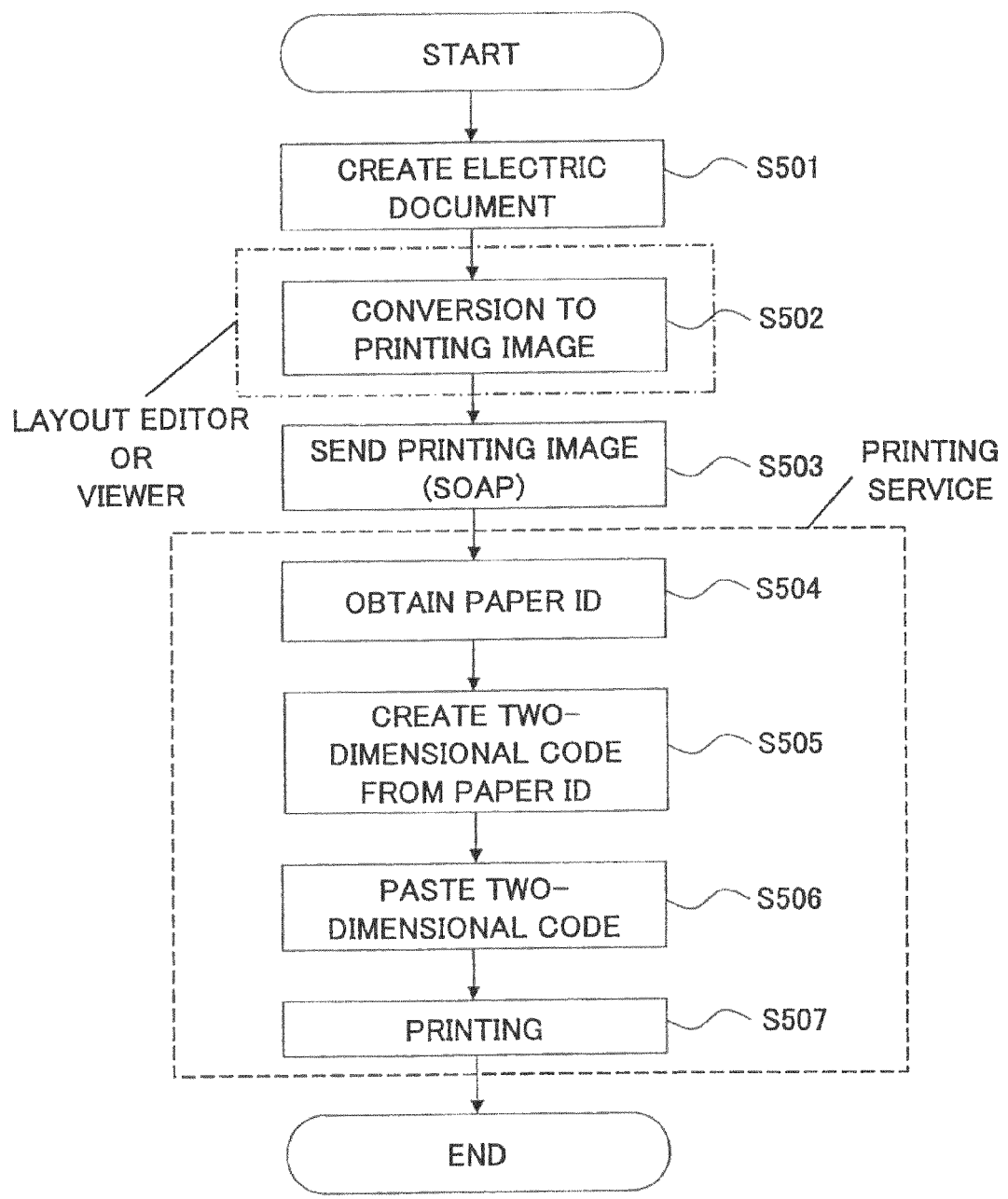
FIG. 8 is a flowchart showing a fifth embodiment of the element A 121.

FIG. 8 is a flowchart showing a fifth embodiment of the element A 121. The fifth embodiment relates to operations of printing an electronic document by using a printing service.

In step S501, the user 110 uses a layout editor to create and edit an electronic document.

In step S502, a printing image or a page descriptive language sequence is created from the electronic document. The printing image and the page descriptive language sequence are not dependent on the relevant platform. Here, a printing image is an image of a paper document that is actually printed on paper.

Below, for simplicity, the word "printing image" is used to indicate both the printing image and the page descriptive language sequence.

When an existing electronic document is opened directly without any editing, the printing image may be created from the electronic document by using the printing commands of a layout viewer.

In step 503, the printing image of the electronic document created in this way is sent to a printing service by using SOAP (Simple Object Access Protocol), together with the process ID selected by the user 110, and the document ID indicating the storage address of the electronic document.

In step S504, the computer, on which the printing service is running, acquires the paper ID after receiving the printing image, the process ID, and the document ID.

In this step, the element B 122 is used to obtain the paper ID, associate the paper ID with each page of the electronic document, and thus with the process ID. Meanwhile, these IDs are managed by a management database.

In step S505, the element F 126 generates a two-dimensional code from the paper ID.

In step S506, the two-dimensional code is transformed according to the form of the printing image of the electronic document received before, and is pasted at a specified position in the electronic document when the position of pasting is specified, or is pasted at a predetermine position in the electronic document when the position of pasting is not specified.

In step S507, the printing image of the electronic document pasted with the two-dimensional code is printed on paper.

According to the fifth embodiment, it is possible to print the electronic document pasted with the two-dimensional code even when the original electronic document is stored at an address which the printing service is unable to access. In addition, although the printing service pastes the two-dimensional code to the electronic document after receiving the printing image of the electronic document, because a layout editor is not used for pasting the two-dimensional code, it is not necessary to install the layout editor in the computer.

When printing an exiting electronic document, which does not be edited, it is sufficient if the computer, on which the electronic document was created, is able to deliver a printing instruction for creating a printing image, and it is not necessary to install a layout editor having editing functions in the computer.

In other words, it is possible to paste a two-dimensional code to an electronic document even when a layout editor is not installed in either of the two computers in communication. For example, in the case of a PDF file, it is not necessary to install an editing application like Acrobat (registered trade mark) of the Adobe company in the computer on which the electronic document is created, and it is sufficient to install an application like Acrobat Reader (registered trade mark) that is able to deliver a printing command.

Next, embodiments of the element B 122 are described.

When other elements shown in FIG. 3 request registration of a paper ID in order for outputting onto paper, the element B 122 receives at least document information that uniquely specifies an electronic document, assigns a unique paper ID arranged in the management table corresponding to the document information, and stores the document information to the management table.

Figure 9:
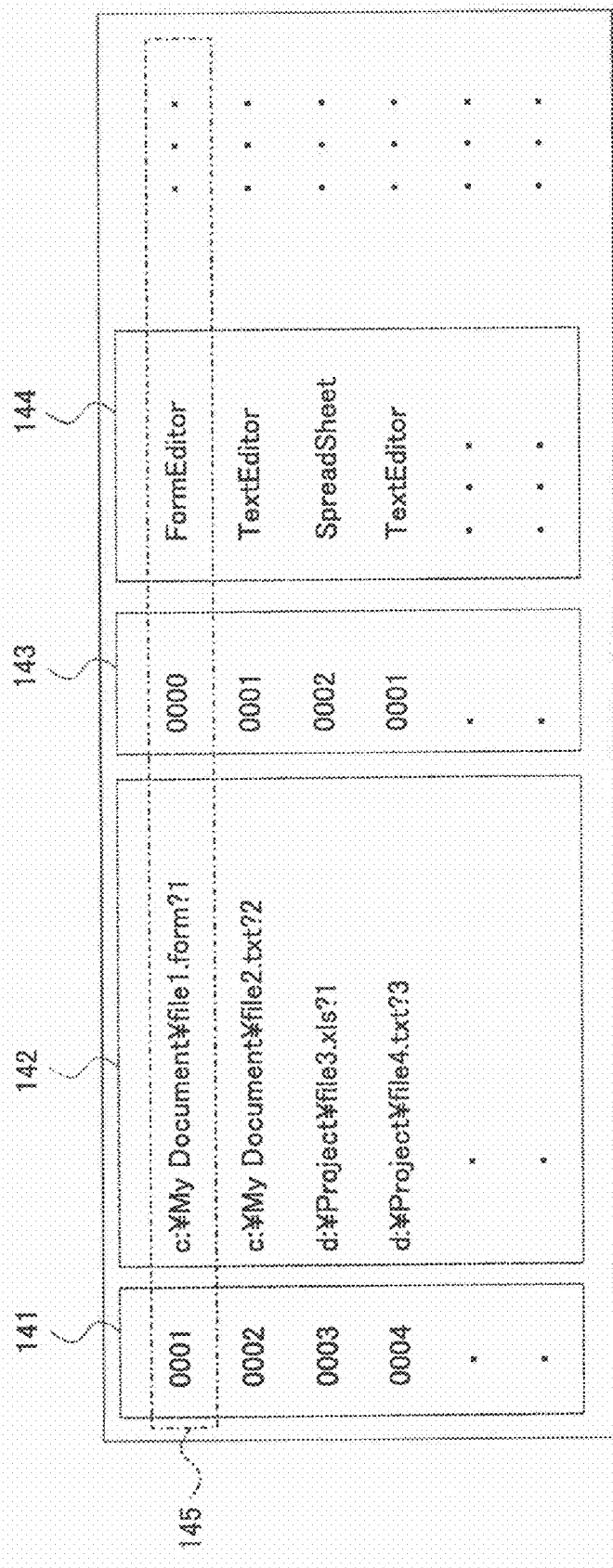
FIG. 9 is a view showing an example of a management table used in the element B 122 for associating a paper ID with a document ID.

FIG. 9 is a view showing an example of a management table used in the element B 122 for associating a paper ID with a document ID.

Figure 10:
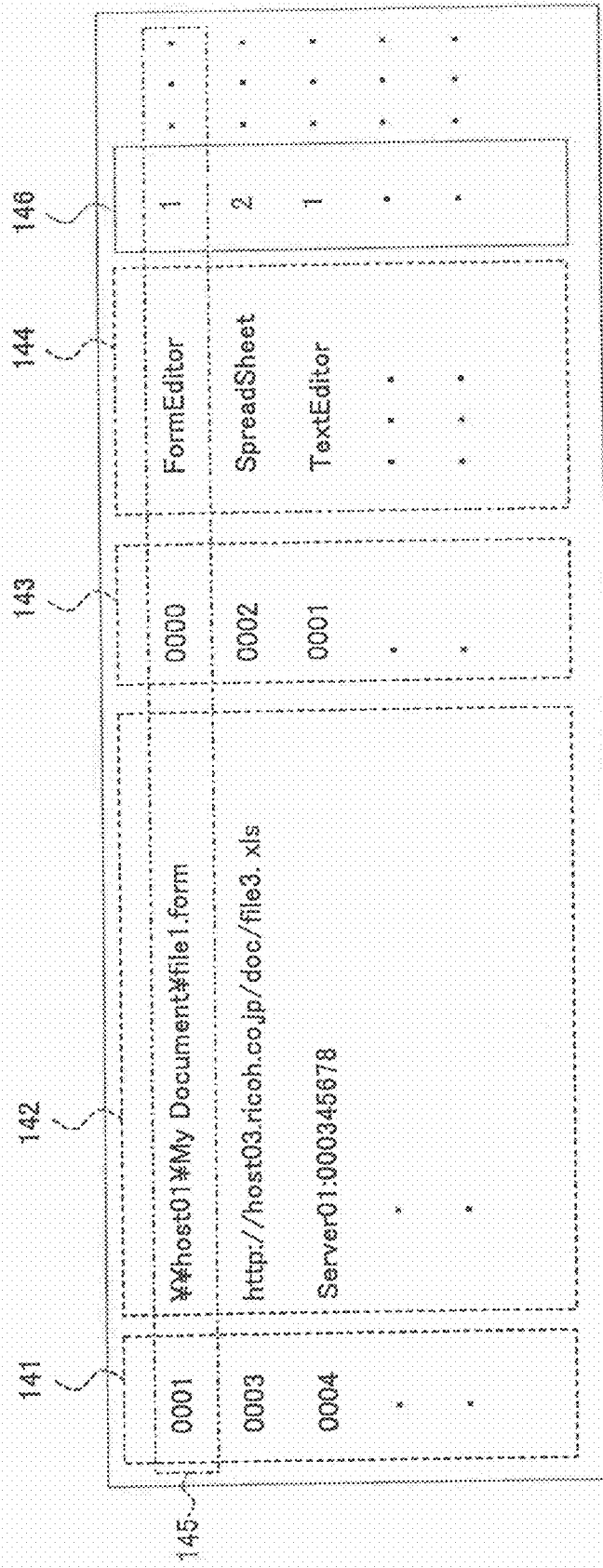
FIG. 10 is a view showing another example of the management table used in the element B 122 for associating a paper ID with a document ID.

FIG. 10 is a view showing another example of the management table used in the element B 122 for associating a paper ID with a document ID.

In FIG. 9 and FIG. 10, each line, for example, the line 145, is a unit of the document information corresponding to the registered paper ID, and each column includes registered elements of the paper IDs.

Listed in column 141 are the assigned paper IDs. In column 142, there is the document information for uniquely specifying an electronic document. For example, in FIG. 9, path names are stored in the column 142 as the document information. If electronic documents in different computers are dealt with, as shown in FIG. 10, network path names (URI: Uniform Resource Identifier) are stored in the column 142 as the document information. When dealing with electronic documents each having multiple pages, the document information is provided in each page, and the column 142 also includes information of page numbers.

In addition, as shown in FIG. 10, if information of page numbers is not stored in the column 142, this information can be stored in the column 146. In this case, an electronic document is uniquely specified by columns 142 and 146.

A storage address of an electronic document may be represented by a management ID if the electronic document is stored in the same document management system. As shown in FIG. 10, the electronic documents may be stored in a different system or in multiple systems as long as the stored electronic documents can be identified. In addition, when accepting registration requests, a paper ID may be assigned after the electronic document itself is received, given a file name distinguishable from others, and saved.

In the management table, a column 143 stores process IDs indicating programs to be used to process a paper document and hand written information thereon.

In addition, column 144 stores information of applications used to create electronic documents. There may be two or more columns like the column 144 for storing attribute information related to electronic documents and paper documents.

When a paper ID is specified and the management information is requested (referred to as "reference request"), the element B 122 searches for an appropriate paper ID from the paper IDs in the column 141 in FIG. 9. The element B 122 transmits, to the requester, an item of the document information in the column 142 corresponding to the obtained paper ID, which uniquely specifies an electronic document. At this time, the element B 122 may also transmits attribute information in the column 143 and the subsequent columns at the same time, but at least the information in the column 142 should be transmitted, and in FIG. 10, at least the information in the columns 142 and 146 should be transmitted.

When the element B 122 is a program, the contents of the management tables in FIG. 9 and FIG. 10 may be stored in the memory used by the program in execution. Alternatively, the contents of the management tables may be stored as a file in a file system at certain timing. Further, the contents of the management tables may be stored in a database as digital information. In this case, one paper ID and the corresponding attribute information form one record, and the paper ID may be used as a key for storing or retrieving document-related information, thereby enabling association of the paper ID with the electronic document and enabling management of the information.

In this way, the management table controlled by the element B 122 is stored not only in the memory used by executing programs, but also in a non-volatile storage device such as a hard disk as a file. Therefore, even when the power of the element B 122 is turned off, the association information may be evoked again for use.

In addition, information of the correspondence relation between the paper IDs and the electronic documents held in the management table is stored in the non-volatile storage device as a database able to be accessed via a communication network. Thereby, it is possible to provide more than one elements B 122 in the system, which refers to the correspondence relation information in the database.

The non-volatile storage device described here corresponds to the non-volatile storage unit in the claims.

Furthermore, the element B 122 may be provided in a device independent from the device provided with the other elements, and the device having the element B 122 may be connected with the device having the other elements by a communication network so that the device having the other elements can access the device having the element B 122. With this configuration, the element B 122 functions as RPC (Remote Procedure Call) or a Web service, and accepts requests for registration or for reference from other elements via the communication network.

In this way, the element B 122 is connected with other elements via the communication network, and if the element B 122 is the only element that issues identifiers to paper documents in the system, the element B 122 can accept requests for registration or for reference from other elements distributed on the communication network.

Further, when information of the electronic document is received, even if the same file name of different electronic documents exists on the communication network, the electronic documents can be distinguished if a path name, or a name of the computer storing the electronic documents, is included in the file name.

After the electronic document to be registered is received and stored, the name of the stored electronic document is associated with the assigned paper ID in management, therefore, it is possible to distinguish the same electronic document name of different registrations in management.

Next, a description is given to embodiments of the element C 123, which corresponds to a paper document assigned with a paper ID.

FIGS. 11A and 11B are views showing an example of a paper document.

The paper document shown in FIG. 11A or FIG. 11B is a registration form 40 for entrance to or resignation from a club. This paper document is obtained by printing a corresponding electronic document, which is created and managed in a computer, for example, onto standard paper.

As illustrated in FIG. 11A, contents 46, a two-dimensional code 45, and four timing marks 41, 42, 43, 44 are printed on the registration form 40.

The contents 46 are defined by the corresponding electronic document, the two-dimensional code 45 is mechanically readable, and the timing marks 41, 42, 43, 44 are used for position alignment when reading hand written information. The number of the timing marks is not limited to four, and the shapes, sizes, and colors of them are not limited, either. Moreover, depending on the situation, the timing marks may also be omitted.

As shown in FIG. 11B, one uses a writing tool to fill out the registration form 40, and the filled-out registration form is indicated to be a registration form 47.

FIG. 12 is a view showing another example of the paper document. In FIG. 12, data are embedded into contents of a paper document 59.

As illustrated in FIG. 12, contents (information) and four timing marks 48, 49, 50, 51 are printed on the paper document 59. A portion 52 of the contents is enlarged (the enlarged portion is indicated by a reference number 53). In the enlarged portion 53 of the contents, there are an identifier 54, a code frame 55, which also acts as alignment dots, and data dots 56.

In this example, it is described that the element C 123 corresponds to a document printed on paper. It should be noted that the element C 123 is not limited to this, but may be any thing on which one can write, for example, a sheet of plastic film and others.

Next, a description is given to embodiments of the element D 124, which obtains the hand written information from the paper document. For example, the element D 124 may be an image capturing device using an area CCD as an image pick-up element, specifically, a digital camera.

When an image of a piece of A4 size paper is captured, at a time, by an area CCD having about 300 million pixels (2048×1536 pixels), the equivalent effective resolution is about 170 dpi (dots per inch). When capturing an image including a great deal of information, such as the two-dimensional code, and decoding the two-dimensional code, a high resolution is necessary, and sometimes the resolution of 170 dpi is not sufficient. It is possible in principle to attempt to increase the degree of integration of the area CCD so as to increase the resolution, but this is limited by the technology of semiconductor processing.

To solve this problem, in this embodiment, the image capturing device uses the area CCD as the image pick-up element, and is equipped with a zoom lens whose magnification is changeable. Further, the image capturing device is moved by a driving unit, and the image capturing device can zoom in on regions of an object (for example, a paper document on a piece of paper) to capture images of these regions. Then, the images of these regions are combined into one image having a high resolution. In this way, it is possible to read the two-dimensional code.

Figure 13:
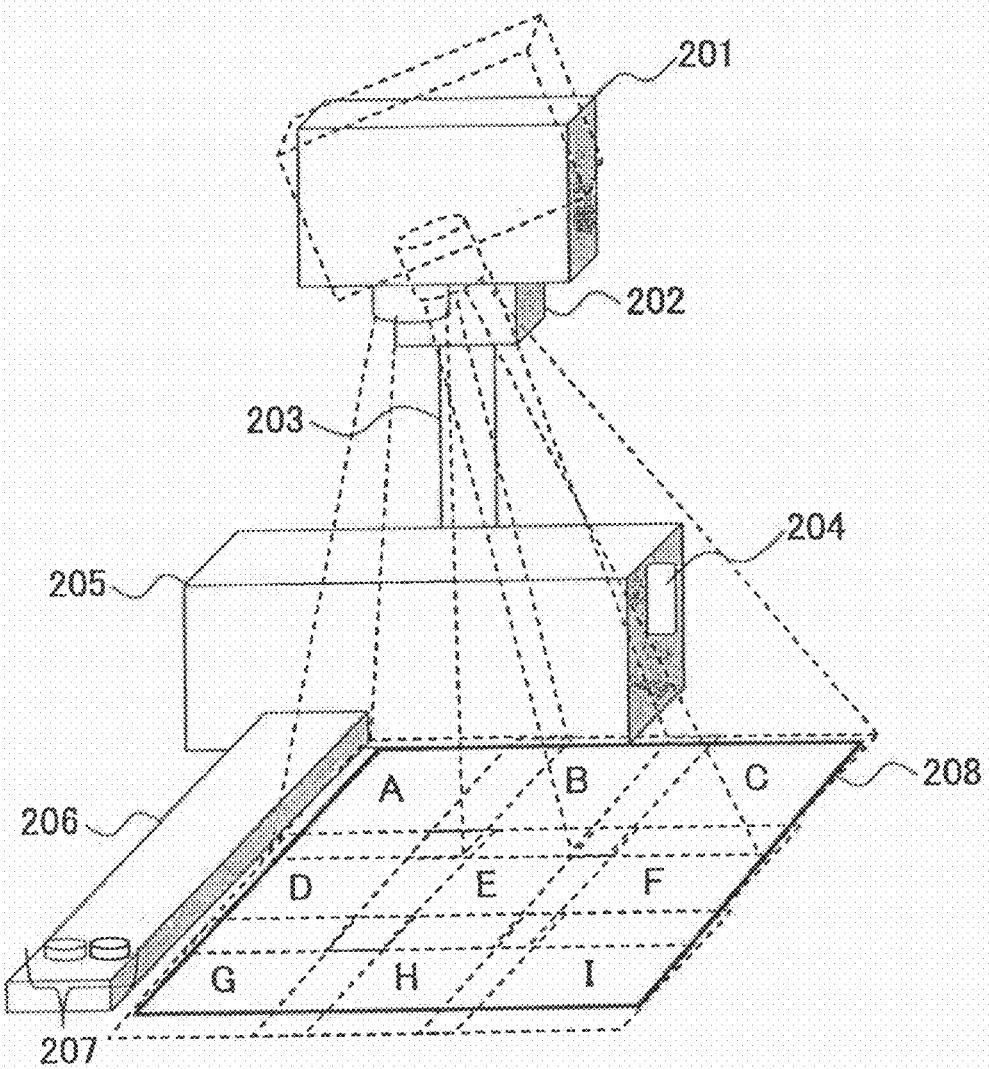
FIG. 13 is a perspective view of a configuration of the image capturing device according to the embodiment of the present invention.

FIG. 13 is a perspective view of a configuration of the image capturing device according to the embodiment of the present invention.

The image capturing device in FIG. 13 includes an image pick-up unit 201, a driving unit 202, a supporting column 203, an interface 204, a control unit 205, a stand 206, and two operational switches 207.

The driving unit 202 drives the image pick-up unit 201 to move as indicated by the dashed line. The supporting column 203 supports the image pick-up unit 201 and the driving unit 202. The control unit 205 controls operations of the image capturing device, and also supports the supporting column 203 and the stand 206. The control unit 205 corresponds to the "control unit", the "combination unit", and the "detection unit" in the claims. The operational switches 207 are used for operating the image capturing device. The regions A through I indicated by dashed lines on the paper document 208 are the partial regions, and the image capturing device picks up an image of one of the partial regions each time.

Figure 14:
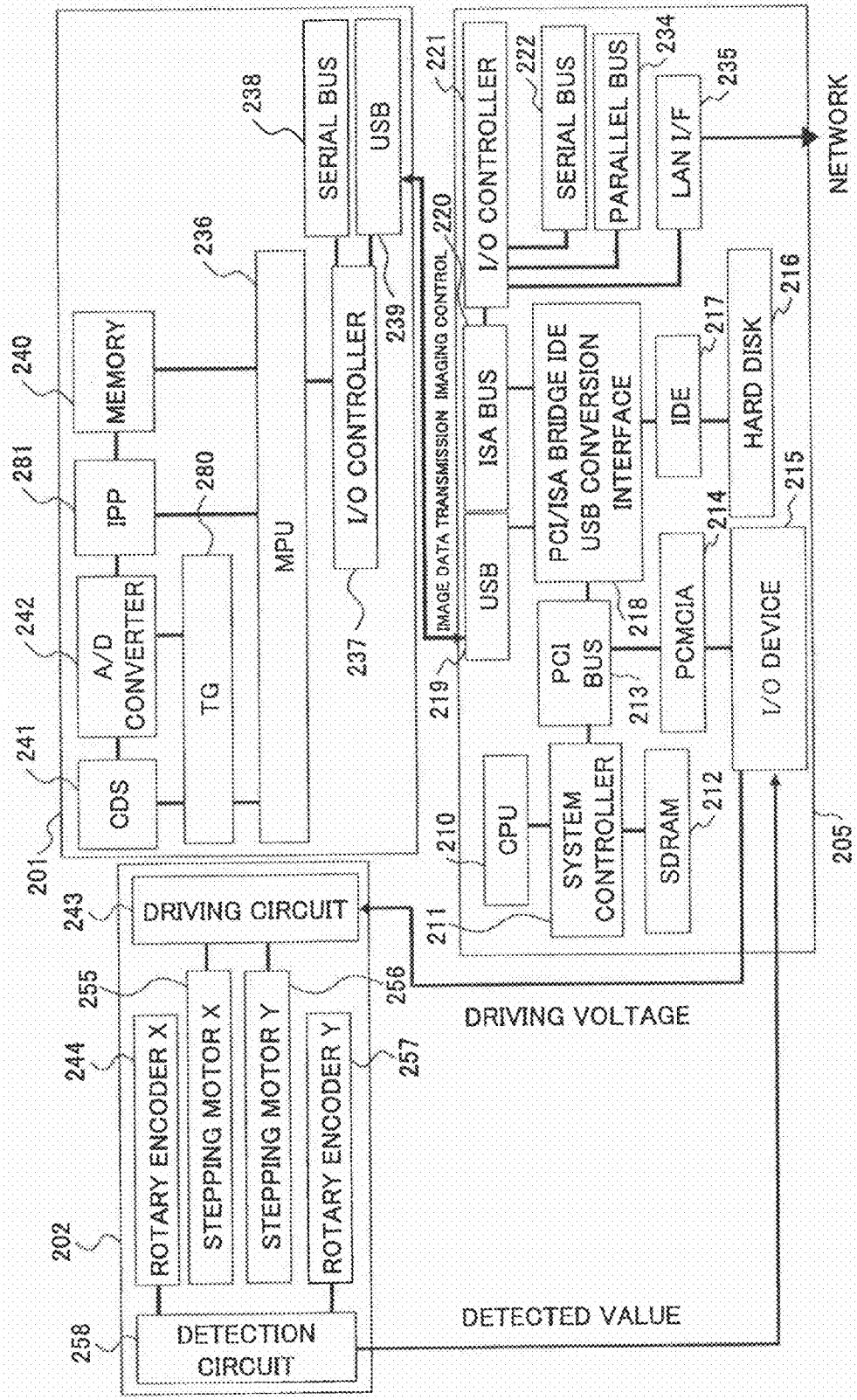
FIG. 14 is a block diagram showing configurations of the image pick-up unit 201, the driving unit 202, and the control unit 205.

FIG. 14 is a block diagram showing configurations of the image pick-up unit 201, the driving unit 202, and the control unit 205.

The control unit 205 is a small size board computer unit. It includes a system controller 211, a CPU (Central Processing Unit) 210, a SDRAM (Static Dynamic Random Access Memory) 212, a PCI (Peripheral Components Interconnects) bus 213, a PCMCIA (Personal Computer Memory Card International Association) 214, an I/O device 215, an IDE (Integrated Drive Electronics) 217, a PCI/ISA bridge IDE USB transformation interface 218, a USB (Universal Serial Bus) 219, a hard disk 216, an ISA (Industry Standard Architecture) bus 220, an I/O controller 221, a serial bus 222, a parallel bus 234, and a LAN (Local Area Network) interface 235.

The control unit 205 controls operations of the image pick-up unit 201, processes, edits, or records the images transmitted from the image pick-up unit 201, and communicates with external devices which are connected through the interface 204.

The interface 204 may be a versatile interface for personal computers, for example, RS-232C, USB, IEEE 1394, IrDA, or a network card.

In this embodiment, it is described that the image capturing device is controlled by the control unit 205, but the operations performed by the control unit 205 may also be performed by a MPU (Micro-Processor Unit) 236 in the image pick-up unit 201.

The driving unit 202 includes stepping motors 255, 256, and rotary encoders 244, 257 for detecting a rotation angle, a detection circuit 258, and a driving circuit 243.

If the rotation positions of the stepping motors 255, 256 are calibrated relative to a reference position, the rotary encoders 244, 257 can be omitted.

Figure 15:
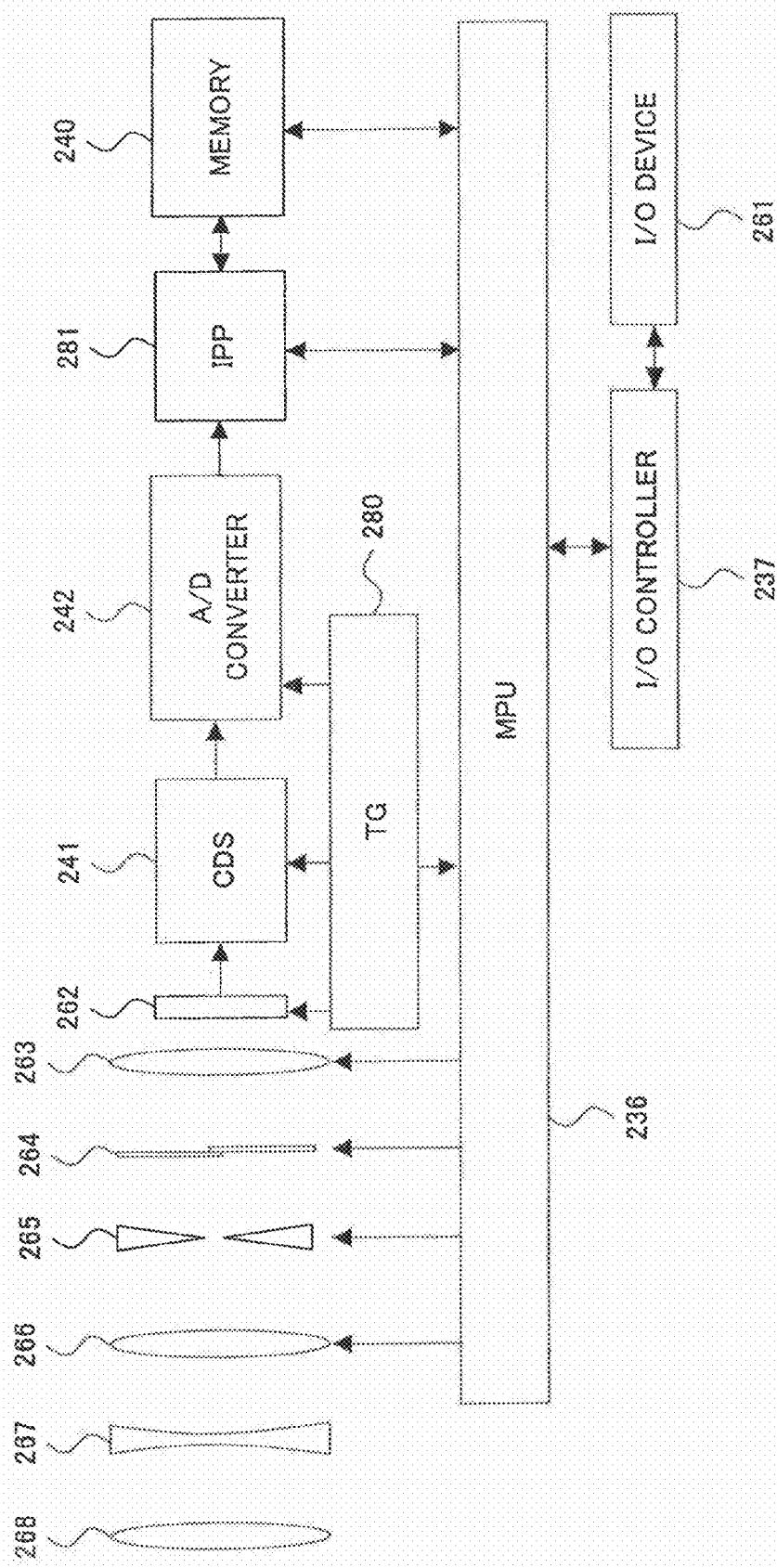
FIG. 15 is a diagram showing a configuration of the image pick-up unit 201.

FIG. 15 is a diagram showing a configuration of the image pick-up unit 201.

As illustrated in FIG. 15, the image pick-up unit 201 includes a CDS (Correlated Double Sampling) 241, an AD converter 242, an IPP (Image Pre-Processor) 281, a memory 240, a TG (Timing Generator) 280, a MPU 236, an I/O controller 237, an I/O device 261, fixed lenses 267, 268, a zoom lens 266, an aperture diaphragm 265, a shutter 264, a focus lens 263, and an image pick-up element 262.

Here, the I/O device 261 represents the serial bus 238 and the USB 239 in FIG. 14.

Light from an object (for example, a paper document on a piece of paper) passes through the fixed lenses 267, 268, the zoom lens 266, the aperture diaphragm 265, and the shutter 264 controls the period of exposure, and finally, an image of the object is formed on the image pick-up element 262.

Image signals from the image pick-up element 262 are sampled in the CDS 241, converted into digital signals in the AD converter 242. The TG 280 generates signals having specified timing, and the CDS 241 and the AD converter 242 operate according to the timings generated by the TG 280.

Afterward, the image signals are processed in the IPP 281, for example, for aperture correction, or image compression, and then are stored in the memory 240.

Operations of the above components of the image pick-up unit 201 are controlled by the MPU 236. The image pick-up unit 201 is connected with external devices through the I/O controller 237 and the I/O device 261 so as to input or output image data or transmit image pick-up control signals.

Next, with reference to FIG. 14 again, a description is made of the sequence of dividing an object into partial regions and capturing images of these partial regions.

First, the control unit 205 directs the I/O device 215 to apply a pulsed voltage to the driving circuit 243 of the driving unit 202, and feeds back the rotation angle detected by the detection circuit 258 until the rotation angle becomes a predetermined value.

Second, the control unit 205 directs the USB 219 to send image pick-up control signals to the USB 239 of the image pick-up unit 201.

Third, the above two steps are repeated if necessary. If image transfer is instructed, the images from the image pick-up unit 201 are transferred to the control unit 205 via the USB 239. The control unit 205 transmits the image to the communication network via the LAN interface 235.

Figure 16:
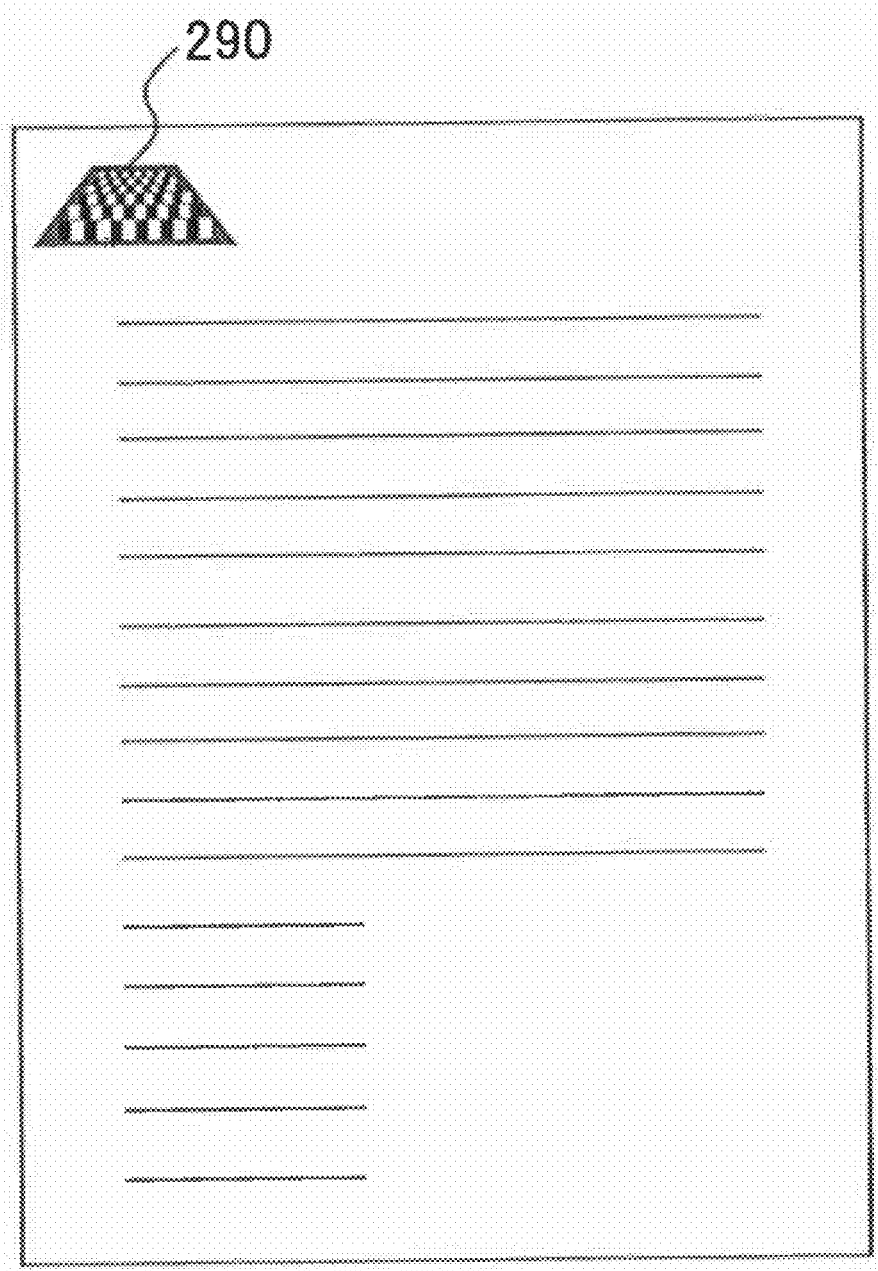
FIG. 16 is a view of an example of a paper document.

Fourth, the paper document 208 (as shown in FIG. 13) is illustrated in FIG. 16. As shown in FIG. 16, identification information, such as a two-dimensional code 290, is printed on the paper document 208.

The two-dimensional code 290, the so-called coded paper ID, is decoded by the element E 125. If the decoding is successful, the paper ID can be obtained. Then, data type, paper ID, and information on images are transmitted to the element K 131 as data in the XML form (eXtensible Markup Language).

Figure 17:
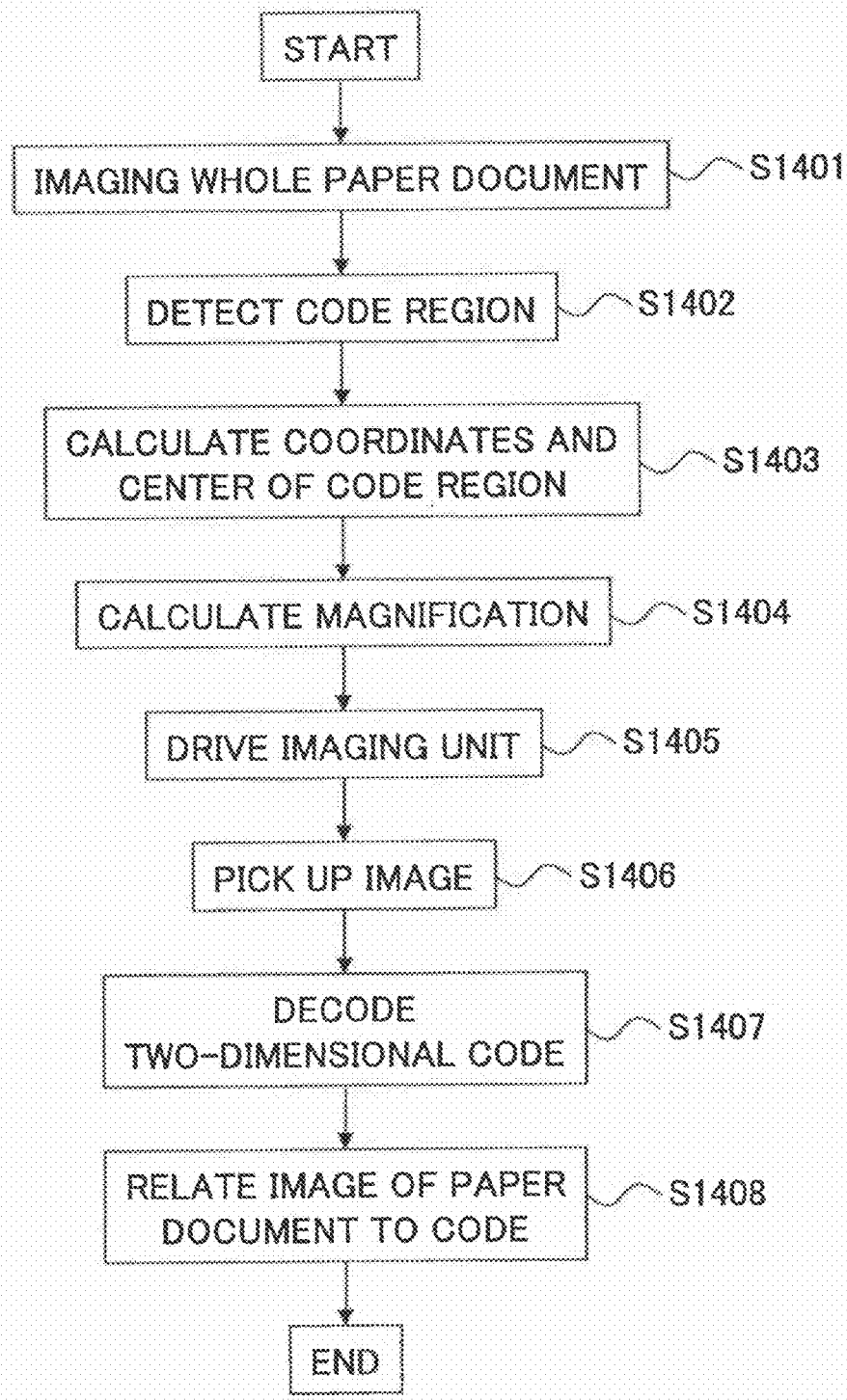
FIG. 17 is a flowchart showing operations of the image capturing device.

FIG. 17 is a flowchart showing operations of the image capturing device from capturing the image of the paper document to associating the captured image with the result of decoding the two-dimensional code.

In step S1401, the image capturing device adjusts the zoom lens so that the object (the paper document) and the imaging plane of the image pick-up unit 201 of the image capturing device are nearly parallel to each other, and in this state, the image capturing device shoots the whole paper document.

In step S1402, from the captured image of the whole paper document, the image capturing device detects a code region, that is, the region printed with the two-dimensional code.

In step S1403, the image capturing device calculates the coordinates and the center of the code region. In this step, if the code region is defined beforehand, this step can be completed at a high speed. Alternatively, instead the code region, the center of a circumscribed rectangle of the code region may be used.

In step S1404, using the coordinates and the center of the code region obtained above, the image capturing device calculates the magnification and movement caused by the driving unit 202 by linear operations so as to enlarge the image of the data identification information. Here, the movement caused by the driving unit 202 may be calculated in a pan direction and in a tilt direction with the optical axis to be the roll axis.

In step S1405, based on the calculation results, the driving unit 202 drives the image pick-up unit 201 to move.

In step S1406, the image pick-up unit 201 starts to pick up an image at the newly set position.

In step S1407, the element E 125 decodes the two-dimensional code in the captured image.

In step S1408, the image capturing device relates the image of the whole paper document to the decoded result.

Therefore, an image of the code region is obtained at a high resolution, and the paper ID of high confidence can be assigned to the image of the whole paper document.

Next, the image capturing process is described in detail.

As mentioned above, in the image capturing device, the driving unit 202 drives the image pick-up unit 201 to capturing images of partial regions of the paper document (it is referred to as "divisional image pick-up" below), and then the images of the partial regions of the paper document are combined into one image.

In the divisional image pick-up, as illustrated in FIG. 13, the driving unit 202 drives the image pick-up unit 201 to move as indicated by the dashed line in FIG. 13 to capture images of the partial regions A, B, and C.

Figure 18:
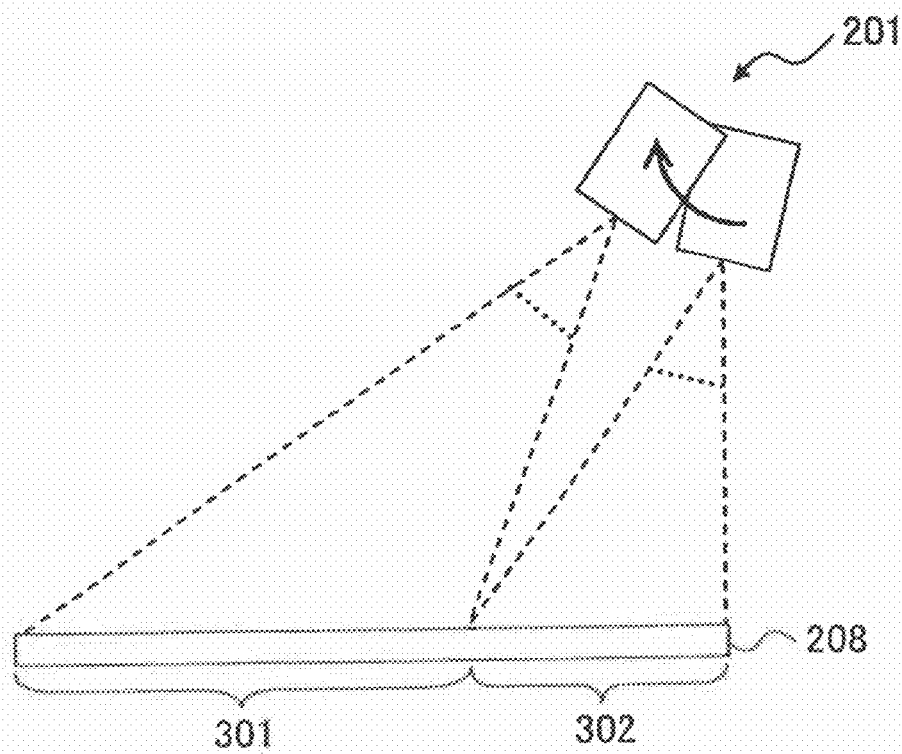
FIG. 18 is a schematic view showing movement of the image pick-up unit 201.

FIG. 18 is a schematic view showing movement of the image pick-up unit 201.

As illustrated in FIG. 18, the image pick-up unit 201 is driven to swing up and down (rotate) to cover all of the regions A through I.

In FIG. 18, the image pick-up unit 201 is moved to shoot the paper document 208, for example, regions 301 and 302 of the paper document 208.

As mentioned above, in order to capture a high resolution image of the object, the scope (or angular region) covered by the image pick-up unit 201 each time should be made as small as possible so as to shoot at more positions. After shooting, all of the regions of the object are included in the obtained divisional images.

Figure 19:
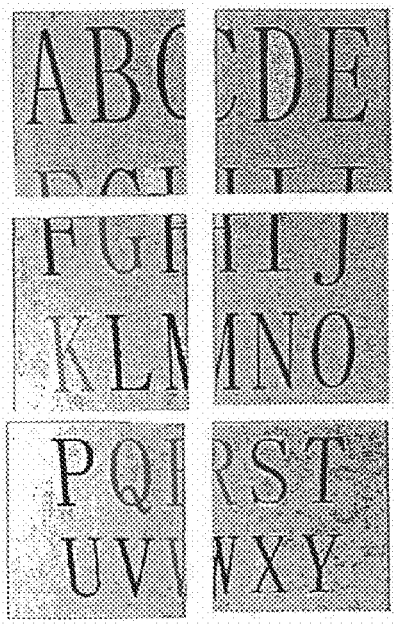
FIG. 19 is a view for schematically showing divisional images.

FIG. 19 is a view for schematically showing the divisional images.

In FIG. 19, there are six divisional images of alphabet, and it is clear that the letters at lower positions become smaller.

Figure 20:
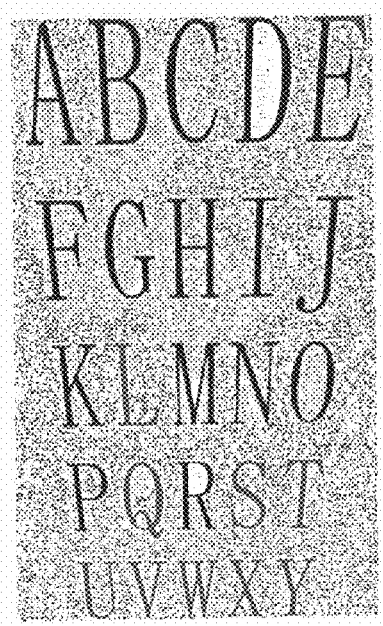
FIG. 20 is a view for schematically showing combination of the divisional images.

FIG. 20 is a view for schematically showing combination of the divisional images.

The image shown in FIG. 20 is obtained by combining the six divisional images in FIG. 19.

The distortion of the final image shown in FIG. 20 occurs not only when combining divisional images by the way described above, but also occurs when shooting the whole paper document at a time without image division.

FIG. 21 is a view showing a corrected image.

The image in FIG. 21 is obtained by correcting the distortion and eliminating noise in the image shown in FIG. 20.

To perform such correction, a reference image is defined, which is obtained by shooting the object with the image pick-up unit 201 being right in front of the object, and a projecting transformation matrix for transformation from the reference image to other images is found. With this matrix, the other images are re-arranged.

For simplicity, the correction is described with reference to FIG. 18 for picking up images of the two regions 301 and 302.

FIG. 64 shows equations (1) through (4) used in distortion correction.

A point in the region 301 and a point in the region 302 can be represented by the following equation (1).

If the surface of the object is a plane, the point in the region 301 and the point in the region 302 satisfy the following equation (2) and equation (3).

In equation (2) and equation (3), the quantity h can be given by a matrix in equation (4).

The matrix in equation (4) is a projecting transformation matrix, and when two shooting positions are the same, this relation does not change. Thus, quantities h1 through h8 may be calculated from given groups (u1, v1), (u2, v2).

With equations (1), (2), and (3), points in the region 302 are related to points in the region 301. With the region 301 as a reference and using the obtained correspondence relation, the pixels of the image of the region 302 can be mapped to the image of the region 301. If there are three or more regions on the paper document, they are mapped in a similar way.

The projecting transformation matrices are found first, and with the projecting transformation matrices, the images of regions other than the reference region are transformed to front-side images, that is, an image of a region right in front of the image pick-up unit 201. In this way, the front-side images are obtained, and by combining these transformed front-side images, an image without distortion as shown in FIG. 21 can be obtained.

In the above, the configuration and operation of the image capturing device according to the embodiment of the present invention are described. Below, specific examples of the image capturing device are described.

Figure 22:
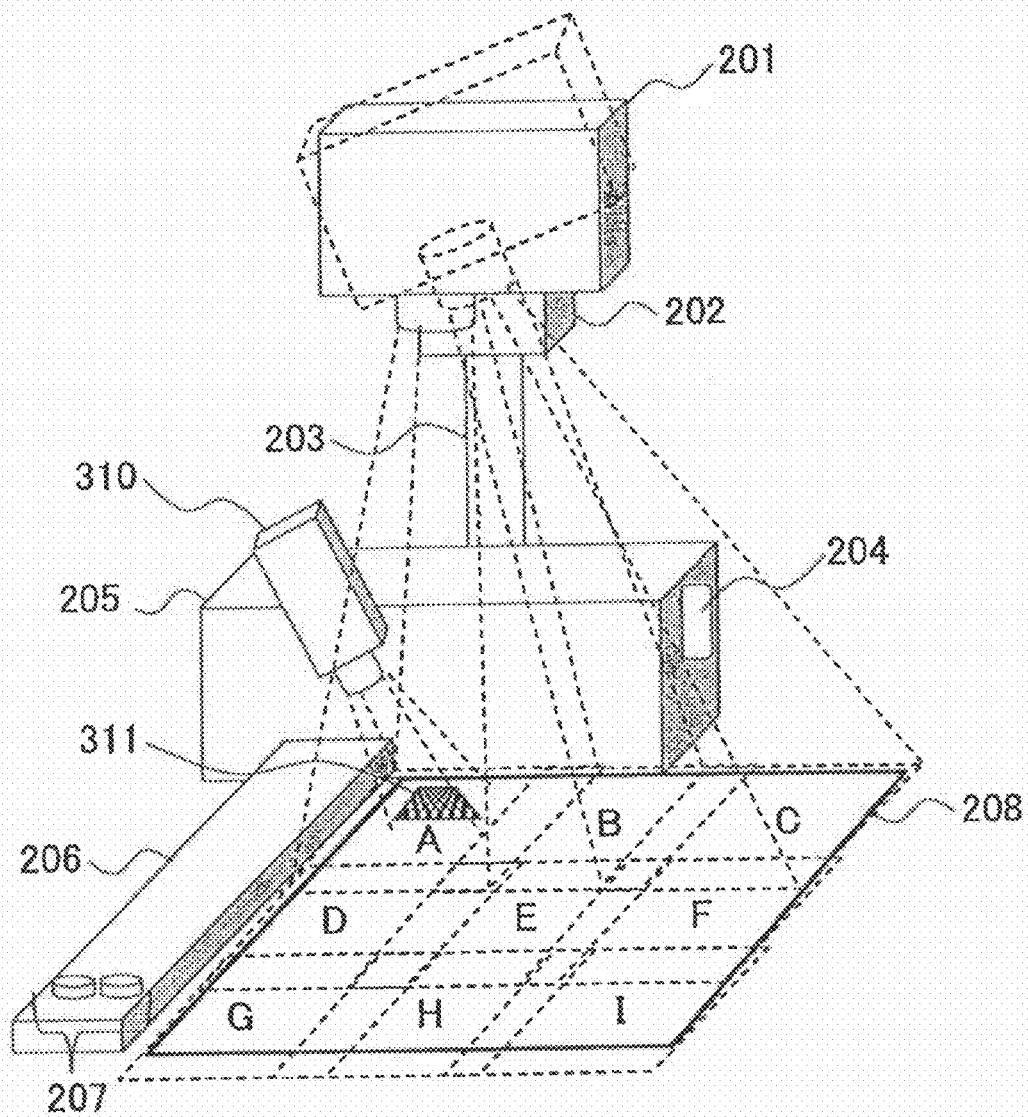
FIG. 22 is a perspective view showing an example of the image capturing device.

FIG. 22 is a perspective view showing an example of the image capturing device.

As illustrated in FIG. 22, in the image capturing device, an image pick-up unit 310 is provided for reading a code, such as the two-dimensional code, in addition to the image pick-up unit 201 for reading the paper document in the configuration shown in FIG. 13.

Because the image pick-up unit 310 is just for capturing an image of the small code region, the image pick-up unit 310 may be a compact image input device much cheaper than the image pick-up unit 201.

In addition, decoding results of the code 311 in the image captured by the image pick-up unit 310 may be stored in the image capturing device in correspondence to the image captured by the image pick-up unit 201.

Figure 23:
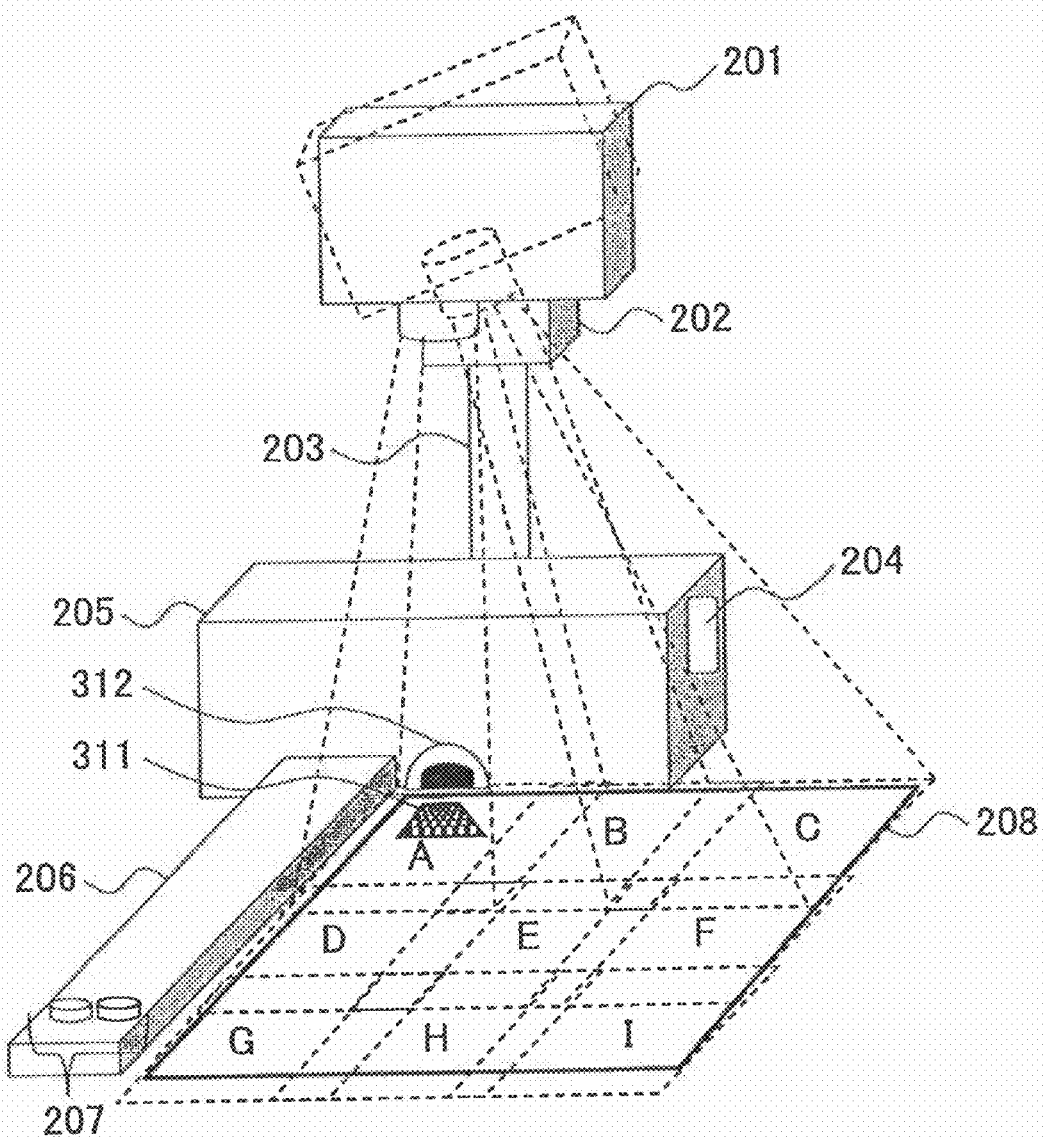
FIG. 23 is a perspective view showing another example of the image capturing device.

FIG. 23 is a perspective view showing another example of the image capturing device.

As illustrated in FIG. 23, in the image capturing device, instead of the image pick-up unit 310 in FIG. 22, a paper ID reader 312 is provided for reading the two-dimensional code. The paper ID reader 312 may be an image pick-up unit used in a bar code reader.

Figure 24:
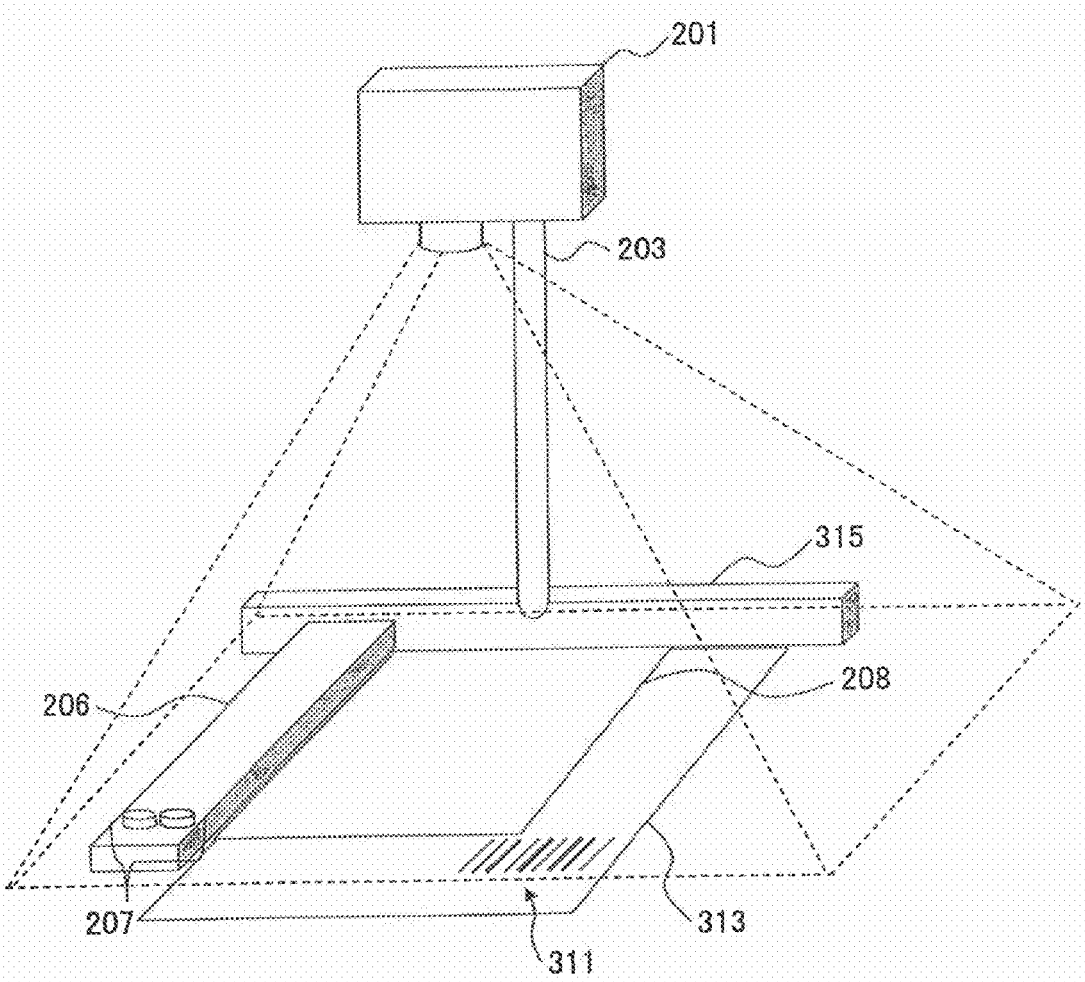
FIG. 24 is a perspective view showing another example of the image capturing device.

FIG. 24 is a perspective view showing another example of the image capturing device.

In the image capturing device illustrated in FIG. 24, the code 311 is provided on an underlying sheet 313 of the paper document 208. The supporting post 203 is on a stand 315.

With this configuration, code can be assigned to paper without a code. By using a printer, paper can be printed again by assigning the code.

Figure 25:
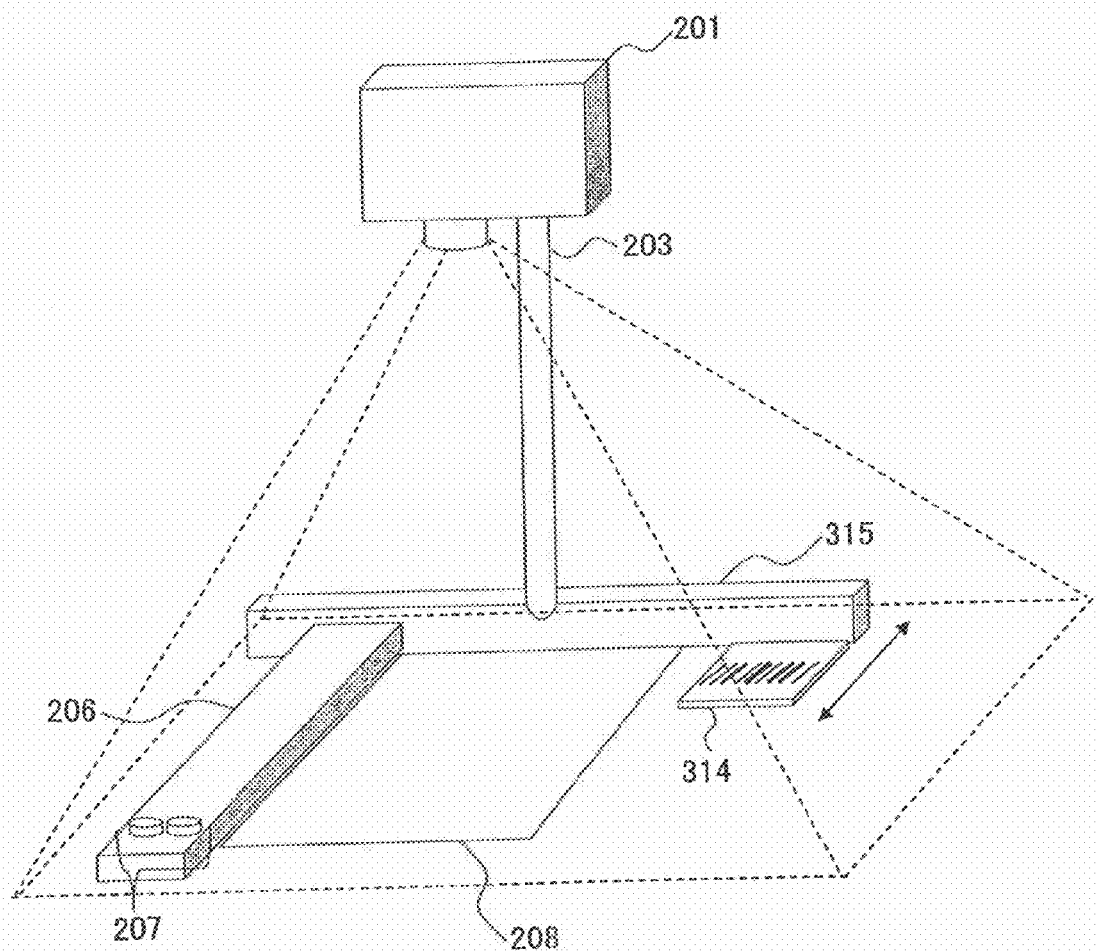
FIG. 25 is a perspective view showing another example of the image capturing device.

FIG. 25 is a perspective view showing another example of the image capturing device.

In the image capturing device illustrated in FIG. 25, a code 314 is provided on a plate member of the stand 315. The plate member can be put in the stand 315, and the plate member corresponds to the coded paper ID display unit as defined in the claims.

Figure 26:
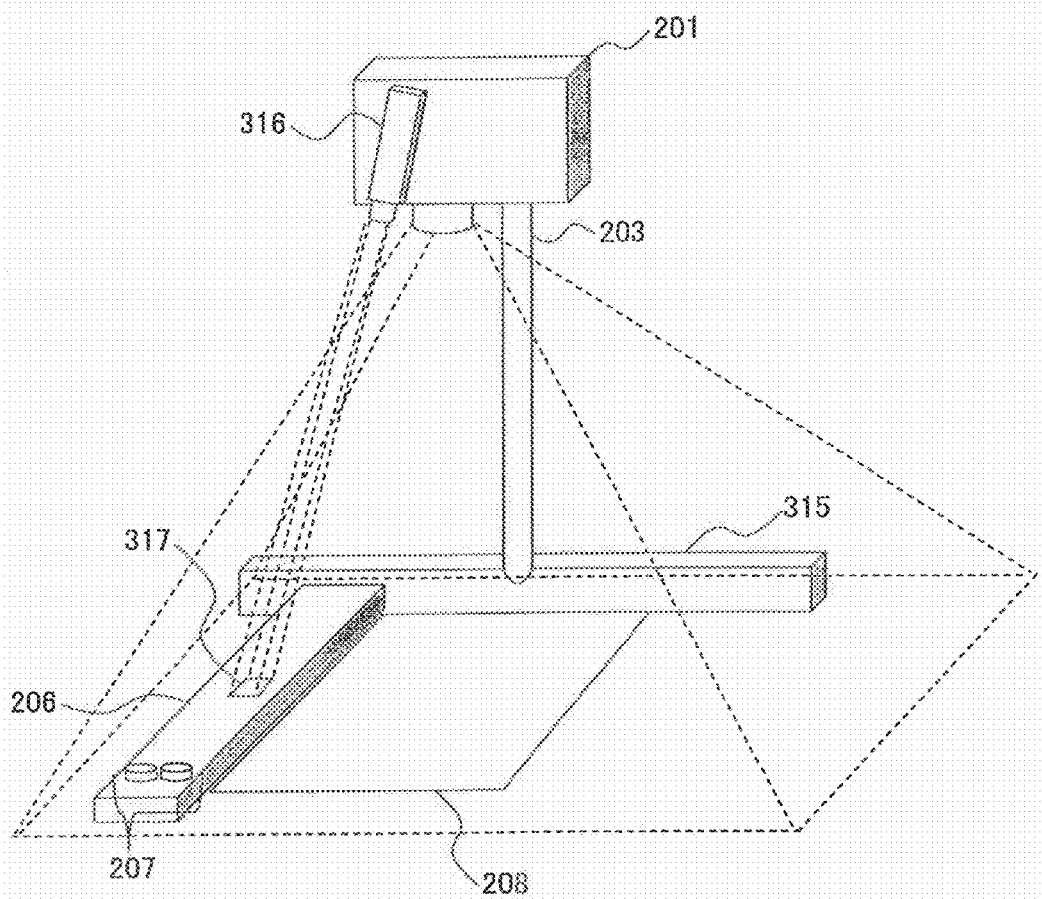
FIG. 26 is a perspective view showing another example of the image capturing device.

FIG. 26 is a perspective view showing another example of the image capturing device.

In the image capturing device illustrated in FIG. 26, a projecting unit 316 is attached to the image pick-up unit 201, and a code 317 can be projected in the indicated projecting region. Users can project the code 317 as desired. The code 317 may be editable digital data.

The projecting unit 316 may also be installed at other positions instead that shown in FIG. 26. The projecting unit 316 may be an optical projecting device, for example, the projecting unit 316 may be a typical liquid crystal projector including a light source, a condensing lens, mirrors, a liquid panel, and a projecting lens, or a DLP (Digital Light Processing) projector using DMD (Digital Mirror Device). Preferably, the projecting unit 316 is a compact one.

Figure 27:
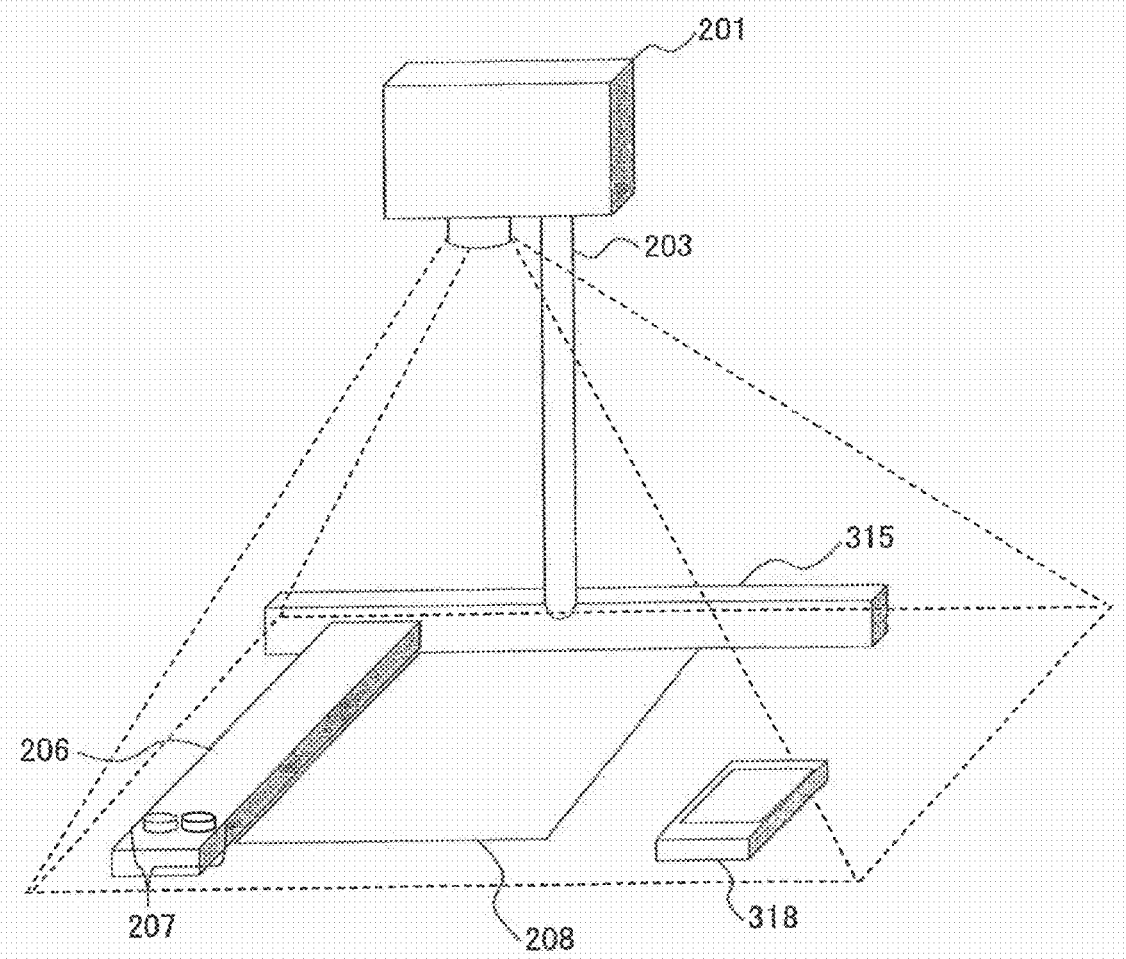
FIG. 27 is a perspective view showing another example of the image capturing device.

FIG. 27 is a perspective view showing another example of the image capturing device.

In the image capturing device illustrated in FIG. 27, a portable terminal 318 having a display, such as a PDA (Personal Digital Assistant) having a liquid crystal display, is provided in the shooting region as indicated by the dashed lines. The code can be displayed by the portable terminal 318, and thereby, the code associated with the paper document to be processed can be assigned to the paper document. The portable terminal 318 corresponds to the display unit in the claims.

It should be noted that a driving unit is not indispensable in the configurations shown in FIG. 24 through FIG. 27.

In the above, the element D 124 is embodied to be an image capturing device. Below, a description is made of the element D 124 embodied to be a written information input device.

Figure 28:
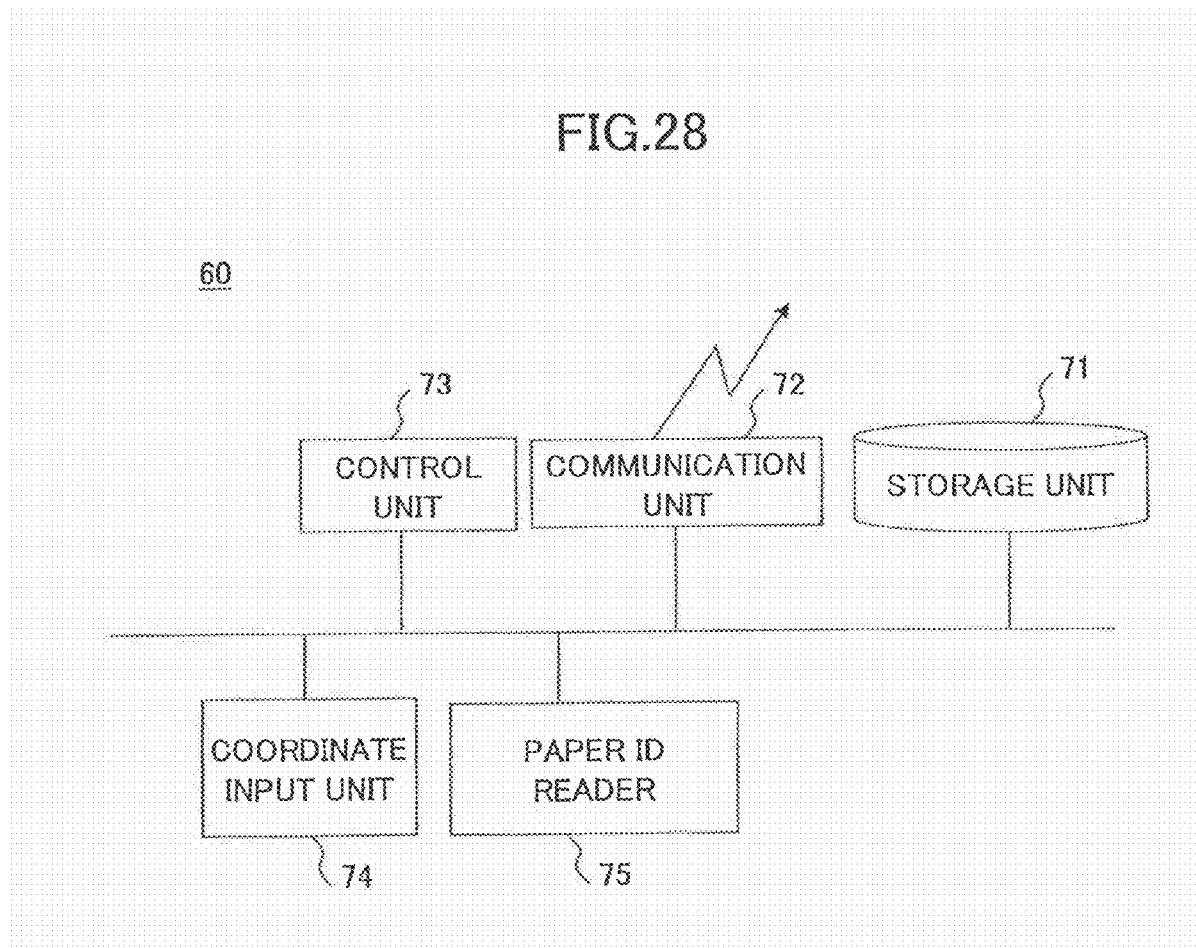
FIG. 28 is a block diagram showing a written information input device 60.

FIG. 28 is a block diagram of a written information input device 60.

The written information input device 60 includes a coordinate input unit 74 for acquiring written information on paper, a paper ID reader 75 for identifying digital information associated with information printed on paper, a storage unit 71 for storing the obtained information, a communication unit 72 for transmitting the obtained and stored information to a computer, and a control unit 73 for controlling the coordinate input unit 74, the paper ID reader 75, the storage unit 71, and the communication unit 72.

The coordinate input unit 74 may be a digitizer, which successively obtains coordinates of hand writing. It is known that some digitizers work by electromagnetic induction, and some others work in the same way as an ultrasonic distance meter. In either of them, a sensor and a dedicated pen are used to detect writing movement on paper to measure the written information and writing coordinates, which are coordinates of the track of writing on paper. A collection of the coordinates measured in this way constitutes the written information.

The end of the dedicated pen may be a true pen able to write on paper, and it is preferable that a real writing track appears on paper while the writing coordinates are measured electrically.

The paper ID reader 75 is able to read and decode a coded paper ID, for example, printed on paper by a printer. The paper ID reader 75 may be a two-dimensional code reader, or a one-dimensional bar-code reader, which are well known. If the two-dimensional code reader is used as the paper ID reader 75, and the well known QR code (registered trademark) is used for coding, the paper ID reader 75 can identify at most (decimal) 4296 pieces of information. This capacity is sufficiently large for identifying documents printed by users in a usual way.

The storage unit 71 may be a hard disk, or a nonvolatile memory, or a detachable memory such as a Compact Flash disk (registered trademark) for storing the writing coordinates, or printing conditions information, or electronic document information obtained by the paper ID reader 75.

The communication unit 72 transmits the stored information to a computer by communication networks such as Ethernet (registered trademark) or radio LAN, or by USB, bluetooth, or serial connection technologies. The communication unit 72 may also be omitted, for example, if the storage unit 71 is directly connected to the computer and able to directly communicate with the computer.

The storage unit 71, the communication unit 72, the control unit 73, the coordinate input unit 74, and the paper ID reader 75 and others may be integrated together, or be separate from each other. When they are integrated together, by using a battery to power the written information input device 60, the device 60 is portable and can be carried to any place. It is preferable to make the written information input device 60 monolithic and portable, and in this way, writing on printed paper is not restricted on desks in one's office.

Figure 29:
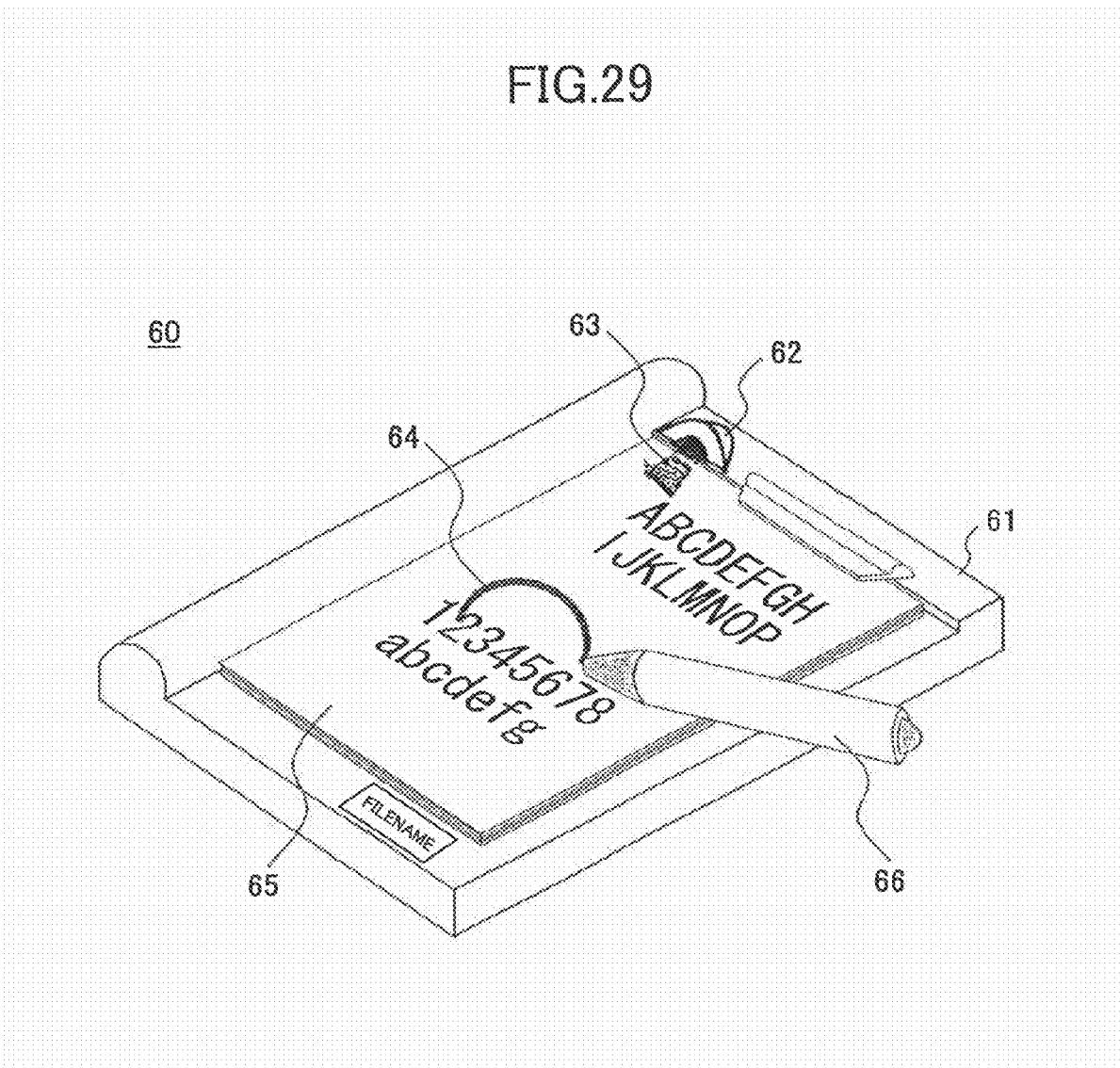
FIG. 29 is a perspective view showing an appearance of the written information input device 60.

FIG. 29 is a perspective view showing the appearance of the written information input device 60.

In FIG. 29, the paper ID reader 75 is implemented to be a two-dimensional code reader 62. Text 65 is printed on a piece of paper set on the written information input device 60. The paper ID 63 is also printed on the paper in advance.

A coordinate acquiring unit 61 is implemented to be an ultrasonic digitizer. By using a dedicated pen 66, the actual writing tracks appear on the paper while coordinates of the writing tracks are electrically measured.

Figure 30:
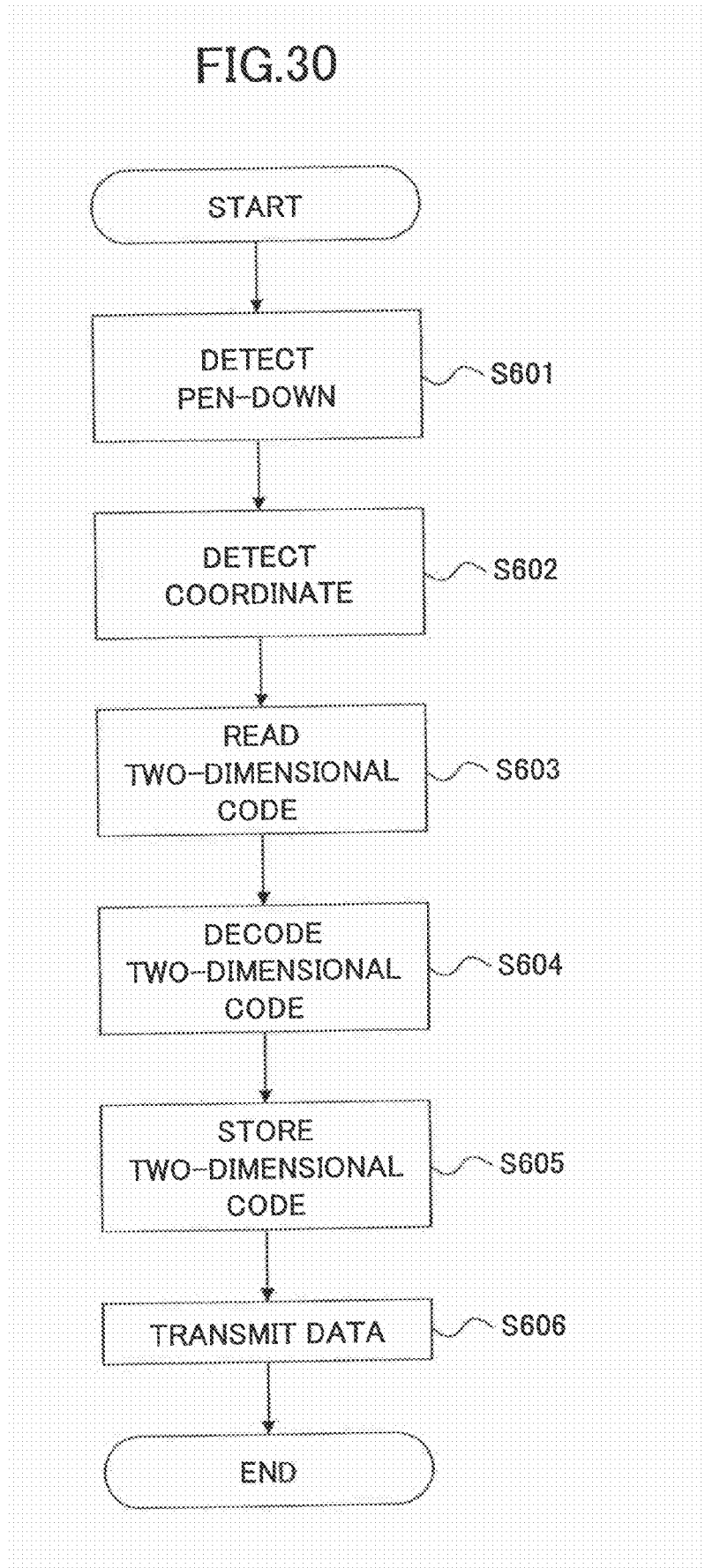
FIG. 30 is a flowchart showing operations of a portable digitizer as an implement of the written information input device 60.

FIG. 30 is a flowchart showing operations of a portable digitizer as an implement of the written information input device 60.

In step S601, when writing starts with the dedicated pen, the written information input device 60 detects contact of the end of the pen on the paper (this is called pen-down).

In step S602, the dedicated pen reads the writing coordinates by detecting the pen-down.

In step S603, the two-dimensional code reader in the written information input device 60 reads the two-dimensional code while the dedicated pen is reading the writing coordinates or while the dedicated pen is being in contact with the paper.

In step S604, the written information input device 60 decodes the two-dimensional code to obtain the paper ID.

In step S605, such obtained writing coordinates and the paper ID are then stored in the storage unit.

In step S606, the communication unit transmits the stored information to a computer when necessary.

FIG. 31 is a table showing data stored and transmitted by the written information input device 60.

Items shown in FIG. 31 are "device identifier", "paper ID", "writing X coordinate", "writing Y coordinate", and "Pen Up/Down".

The label "device identifier" represents the number for identifying different written information input devices 60. The label "paper ID" represents the paper ID read by the written information input device 60. The labels "writing X coordinate" and "writing Y coordinate" represent the X and Y coordinates of the written information. The label "Pen Up/Down" represents up-movement or down-movement of the dedicated pen.

The writing coordinates and the paper ID are transmitted in such a form.

Below, a description is made of the element D 124 embodied to be an image input device. In the image input device, a scanner is used to capture an electric image of the paper document after the writing down on the paper, and the data are transmitted to the element E 125.

Figure 32:
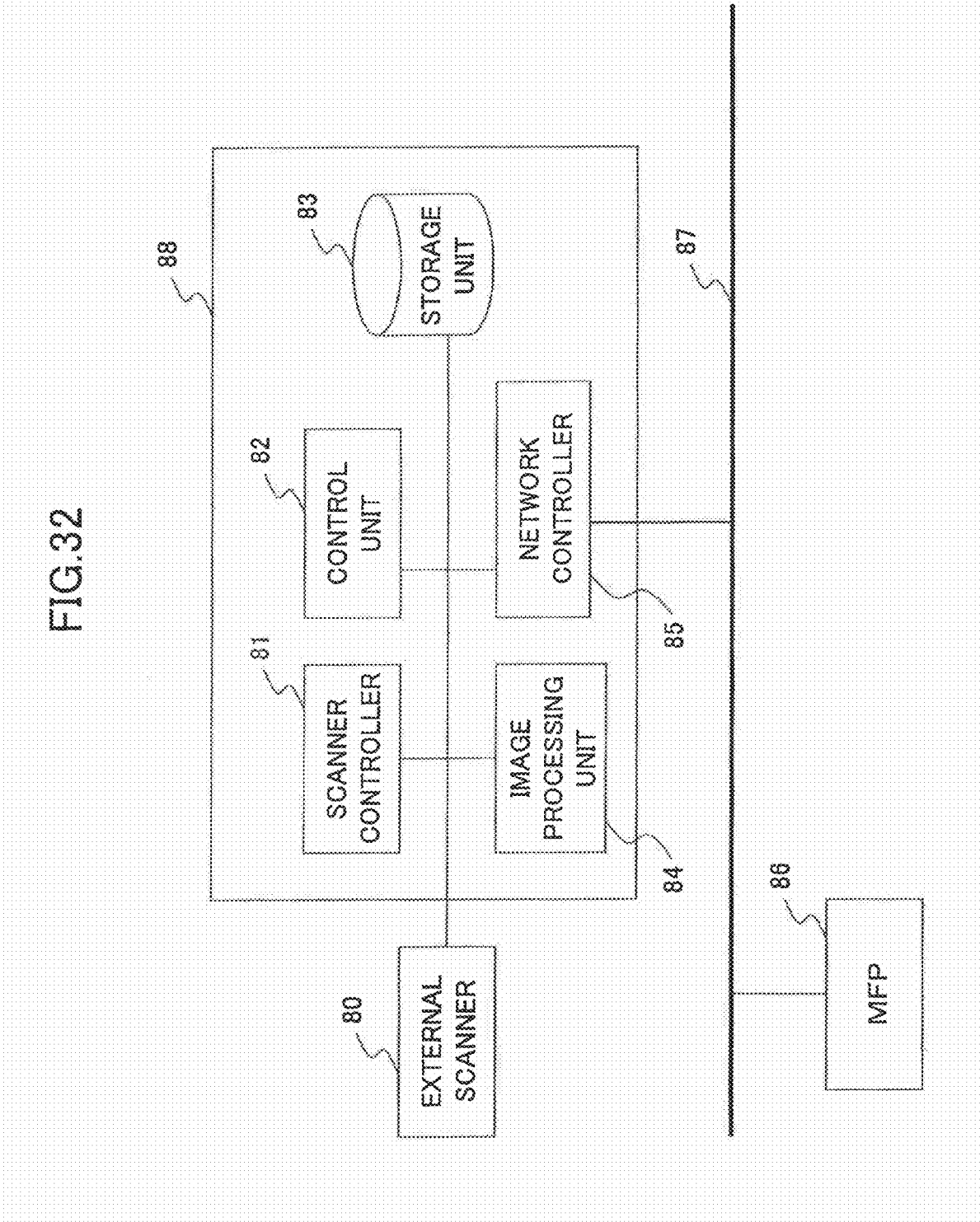
FIG. 32 is a block diagram showing an image input device 88.

FIG. 32 is a block diagram showing an image input device 88.

The image input device 88 includes a control unit 82 for controlling components of the device 88, a storage unit 83 for storing programs or image data, a scanner controller 81 for communicating with and controlling an external scanner 80 or a MFP 86, an image processing unit 84 for processing image data, and a network controller 85 for communicating with and controlling an external communication network.

A scanner 80 is directly connected to the image input device 88, or a MFP 86 is connected to the image input device 88 via a communication network 87. From the scanner 80 or the MFP 86, images can be input to the image input device 88.

Figure 33:
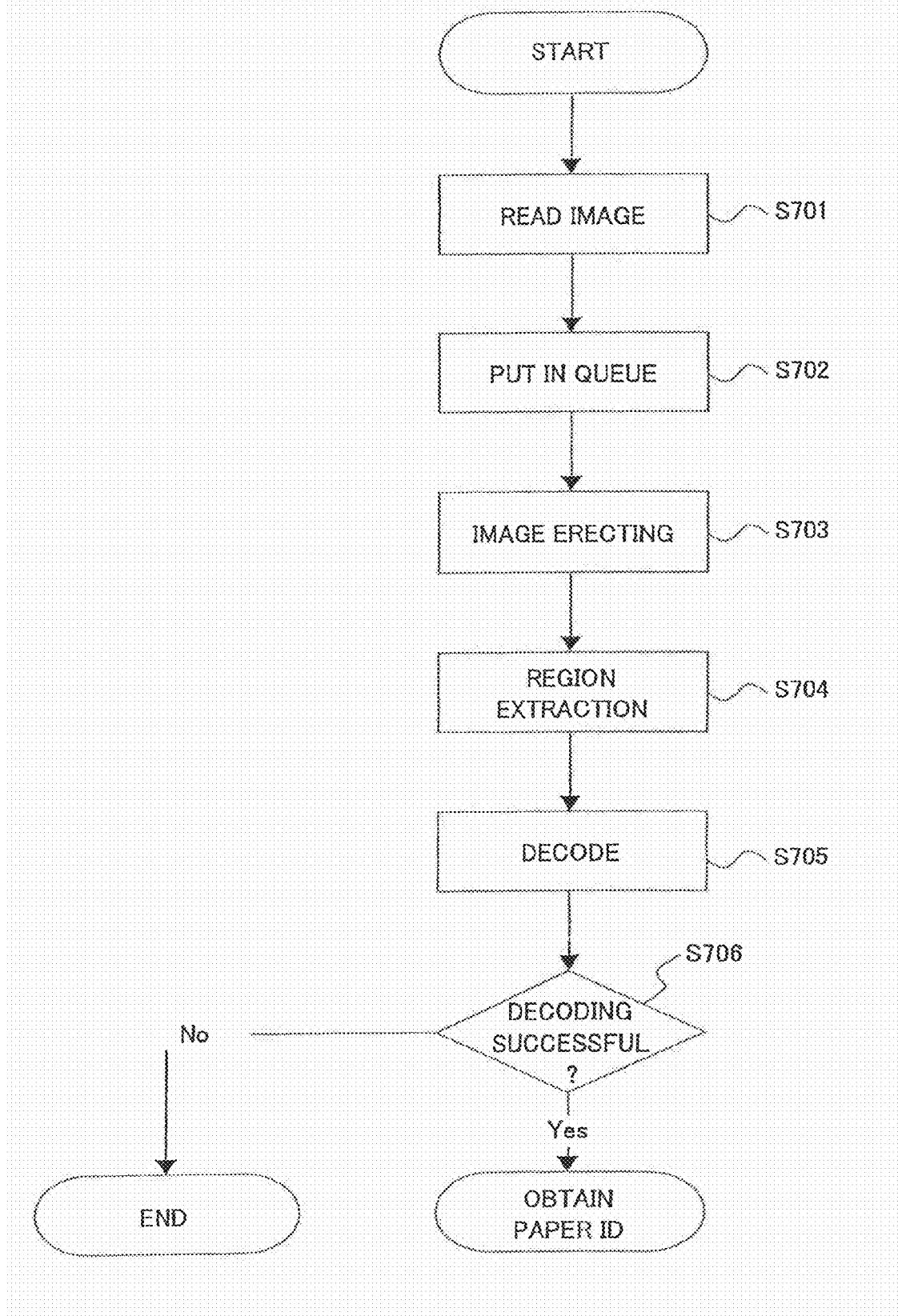
FIG. 33 is flowchart showing the operation of the image input device 88.

FIG. 33 is flowchart showing the operation of the image input device 88. In the operation shown in FIG. 33, the image input device 88 acquires coordinates and transmits data to the element K 131.

In step S701, the image input device 88 reads an image. Specifically, the scanner 80 or the MFP 86 reads an image of the paper document after a user finished writing on the paper. For example, the conditions for image reading are a 600 dpi, binary (black and white) image. Usually, a scanner has a function to convert an image into a binary image.

In step S702, the obtained image of the paper document is stored as an image file in a specified folder of the storage unit 83, and is put in a queue for the next processing.

The scanner controller 81 controls storing the obtained image of the paper document as an image file in a specified folder of the storage unit 83. When a button on the scanner 80 or the MFP 86 is pressed, the scanner controller 81 detects that the image is to be transmitted from the scanner 80 or the MFP 86, and stores the transmitted data in a specified folder of the storage unit 83.

In step S703, the image processing unit 84 monitors the folder of the storage unit 83, in which the data transmitted from the scanner 80 or the MFP 86 are stored, and image erecting processing is performed sequentially from the first image in the queue.

In step S704, the image processing unit 84 extracts a region including black pixels surrounded by white pixels (region extraction processing).

In step S705, the image processing unit 84 decodes image data in the extracted region.

In step S706, the image processing unit 84 determines whether the decoding is successful.

If the decoding is successful, the image processing unit 84 obtains the paper ID, and then finishes the routine.

If the decoding is not successful, the image processing unit 84 finishes the routine.

The flowchart in FIG. 33 illustrates operations corresponding to the step of acquiring information as defined in the claims. The paper ID obtained in this way is converted into a document ID and a process ID by using a management table as described below. This conversion process corresponds to the step of "converting the sheet ID to the document ID and the process ID" as defined in the claims.

In addition, in step S702, the image data are put in a queue for next processing. The reason of using a queue is that when a large number of image files are input by using ADF (Auto Document Feeder) and these image files are processed simultaneously, the work load of the image processing unit 84 increases, thereby the operations of the image processing unit 84 may become unstable, and the operation speed may decrease.

The image erecting processing in step S703 is for erecting the images read by the scanner, whose orientation is unknown. This processing is needed because in the next step S704, the processing of region selection is for selecting a region in an erected image.

Figure 34:
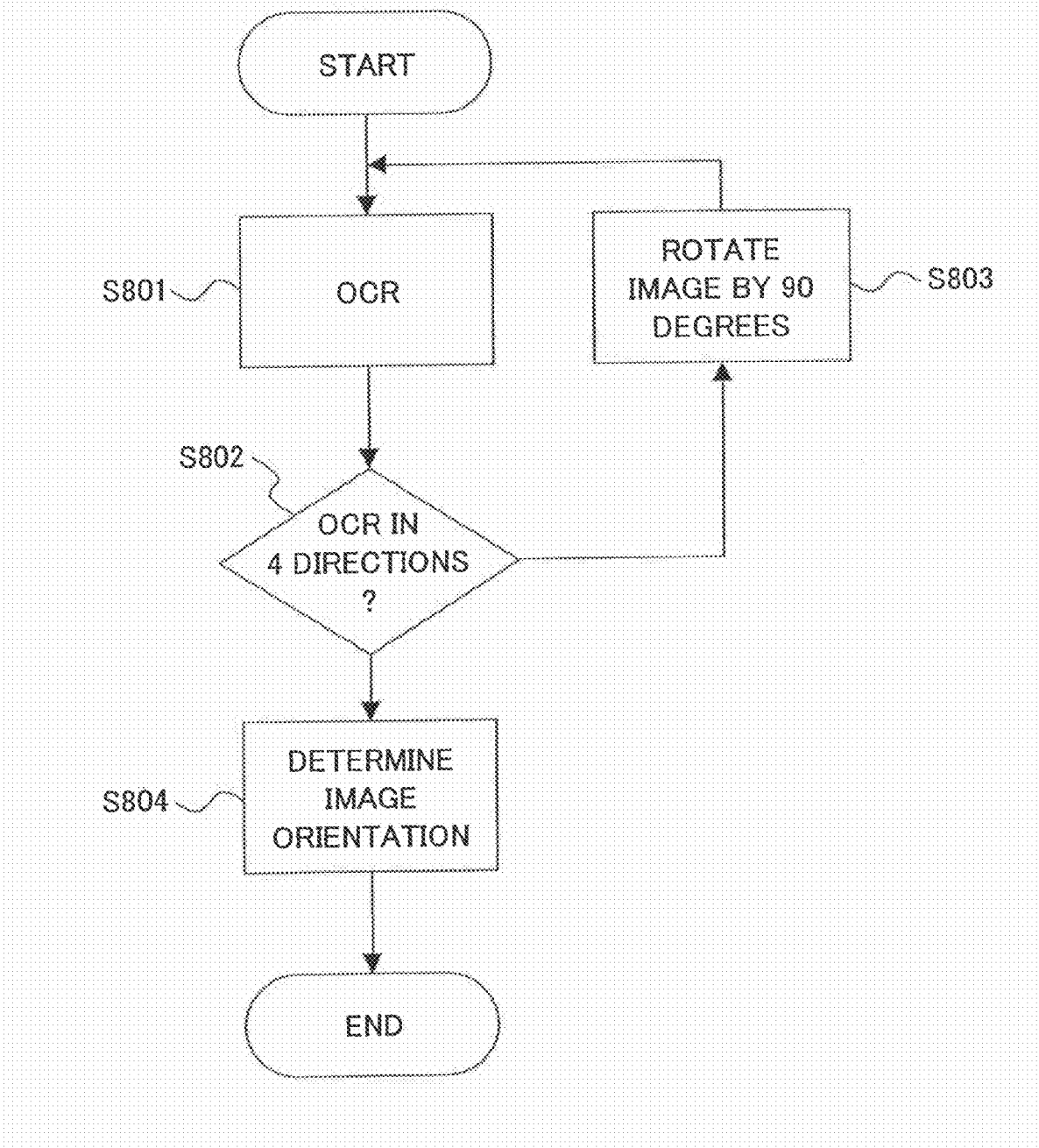
FIG. 34 is a flowchart showing the image erecting processing.

FIG. 34 is a flowchart showing the image erecting processing.

In step S801, OCR is performed for the images placed in the queue in order, and the OCR results are stored.

In the loop including step S802, S803, and S801, OCR is performed to rotate the image by 90 degrees each time, and the results are also stored.

In step S804, after the OCR treatment of rotating the image by 90 degrees each time, the image orientation is determined by using the OCR confidence, which is a measure of OCR results. The OCR confidence corresponds to the likelihood of the recognized characters, and the OCR confidence used in determining the image orientation is an average of the character OCR confidence. A direction, in which the average OCR confidence is maximum, is determined to be the erecting direction the image.

After this image erecting processing, in step S704 in FIG. 33, region extraction is performed for detecting and decoding the two-dimensional code including the paper ID. In the region extraction processing, black pixels enclosed by white pixels in the image are detected.

Figure 35:
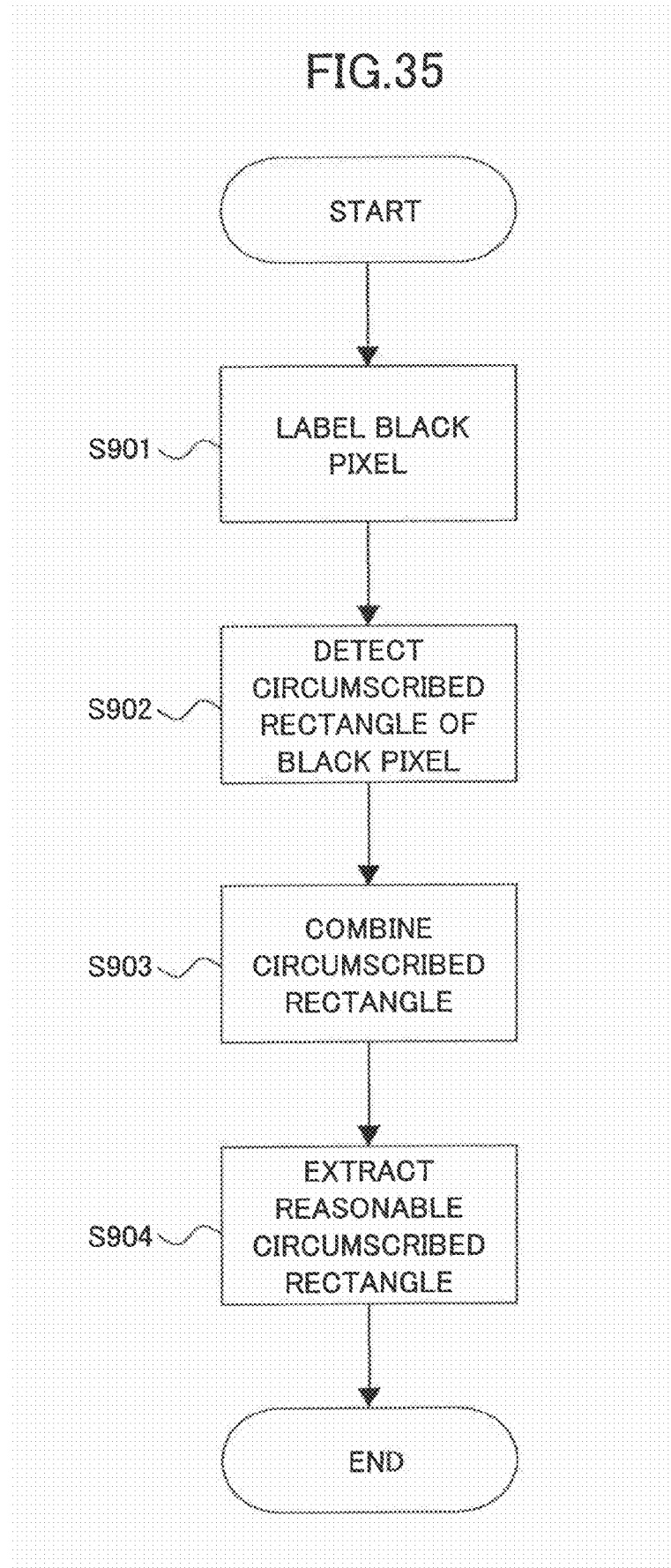
FIG. 35 is a flowchart showing the region extraction processing.

FIG. 35 is a flowchart showing the region extraction processing.

In step S901, adjacent black pixels are labeled by scanning the pixels from an origin located at the left-upper corner of the image. When labeling a target pixel, if the pixels at the left-upper, upper, and left positions relative to the target pixel are all white pixels, and the target pixel is a black pixel, a new label is assigned to the target pixel.

If the surrounding pixels are not all white pixels, the target pixel is assigned the label of the black pixel at either the left-upper, or the upper, or the left position relative to the target pixel.

Figures 36, 37:
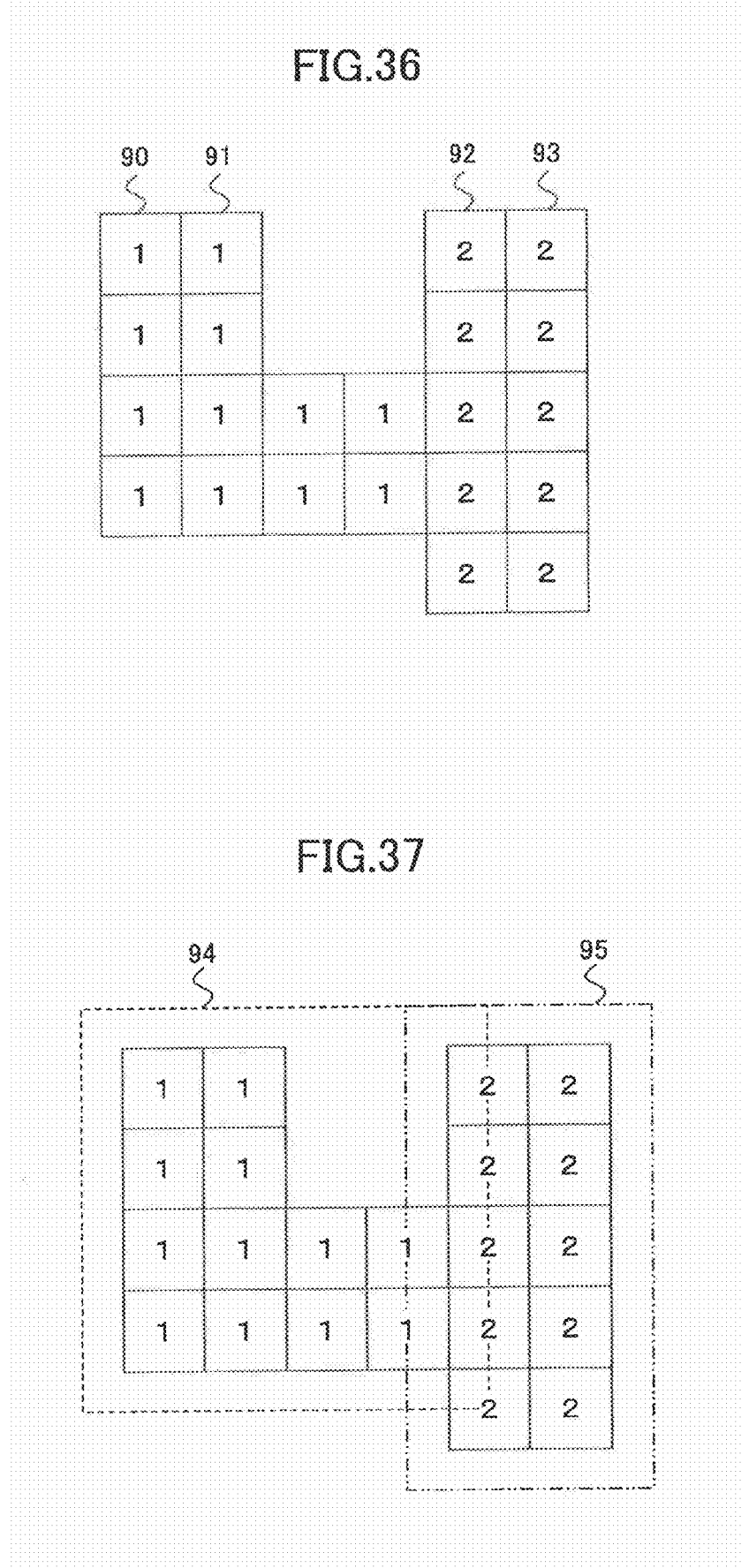

FIG. 36 is a diagram for schematically showing the operation of labeling the black pixels.

In FIG. 36, it is assumed that each of the squares having a figure therein represents a black pixel. Below, pixels 90, 91, 92, and 93 are used to describe the pixel labeling process. Here, for example, pixels 90, 91, 92, and 93 are scanned sequentially.

First, considering the pixel 90, because the pixels at the left-upper, upper, and left positions relative to the pixel 90 are all white pixels, and the target pixel 90 is a black pixel, a label "1" is given to the pixel 90.

Next, considering the pixel 91, the pixels at the left-upper and upper positions relative to the pixel 91 are white pixels, but the pixel 90 at the left position relative to the pixel 91 is not a white pixel, therefore, the target pixel 91 is given the label of a black pixel at either the left-upper, or upper, or left position relative to the target pixel 91. For example, the label "1" of the pixel 90 is given to the pixel 91.

Next, considering the pixel 92, because the pixels at the left-upper, upper, and left positions relative to the pixel 92 are all white pixels, and the target pixel 92 is a black pixel, a new label "2" is given to the pixel 92.

Next, considering the pixel 93, the pixels at the left-upper and upper positions relative to the pixel 93 are white pixels, but the pixel 92 at the left position relative to the pixel 93 is not a white pixel, therefore the target pixel 91 is given the label of a black pixel at either the left-upper, or upper, or left positions relative to the target pixel 93. For example, the label "2" of the pixel 92 is given to the pixel 93.

In this way, the remaining pixels are also labeled.

In step S902, coordinates of a circumscribing rectangle of the adjacent black pixels are detected. In this step, coordinates are detected of the circumscribing rectangle enclosing the black pixels having the same label.

FIG. 37 is a diagram for schematically showing the operation of detecting coordinates of the circumscribing rectangle enclosing the black pixels having the same label.

As illustrated in FIG. 37, coordinates of a circumscribing rectangle 94 enclosing the black pixels having the label "1", and a circumscribing rectangle 95 enclosing the black pixels having the label "2" are detected.

In step S903, circumscribed rectangles overlapped with each other, or circumscribed rectangles in contact with each other, are combined.

Figure 38:
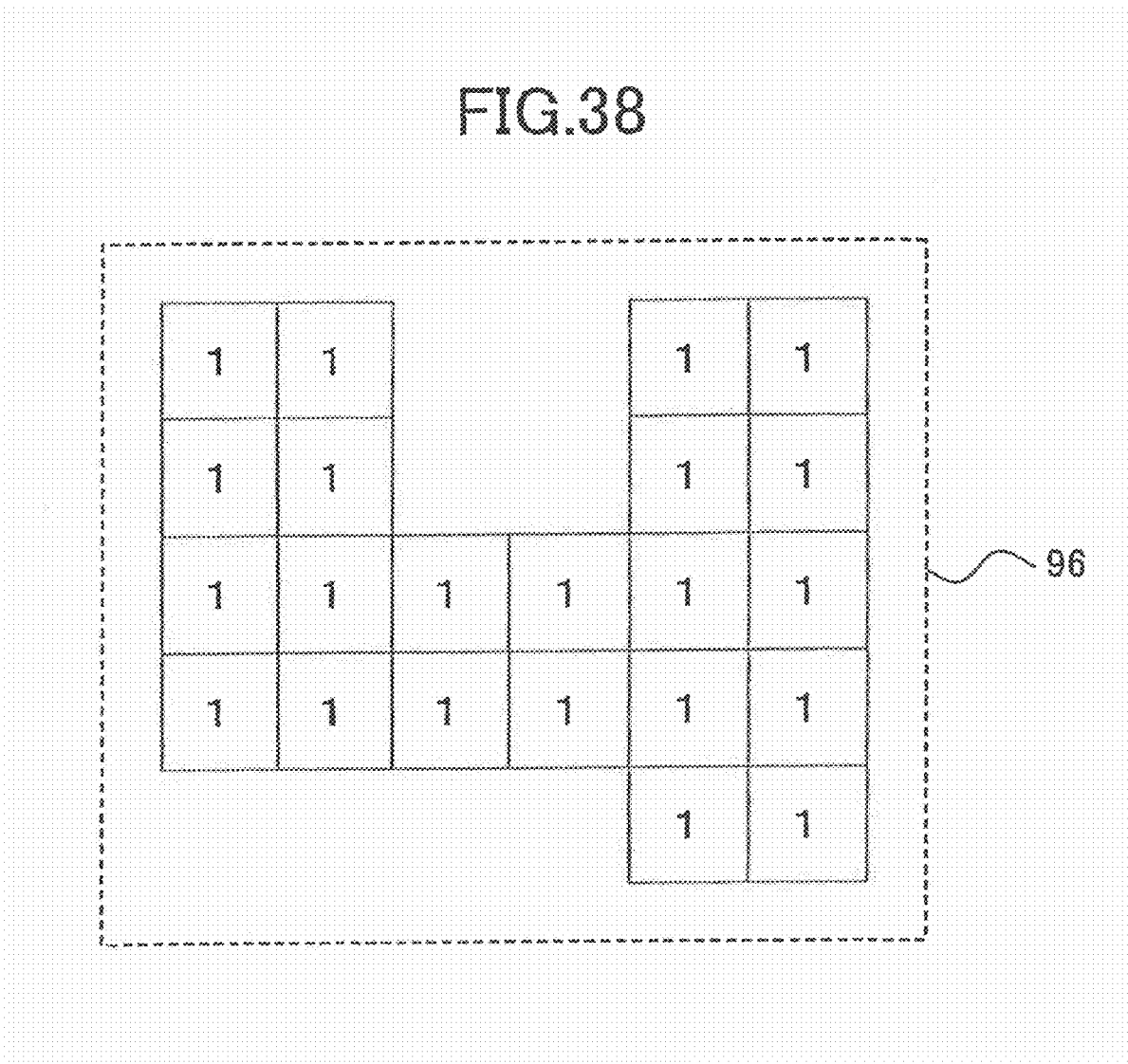
FIG. 38 is a diagram for schematically showing the operation of combining the circumscribed rectangles.

FIG. 38 is a diagram for schematically showing the operation of combining the circumscribed rectangles.

As illustrated in FIG. 38, circumscribed rectangles 94 and 95, which are in contact with each other, are combined into a new circumscribing rectangle 96.

In step S904, those circumscribed rectangles having sizes not matching with the size of the two-dimensional code are ignored, and circumscribed rectangles having reasonable sizes compared with the two-dimensional code are extracted.

In this way, a region including black pixels surrounded by white pixels is detected, and the image processing unit 84 decodes image data in the extracted region.

If the position of the two-dimensional code is already known, it is sufficient for the image processing unit 84 to decode the image data in a rectangular region at the position of the two-dimensional code. If the position of the two-dimensional code is not known from the layout of the paper document, the image processing unit 84 needs to decode the image data in all the detected rectangular regions. If the decoding is successful, the image processing unit 84 obtains the paper ID from the decoding results.

If the decoding is successful, and the image processing unit 84 obtains the paper ID, the image processing unit 84 transmits a type of device, the paper ID, and the written information to the element K 131. For example, these data can be transmitted in XML form (eXtensible Markup Language).

The scanner used in the above description may also be the image pickup part of a digital camera or an Over Head Cameral (OHC), in addition to a flat bed scanner.

Below, a description is made of the element E 125 for decoding the paper ID.

First, a bar-code reading device for reading the two-dimensional code is described as an embodiment of the element E 125.

Figure 39:
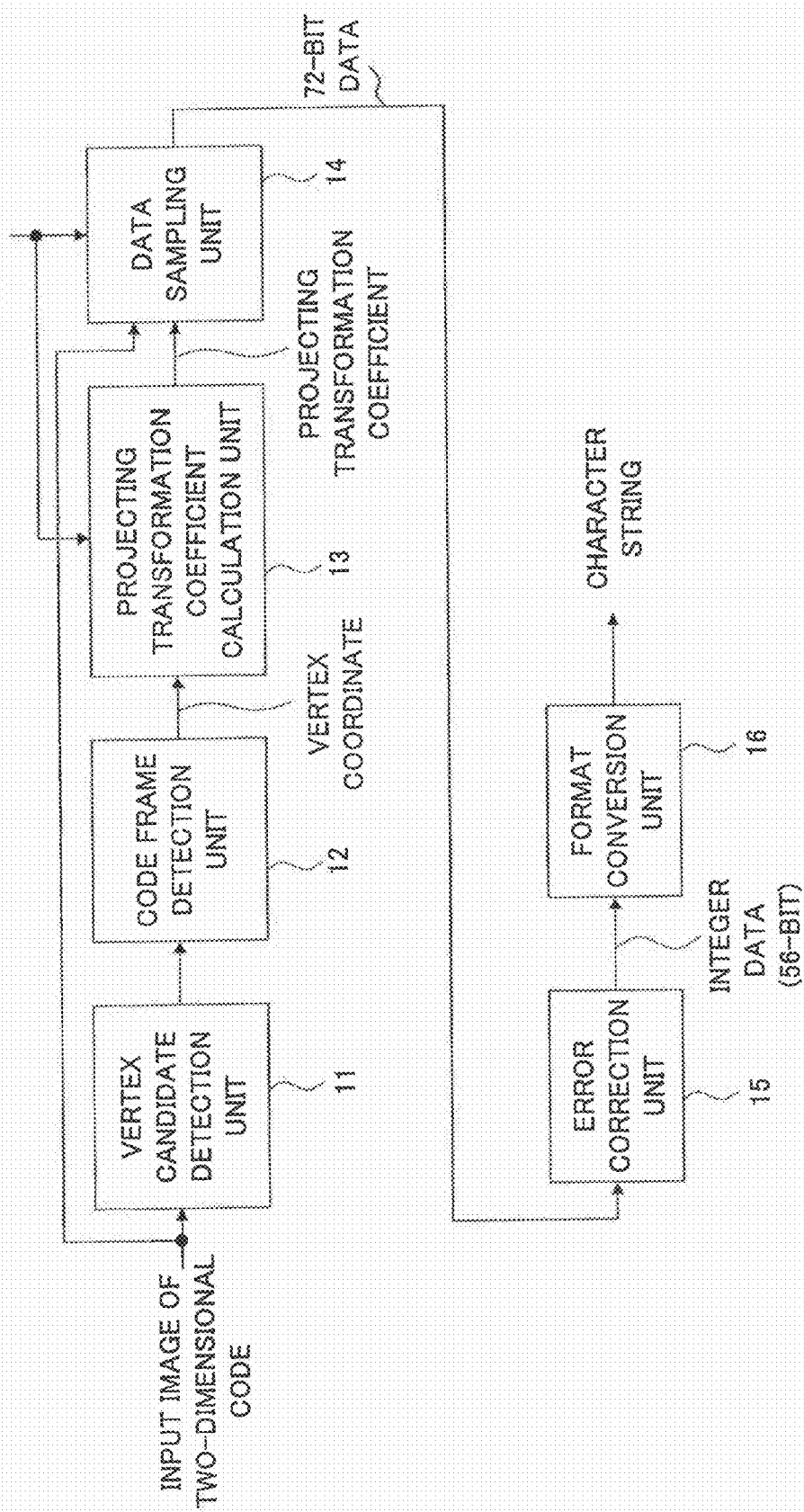
FIG. 39 is a block diagram showing a configuration of a bar-code reading device as an embodiment of the element E 125.

FIG. 39 is a block diagram showing a configuration of a bar-code reading device as an embodiment of the element E 125.

As illustrated in FIG. 39, the bar-code reading device includes a vertex candidate detection unit 11, a code frame detection unit 12, a projecting transformation coefficient calculation unit 13, a data sampling unit 14, an error correction unit 15, and a format conversion unit 16.

The bar-code reading device shown in FIG. 39, as the two-dimensional code reader 62 in FIG. 29, is above the two-dimensional code and aimed obliquely downward reads the two-dimensional code.

The vertex candidate detection unit 11 detects candidates of the vertices of the two-dimensional code.

The code frame detection unit 12 detects a code frame of the two-dimensional code based on the vertex candidates of the two-dimensional code, as described below.

The projecting transformation coefficient calculation unit 13 calculates the projecting transformation coefficients, which are used in mapping defined coordinates of centers of cells of the created two-dimensional code and coordinates of centers of cells of the two-dimensional code read by the code frame detection unit 12 from coordinates of the vertices of the code frame read by the code frame detection unit 12, and the defined coordinates of the vertices of the code frame when creating the two-dimensional code.

The data sampling unit 14 uses the projecting transformation coefficients calculated by the projecting transformation coefficient calculation unit 13 to sample data of the two-dimensional code.

The error correction unit 15 determines whether errors exist in the data sampled by the data sampling unit 14. If there is no error, or if the errors are correctable, the error correction unit 15 outputs 56-bit data of an integral type besides an error correction code to the format conversion unit 16.

The format conversion unit 16 converts the input data to a character string and outputs the character string.

Figure 40:
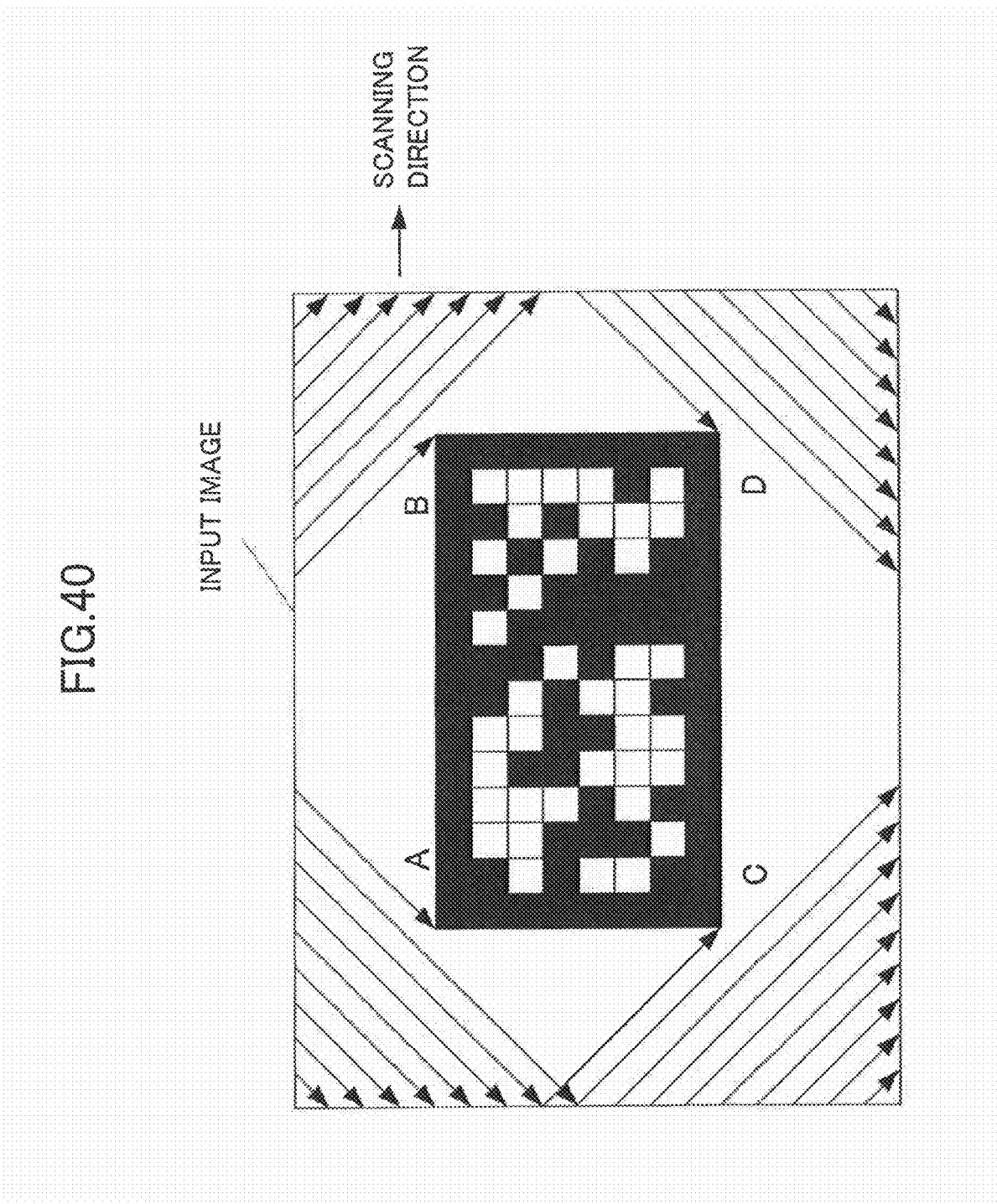
FIG. 40 is a view showing the operation of the vertex candidate detection unit 11 for detecting the candidates of the vertices of an input image.

FIG. 40 is a view showing the operation of the vertex candidate detection unit 11 for detecting the candidates of the vertices of an input image.

As illustrated in FIG. 40, the vertex candidate detection unit 11 scans an input image, for example, the two-dimensional code, in the directions indicated by the arrows in order to detect the vertices. Specifically, the vertex candidate detection unit 11 scans the input image from the four corners of the two-dimensional code along inclined directions to detect black pixels. Here, the obtained black pixels are represented by A, B, C and D.

Figure 41:
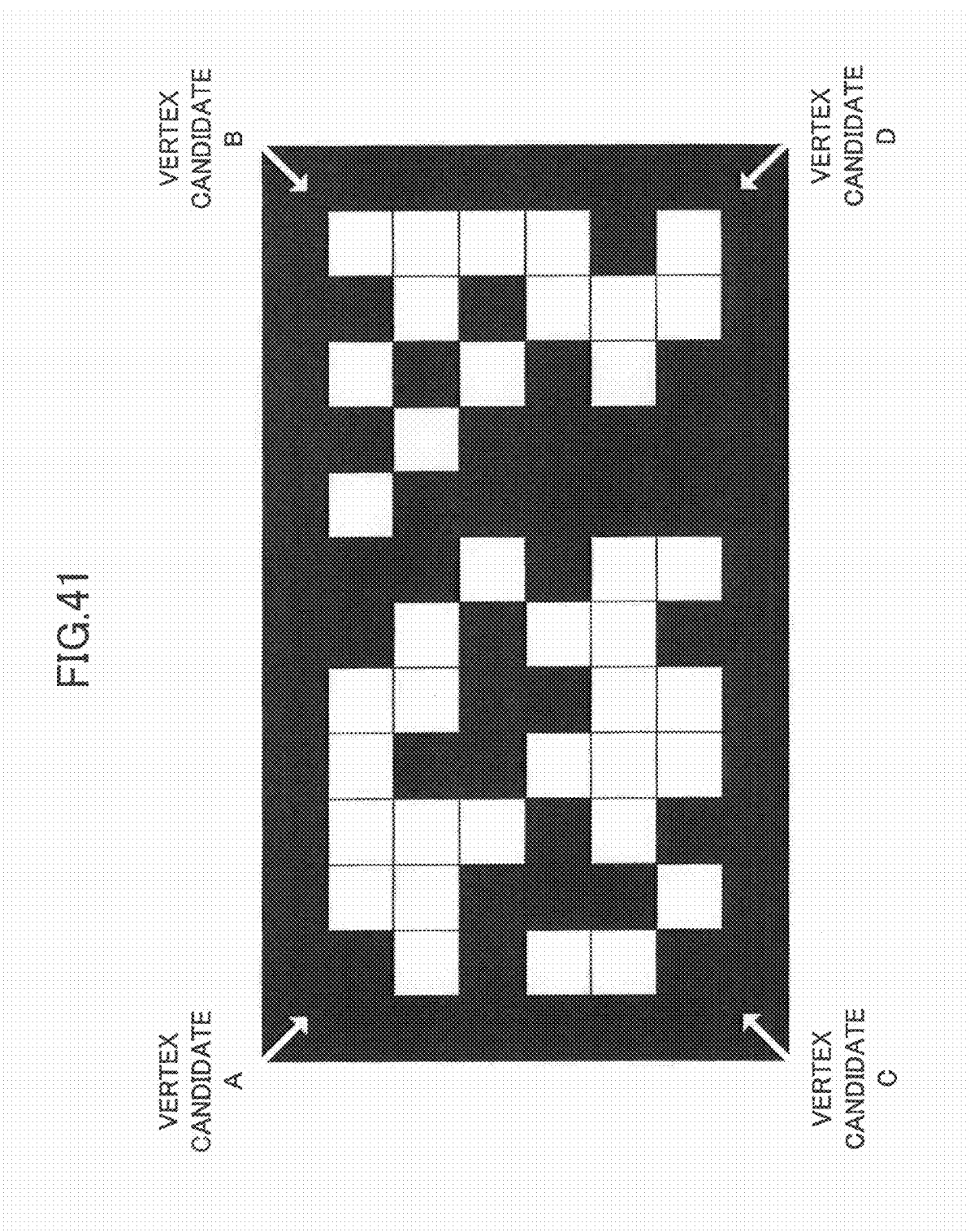
FIG. 41 is an enlarged view of a portion of the FIG. 40 for showing the operation of determining whether the black pixels A, B, C and D are candidates of vertices of the input image.

FIG. 41 is an enlarged view of that in FIG. 40 for showing the operation of determining whether the black pixels A, B, C and D are candidates of vertices of the input image.

As illustrated in FIG. 41, the vertex candidate detection unit 11 scans the input image, for example, the two-dimensional code, in the directions indicated by the arrows originating from the black pixels A, B, C and D, respectively.

For example, considering the black pixel A, the vertex candidate detection unit 11 scans the two-dimensional code in the right-lower direction (45 degrees relative to the vertical line) indicated by the arrow from the black pixel A. For the black pixel B, the vertex candidate detection unit 11 scans the two-dimensional code in the left-lower direction (45 degrees relative to the vertical line) indicated by the arrow from the black pixel B. For the black pixel C, the vertex candidate detection unit 11 scans the two-dimensional code in the right-upper direction (45 degrees relative to the vertical line). For the black pixel D, the vertex candidate detection unit 11 scans the two-dimensional code in the left-upper direction (45 degrees relative to the vertical line).

In this way, the vertex candidate detection unit 11 traces, from pixels A, or B, or C, or D, a number of pixels equaling 1/√2 (inversion of the square root of 2) of the number of pixels along a side of a cell, and determines whether all of the scanned pixels are black pixels. If all of the scanned pixels are black pixels, the vertex candidate detection unit 11 determines that the black pixels A, B, C and D are candidates of vertices of the two-dimensional code. Then the vertex candidate detection unit 11 transfers control to the code frame detection unit 12.

Figure 42:
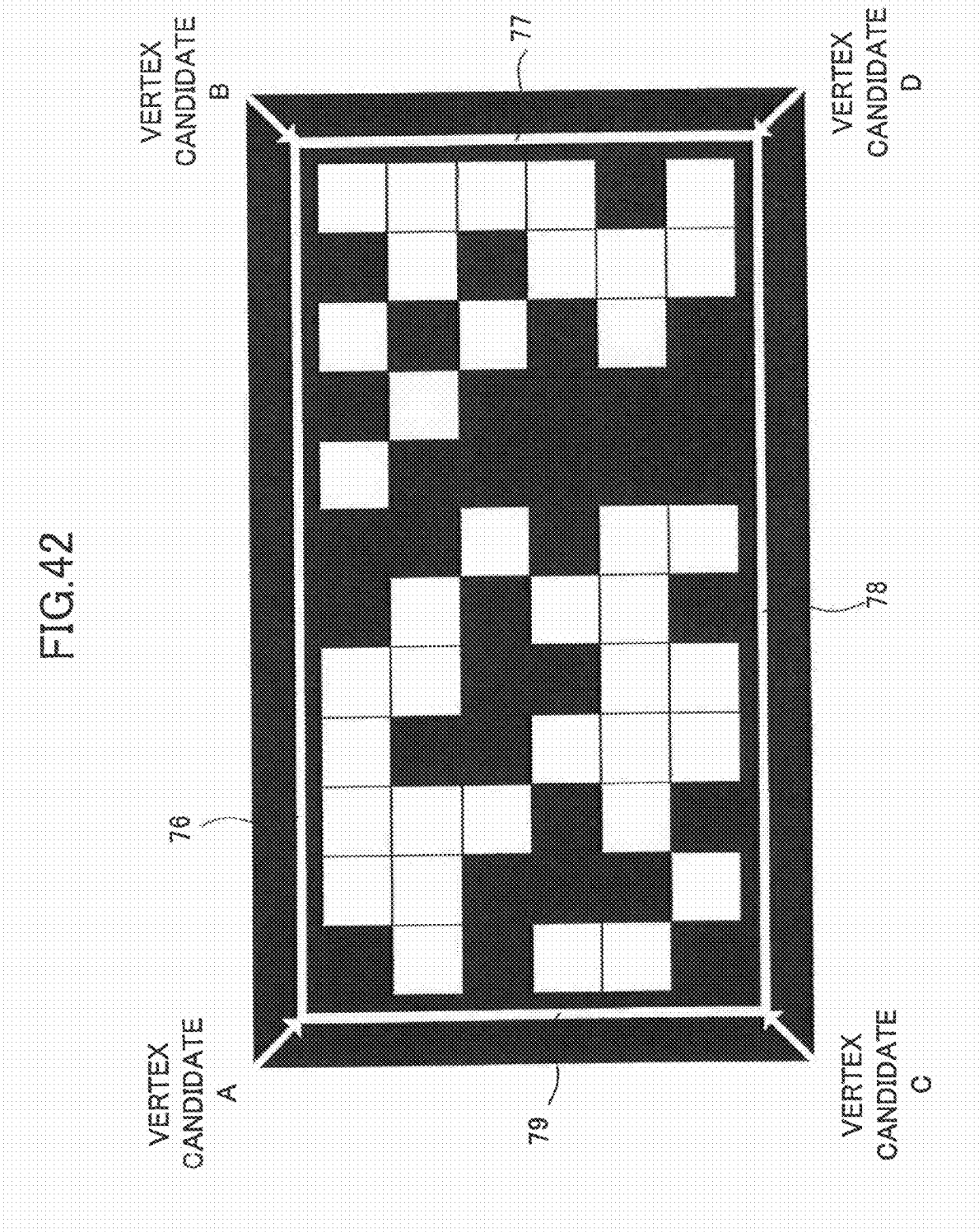
FIG. 42 is a view showing the operation of the code frame detection unit 12 for detecting a code frame of an input image.

FIG. 42 is a view showing the operation of the code frame detection unit 12 for detecting a code frame of an input image.

As described above, the vertex candidate detection unit 11 traces, from the vertex candidates A, or B, or C, or D, a 1/√2 times number of pixels. Those lines connecting the tracing ends form "black frame determination lines" 76, 77, 78, and 79 for determining a black frame.

The code frame detection unit 12 determines the black frame determination lines 76, 77, 78, and 79 as a code frame if the ratio of the number of the black pixels over the total number of pixels passed by the black frame determination lines 76, 77, 78, and 79 is greater than or equal to 80% for each of the black frame determination lines 76, 77, 78, and 79. Further, the code frame detection unit 12 determines the vertex candidates A, or B, or C, or D as vertices, and detects the coordinates of the vertices A, B, C, and D.

The projecting transformation coefficient calculation unit 13 calculates the projecting transformation coefficients, which are used in mapping defined coordinates of centers of cells of the created two-dimensional code and coordinates of centers of cells of the two-dimensional code read by the code frame detection unit 12 from coordinates of the vertices of the detected code frame, and the defined coordinates of the vertices of the code frame when creating the two-dimensional code.

The method of making this calculation is described below.

Next, a description is given to the data sampling unit 14.

The data sampling unit 14 receives the two-dimensional code, the defined coordinates of centers of cells of the two-dimensional code when creating the two-dimensional code, and the projecting transformation coefficients.

The data sampling unit 14 uses the projecting transformation coefficients calculated by the projecting transformation coefficient calculation unit 13 to perform a projecting transformation for the defined coordinates of centers of cells of the created two-dimensional code, and thereby, calculating coordinates of centers of cells of the two-dimensional code read by the code frame detection unit 12.

With the obtained coordinates of centers as coordinates of sampling centers of the image, the data sampling unit 14 specifies a value of pixels in a 3×3 pixel matrix, whose center is at the sampling center, to be "1" if the number of black pixels is greater than the number of white pixels in the matrix, and to be "0" if the number of black pixels is not greater than the number of white pixels in the matrix, and reads out the values. The obtained data having a length of 72 bits are input to the error correction unit 15, and are arranged therein.

The error correction unit 15 determines whether errors exist in the data sampled by the data sampling unit 14. If there is no error, or if the errors are correctable, the error correction unit 15 outputs 56-bit data of an integral type besides an error correction code to the format conversion unit 16.

The format conversion unit 16 converts the input data to a character string and outputs the character string, thus reproducing the original character string.

The operation of reading the two-dimensional code as described above is summarized in FIG. 43.

Figure 43:
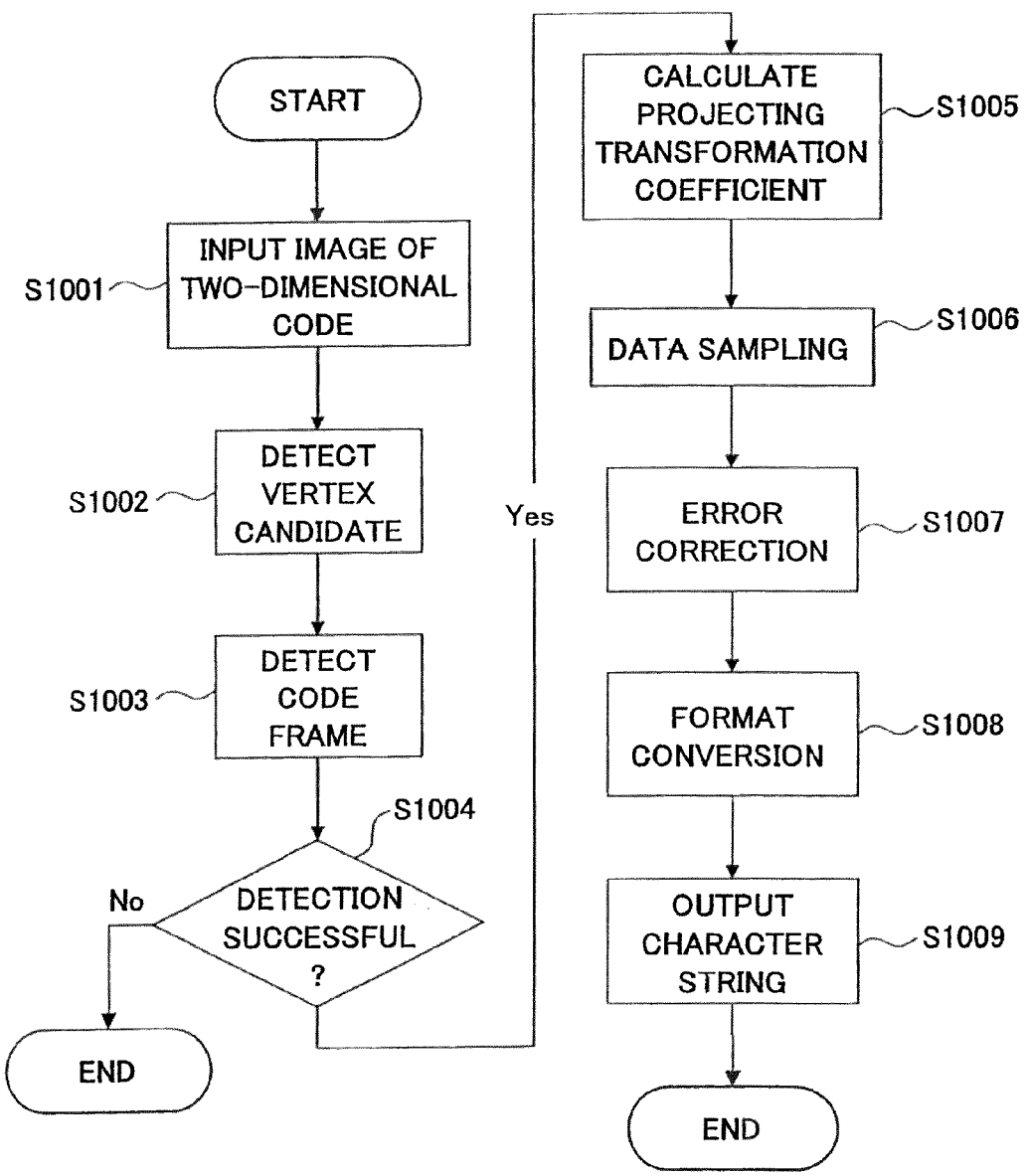
FIG. 43 is a flowchart showing the operation of reading the two-dimensional code.

FIG. 43 is a flowchart showing the operation of reading the two-dimensional code. The operation shown in FIG. 43 may be executed by software.

In step S1001, an image of the two-dimensional code is input. This image is captured by an image capturing device which is above the two-dimensional code and points obliquely downward at the two-dimensional code.

In step S1002, candidates of the vertices of the two-dimensional code are detected.

In this step, as illustrated in FIG. 40, the two-dimensional code is scanned from the four corners of the two-dimensional code along inclined directions to detect black pixels. The detected black pixels are represented by A, B, C and D.

In addition, as illustrated in FIG. 41, the two-dimensional code is scanned from the black pixels A, B, C and D along the directions each at an angle of 45 degrees relative to a vertical line. For example, for the black pixel A, the scanning is in the right-lower direction (45 degrees relative to the vertical line), for the black pixel B, the scanning is in the left-lower direction (45 degrees relative to the vertical line), for the black pixel C, the scanning direction is in the right-upper direction (45 degrees relative to the vertical line), and for the black pixel D, the scanning is in the left-upper direction (45 degrees relative to the vertical line).

In these scanning, a number of pixels equaling 1/√2 of the number of pixels along a side of a cell are traced, and it is determined whether all of the scanned pixels are black pixels. If all of the scanned pixels are black pixels, the black pixels A, B, C and D are determined to be candidates of vertices of the two-dimensional code.

In step S1003, as illustrated in FIG. 42,

The black frame determination lines 76, 77, 78, and 79, which connect the ends of the above scanning from the vertex candidates A, B, C and D in directions each at an angle of 45 degrees relative to the vertical line, are determined to be a code frame, if the ratio of the number of the black pixels over the total number of pixels passed by the black frame determination lines 76, 77, 78, and 79 is greater than or equal to 80% for each of the black frame determination lines 76, 77, 78, and 79. Further, the vertex candidates A, or B, or C, or D are determined to be vertices of the two-dimensional code. At the same time, the coordinates of the vertices A, B, C, and D are detected.

In step S1004, if the code frame cannot be detected in step S1003, the routine branches at step S1004 to finish the operation of reading the two-dimensional code.

If the code frame is detected in step S1003, the routine proceeds to step S1005.

In step S1005, the projecting transformation coefficients are calculated, which are used in mapping the defined coordinates of centers of cells of the created two-dimensional code and the coordinates of centers of cells of the two-dimensional code input in step S1001, from coordinates of the vertices of the detected code frame detected in step S1003 and the defined coordinates of the vertices of the code frame when creating the two-dimensional code.

In step S1006, data sampling is performed. Specifically, after inputting the two-dimensional code, the defined coordinates of centers of cells of the two-dimensional code when creating the two-dimensional code, and the projecting transformation coefficients, the projecting transformation is performed, by using the projecting transformation coefficients calculated in step S1005, on the defined coordinates of centers of cells of the created two-dimensional code, thereby, enabling calculation of coordinates of centers of cells of the two-dimensional code input in step S1001.

With the obtained coordinates of centers as coordinates of sampling centers of the image, a value of pixels in a 3×3 pixel matrix, whose center is at the sampling center, is specified to be "1" if the number of black pixels is greater than the number of white pixels in the matrix, and to be "0" if the number of black pixels is not greater than the number of white pixels in the matrix, and reads out 72-bit data.

In step S1007, it is determined whether errors exist in the obtained 72-bit data. If there is no error, or if the errors are correctable, 56-bit integral type data different from the error correction code are output.

In step S1008, the 56-bit integral type data is converted to a character string.

In step S1009, the character string is output, thus reproducing the original character string.

Next, a description is given to the method of calculating the projecting transformation coefficients.

The projecting transformation is a well known method in processing three dimensional images. This method transforms a drawing or an object in a three-dimensional space to a drawing or object in a two-dimensional plane or on a screen. Specifically, the projecting transformation transforms coordinates of the object in the three dimensional space to the coordinates of the object on a plane or a screen.

In order to precisely perform the projecting transformation, it is necessary to know the position relations and optical characteristics of the image pick-up system concerned. However, it is difficult to measure or determine the position relation and the optical characteristics of a specific image pick-up system each time the projecting transformation is performed for the specific image pick-up system, and this is not desirable from the point of view of versatility of the transformation relative to various kinds of devices.

On the other hand, in order to take advantages of an optical system capable of obliquely picking up an image of the two-dimensional code, it is not always necessary to carry out the projecting transformation precisely. For example, if the two-dimensional code is not represented by rectangular cells each having a uniform density, but by trapezium cells or cells having non-uniform density, it is possible to exhibit advantages of the optical system capable of obliquely picking up an image of the two-dimensional code.

Figure 44:
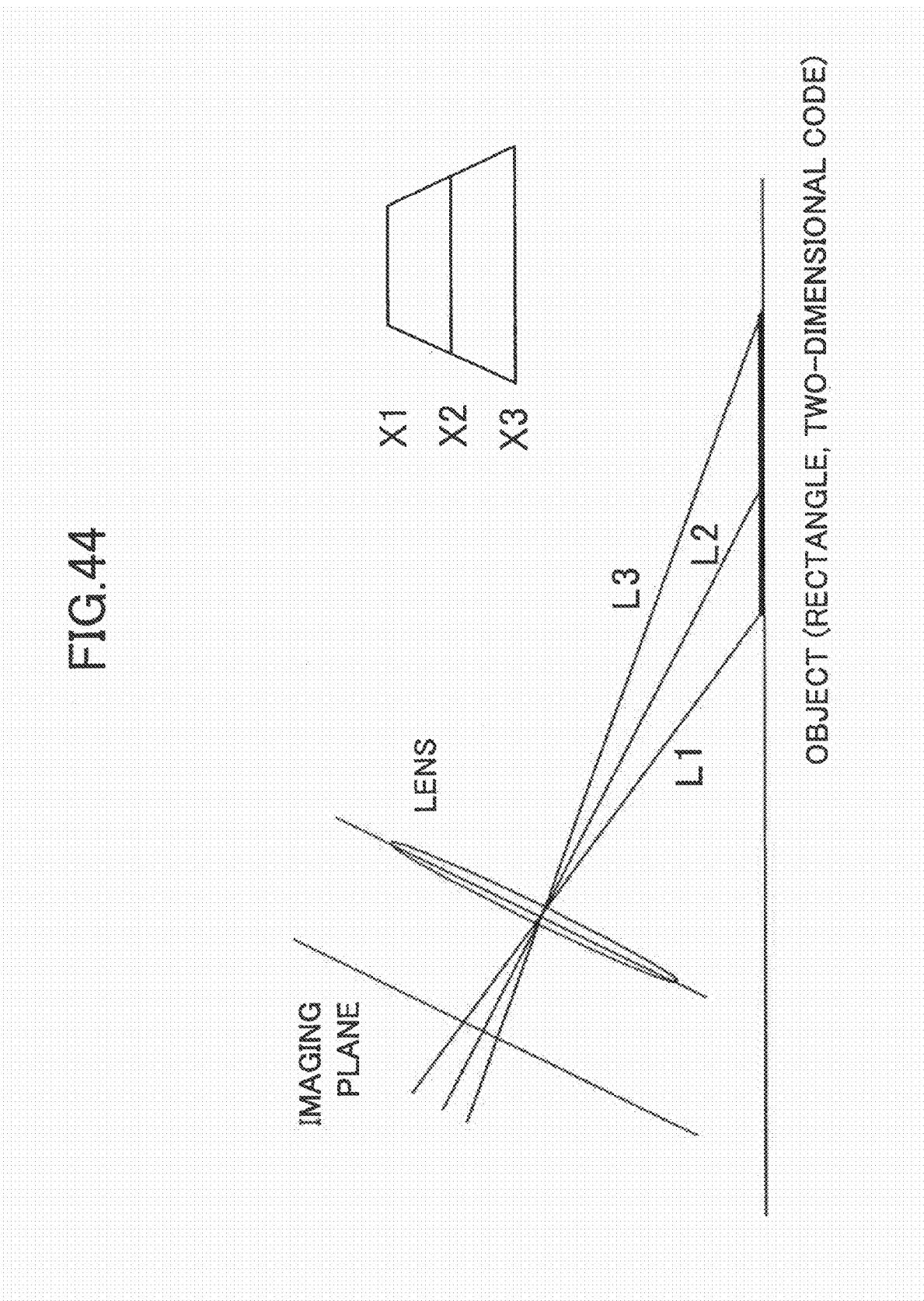
FIG. 44 is a view for schematically showing an example of reading an image having trapezium cells or having cells of various sizes by an optical system capable of obliquely picking up an image.

FIG. 44 is a view for schematically showing an example of reading an image having trapezium cells or having cells of various sizes by an optical system for capable of obliquely picking up an image.

In the optical system illustrated in FIG. 44, the captured image of a rectangular appearance originally is transformed into a trapezium appearance by the projecting transformation.

In this transformation, the ratio of the long side of the trapezium over the short side (X1/X3) equals an inversion of the ratio of the distances from the image pick-up element to two ends of the target image, for example, the two-dimensional code (L3/L1).

In this example, instead of creating a two-dimensional code including rectangular cells having equivalent sizes, a two-dimensional code is created including cells having different shapes and sizes so that the effect of the projecting transformation is cancelled.

The sizes of the cells are determined for each line of the two-dimensional code at a certain magnification. Depending on the distance to the imaging plane of the image pick-up unit, the magnification of the deformation changes even in the same line of the two-dimensional code. For example, the magnifications in the same line are transformed to the magnification at the middle position of the line, so that the magnifications in the same line are the same. By this treatment, the two-dimensional codes each having stepwise cell boundaries, as shown in FIG. 45 and FIG. 46, are obtained.

Figure 45:
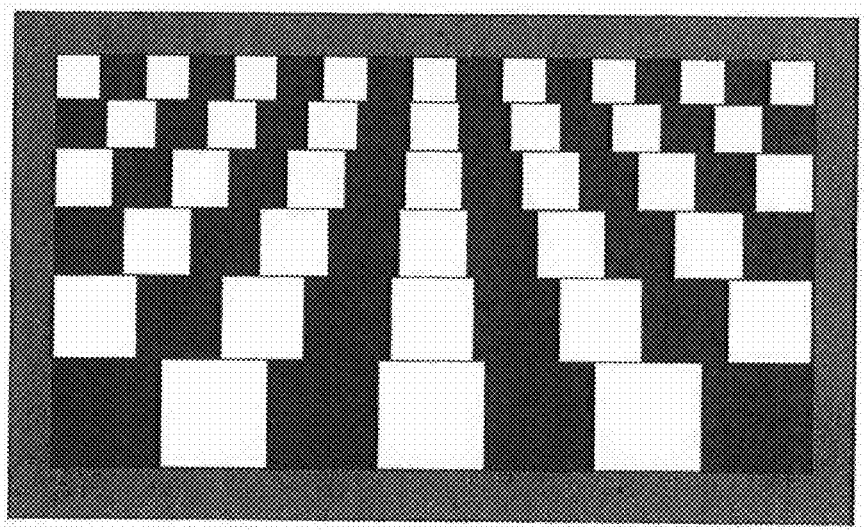
FIG. 45 is a view of an example of a two-dimensional code obtained by transformation, in which the boundaries of cells are stepwise.

FIG. 45 is a view of an example of a two-dimensional code obtained by transformation, in which the boundaries of cells are stepwise.

Figure 46:
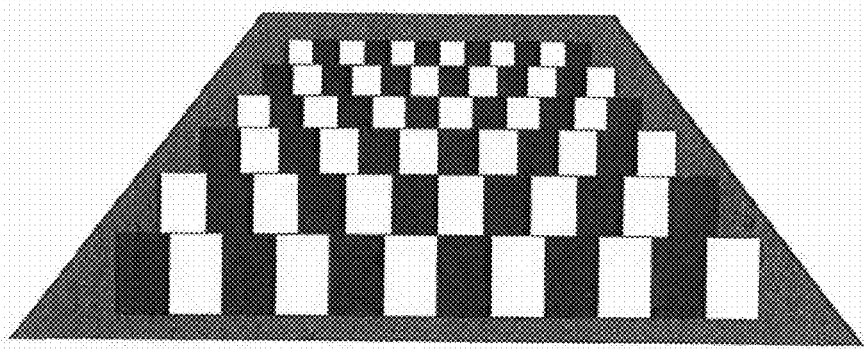
FIG. 46 is a view of another example of a two-dimensional code obtained by transformation, in which the boundaries of cells are stepwise.

FIG. 46 is a view of another example of a two-dimensional code obtained by transformation, in which the boundaries of cells are stepwise.

Figure 47:
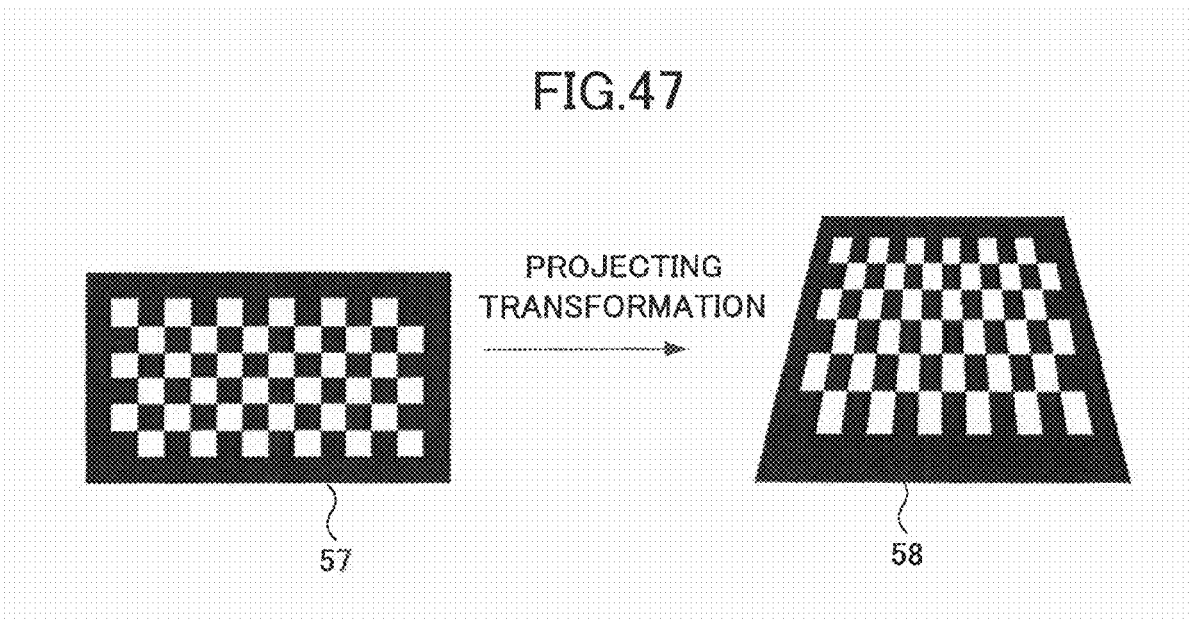
FIG. 47 is a view showing of the projecting transformation on a two-dimensional code.

Alternatively, the projecting transformation may be carried out in a precise way to generate a two-dimensional code as shown in FIG. 47.

FIG. 47 is a view showing of the projecting transformation on a two-dimensional code.

The details of the two-dimensional codes shown in FIG. 45, FIG. 46, and FIG. 47 are described below referring to the element G 127.

Figure 48:
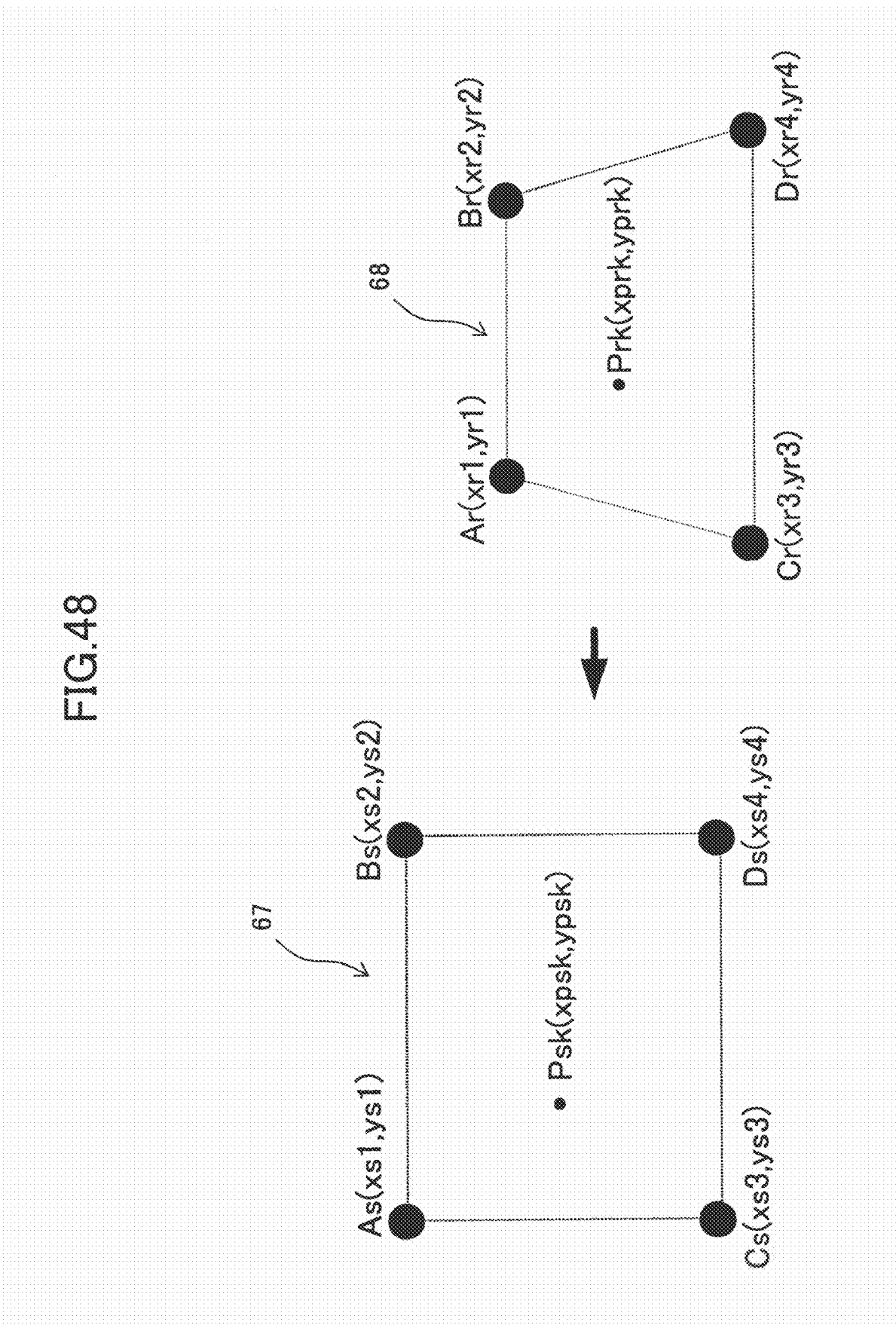
FIG. 48 is diagram showing the projecting transformation for transforming an object two-dimensional code 67 to an electrically created two-dimensional code 68.

FIG. 48 is diagram showing the projecting transformation for transforming an object two-dimensional code 67 to an electrically created two-dimensional code 68.

FIG. 48 schematically illustrates a two-dimensional code 67, an image of which is to be picked up, and a two-dimensional code 68 electrically created; As, Bs, Cs, and Ds represent vertices of the two-dimensional code 67, and Ar, Br, Cr, and Dr represent vertices of the two-dimensional code 68; xs1, yr2 and others in parentheses represents coordinates; Psk and Prk represent coordinates of centers of cells.

The vertices As, Bs, Cs, and Ds of the two-dimensional code 67, and vertices Ar, Br, Cr, and Dr of the two-dimensional code 68 satisfy equations (5) and (6) in FIG. 49.

FIG. 49 shows equations (5) and (6) for calculating transformation coefficients.

The equations (5) and (6) express the transformation of coordinates for defining the two-dimensional code 68 to coordinates for defining the two-dimensional code 67, that is, the transformation from Ar, Br, Cr, and Dr to As, Bs, Cs, and Ds.

The equation (5) gives the X coordinate of a vertex, the equation (6) gives the Y coordinate of a vertex, and the subscript i in equations (5) and (6) varies in the range from 1 to 4.

In equations (5) and (6), b1 through b8 are unknown transformation parameters, and these parameters can be determined by substituting values of coordinates of Ar, Br, Cr, and Dr, and As, Bs, Cs, and Ds into equations (5) and (6), and solving the resulting equation system.

Once b1 through b8 are obtained, the coordinates Psk of sampling center of the two-dimensional code can be calculated by transforming the coordinates Prk of center of the cells of the electrically created two-dimensional code.

Next, a description is given to embodiments of the element F 126, which encodes the paper ID.

Figure 50:
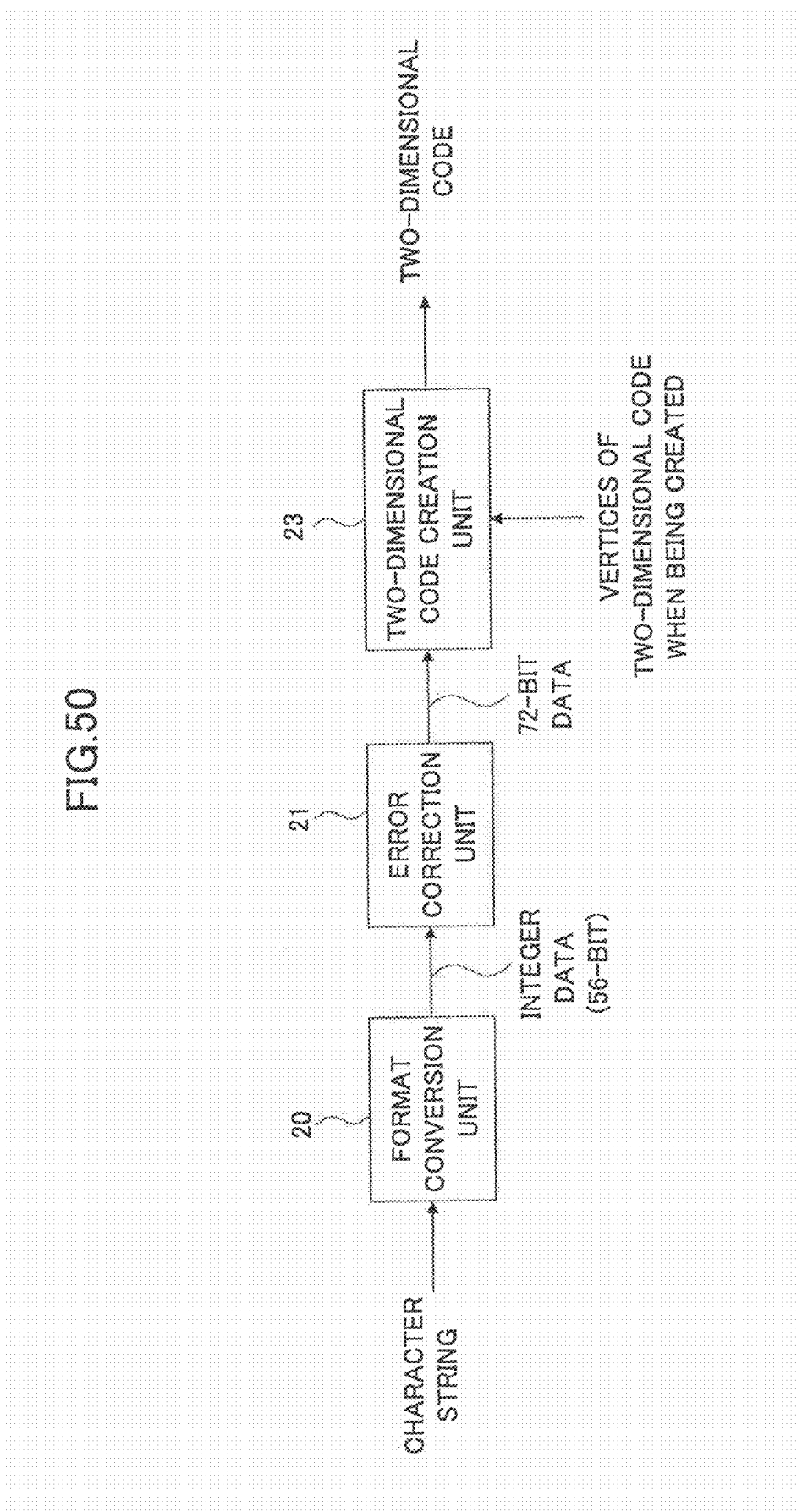
FIG. 50 is a block diagram showing a configuration of a two-dimensional code creating device.

FIG. 50 is a block diagram showing a configuration of a two-dimensional code creating device.

The element F 126 corresponds to the two-dimensional code creating device, and the element G 127 corresponds to the two-dimensional code.

In FIG. 50, the two-dimensional code creating device shown includes a format conversion unit 20, an error correction unit 21, and a two-dimensional code creation unit 23.

The format conversion unit converts the input character string to 56-bit integer type data able to be handled by a computer.

The error correction unit 21 appends a 16-bit error correction code to the 56-bit integer type data converted by the format conversion unit 20.

As the error correction code, Reed Solomon code can be used. The error correction method using the Reed Solomon code is powerful in correcting errors in unit of bytes, and can correct errors shorter than a half length of the error correction code. For details of Reed Solomon error correction code, please refer to "Code Theory (Lecture on Fundamentals of Computers (No. 18))", by Miyakawa et al., and many other books.

In this example, because the length of the error correction code is two bytes, it is possible to correct errors of one byte.

The two-dimensional code creation unit 23 assigns the data and the error correction data to cells of the two-dimensional code to create the two-dimensional code.

Figure 51:
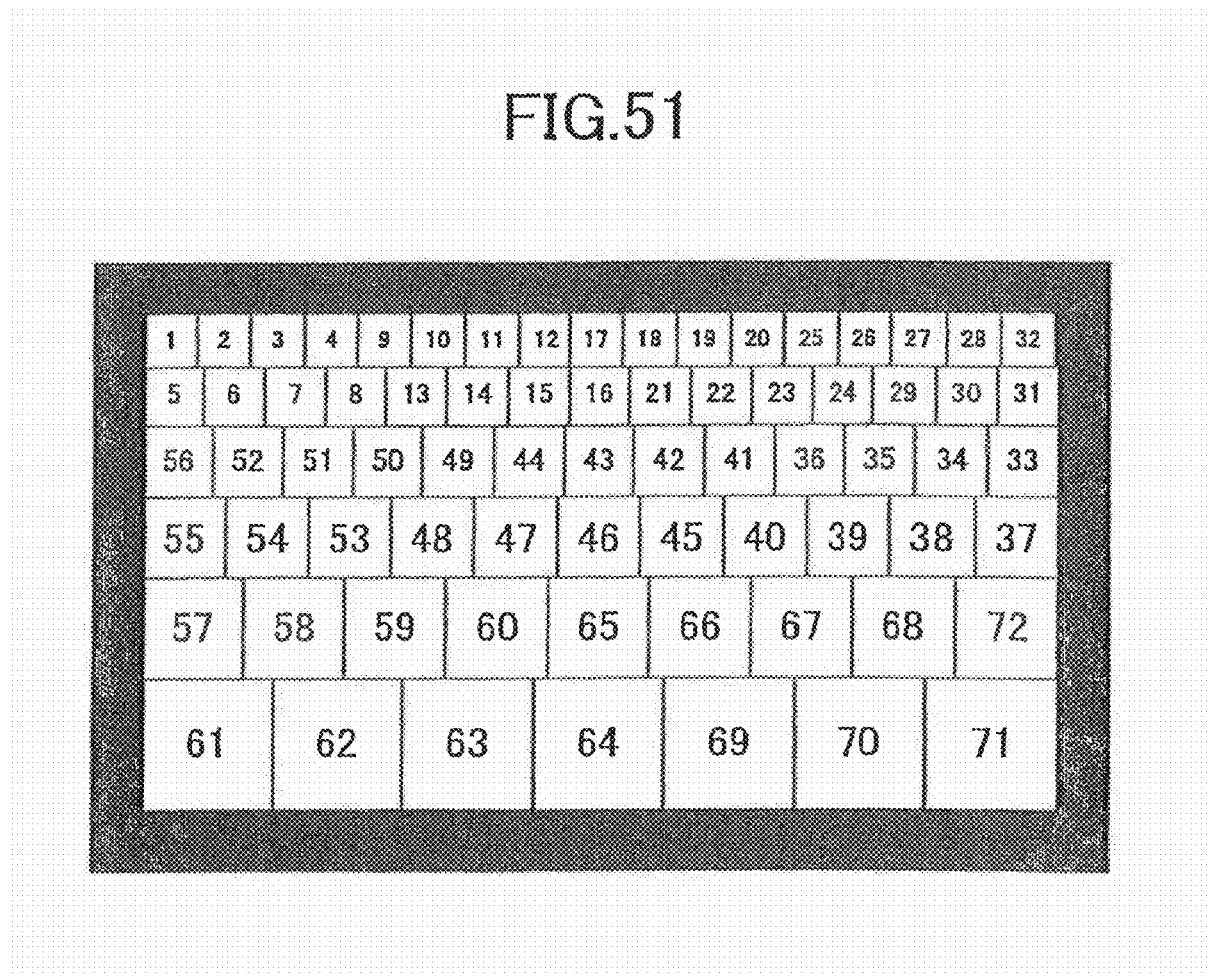

FIG. 51 is view for schematically showing data arrangement in the two-dimensional code creation unit 23. The two-dimensional code creation unit 23 assigns the data and the error correction data to cells of the two-dimensional code as shown in FIG. 51.

The numbers in cells shown in FIG. 51 is the numbers assigned to represent the positions of in the data arrangement.

When assigning the data and the error correction data to cells of the two-dimensional code, the 56-bit integer data are assigned to cells 1 through 56, and the 16-bit error correction data are assigned to cells 57 through 72.

Coordinates of the defined vertices and the coordinates of the cell centers are used when creating the two-dimensional code, and when reading the two-dimensional code.

Figure 52:
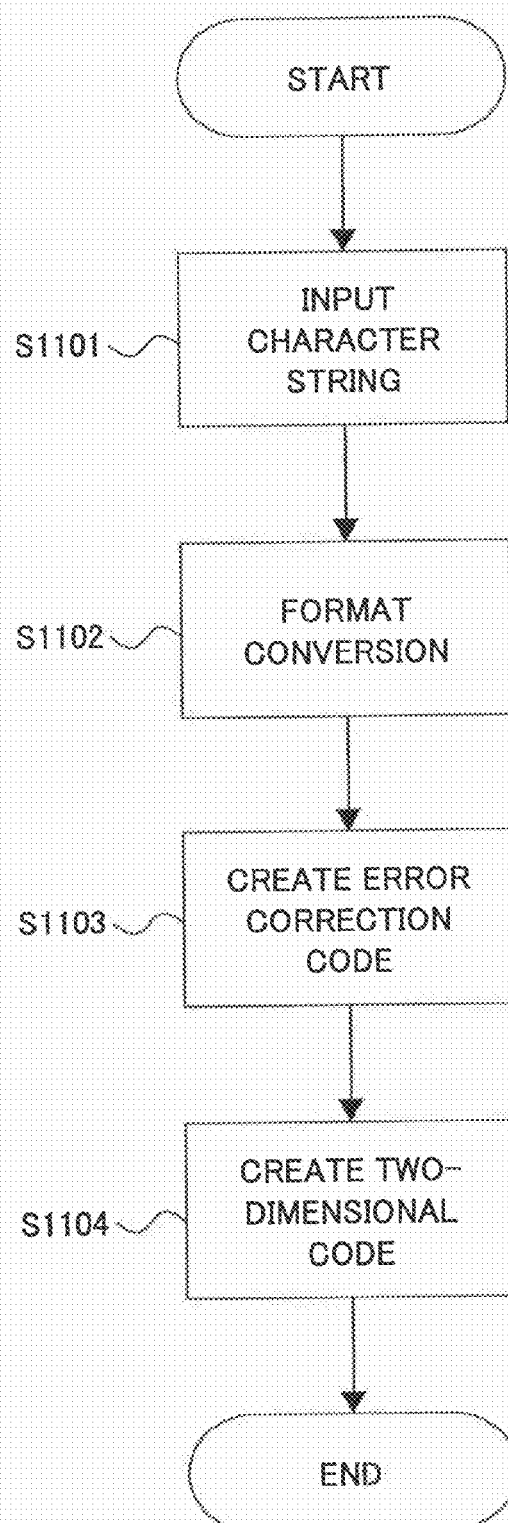
FIG. 52 is flow chart showing the operation of creating the two-dimensional code.

FIG. 52 is flow chart showing the operation of creating the two-dimensional code. The operation shown in FIG. 52 can be executed by software.

In step S1101, a character string is input.

In step S1102, the character string is converted to 56-bit integer type data that is able to be handled by a computer.

In step S1103, a 16-bit error correction code is created and is appended to the 56-bit integer type data converted in step S1102. As the error correction code, Reed Solomon code is used.

Figure 53:
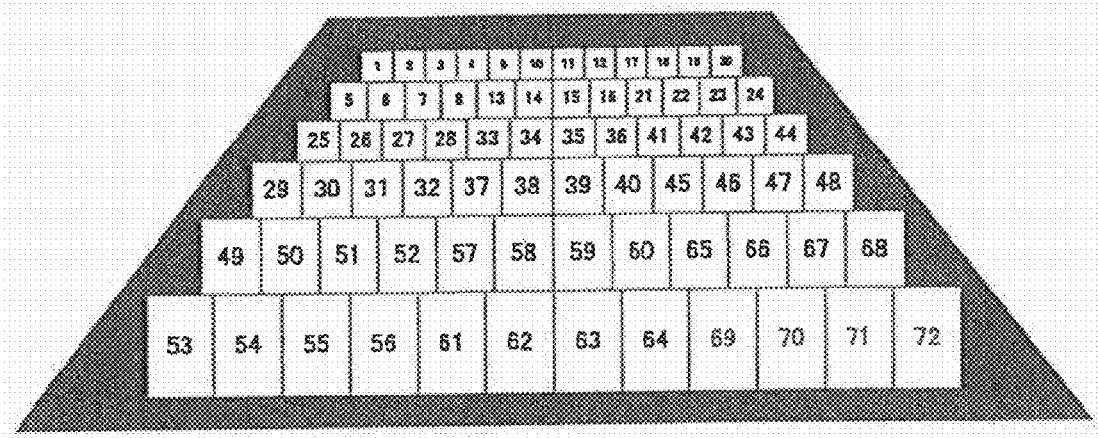
FIG. 53 is a view for schematically showing data arrangement.

In step S1104, the data and the error correction code are assigned to cells of the two-dimensional code, as shown in FIG. 51 and FIG. 53, to create the two-dimensional code.

FIG. 53 is a view for schematically showing data arrangement.

When assigning the data and the error correction code to cells of the two-dimensional code, the 56-bit integer data are assigned to cells 1 through 56, and the 16-bit error correction code is assigned to cells 57 through 72.

Coordinates of the defined vertices and the coordinates of the cell centers are used when creating the two-dimensional code, and when reading the two-dimensional code.

Next, a description is given to embodiments of the element G 127, which corresponds to the paper ID.

First, the two-dimensional code shown in FIG. 45 is described.

The two-dimensional code shown in FIG. 45 is enclosed by a black frame, and inside the two-dimensional code, cells are arranged in 72 positions as shown in FIG. 51. A cell is the minimum unit of a zone for recording information, and represents 1-bit data for indicating white or black. Therefore, the two-dimensional code shown in FIG. 45 or FIG. 51 expresses information of 72 bits.

When reading the two-dimensional code obliquely downward, the two-dimensional code obtained by a bar-code reader exhibits a trapezium shape, specifically, in the two-dimensional code shown in FIG. 45, areas of the cells near the bottom of the trapezium are large, and thus the bottom of the trapezium is shrunk.

Although the two-dimensional code distorts, each cell in the two-dimensional code obtained by the bar-code reader occupies an area including a multiple number of pixels, and the size of the area is roughly constant regardless of the position of the cell in the two-dimensional code.

With the trapezium two-dimensional code, in which the cells near the bottom of the trapezium are large, the cells near the top of the trapezium are small, and with the bar-code reader capable of reading the two-dimensional code obliquely downward, it is possible to stably read black-white data of each cell.

FIG. 46 shows another example of the trapezium two-dimensional code. In the trapezium two-dimensional code in FIG. 46, obtained with a bar-code reader that reading the two-dimensional code obliquely downward, the size of a cell changes depending on the distance from an image pick-up unit to the cell.

In this trapezium two-dimensional code, there are totally six lines, and there are twelve cells in each line, thus the total number of the cells is 72. This number is the same as that of the trapezium two-dimensional code in FIG. 45, and thus, the two-dimensional code in FIG. 46 can represent the same number of bits as the two-dimensional code in FIG. 45. That is, the 72-bit data are arranged as illustrated in FIG. 52.

FIG. 47 shows another example of the trapezium two-dimensional code. In FIG. 47, a rectangular two-dimensional code 57 is transformed, by the projecting transformation, to a trapezium two-dimensional code 58, and the trapezium two-dimensional code 58 may be used.

In this case, the image of the trapezium two-dimensional code 58, which is obtained by obliquely downward picking up an image of the two-dimensional code, is close to the rectangular two-dimensional code 57. The two-dimensional code 58 can represent 72-bit data.

The three two-dimensional codes described above are similar in that all of them are larger in widths than in heights. If the cells in the two-dimensional codes are taller, the heights of cells are large, and thereby, the total sizes of the two-dimensional codes become small, and the two-dimensional code loses the merit of displaying more information with smaller size.

In addition, when viewed from the bar-code reader, because the distance from the bar-code reader to the two-dimensional code changes more in the vertical direction than in the horizontal direction, it is appropriate to set cells far from the bar-code reader to have a large height-width ratio. Therefore, in FIG. 46 and FIG. 47, the height of the cell changes more than the width of the cell, and the two-dimensional code read by the bar-code reader is nearly a square.

Next, a description is given to embodiments of the element H 128, which associates the process ID with the external program 111, and manages the process ID.

When other elements make a request to the element H 128 of a process ID of an external program (registration request) in a computer installed with as least the element H 128, the element H 128 receives information for uniquely defining the external program, and assigns a unique ID in the management table in response to the request, and manages information of the external program in the management table.

Figure 54:
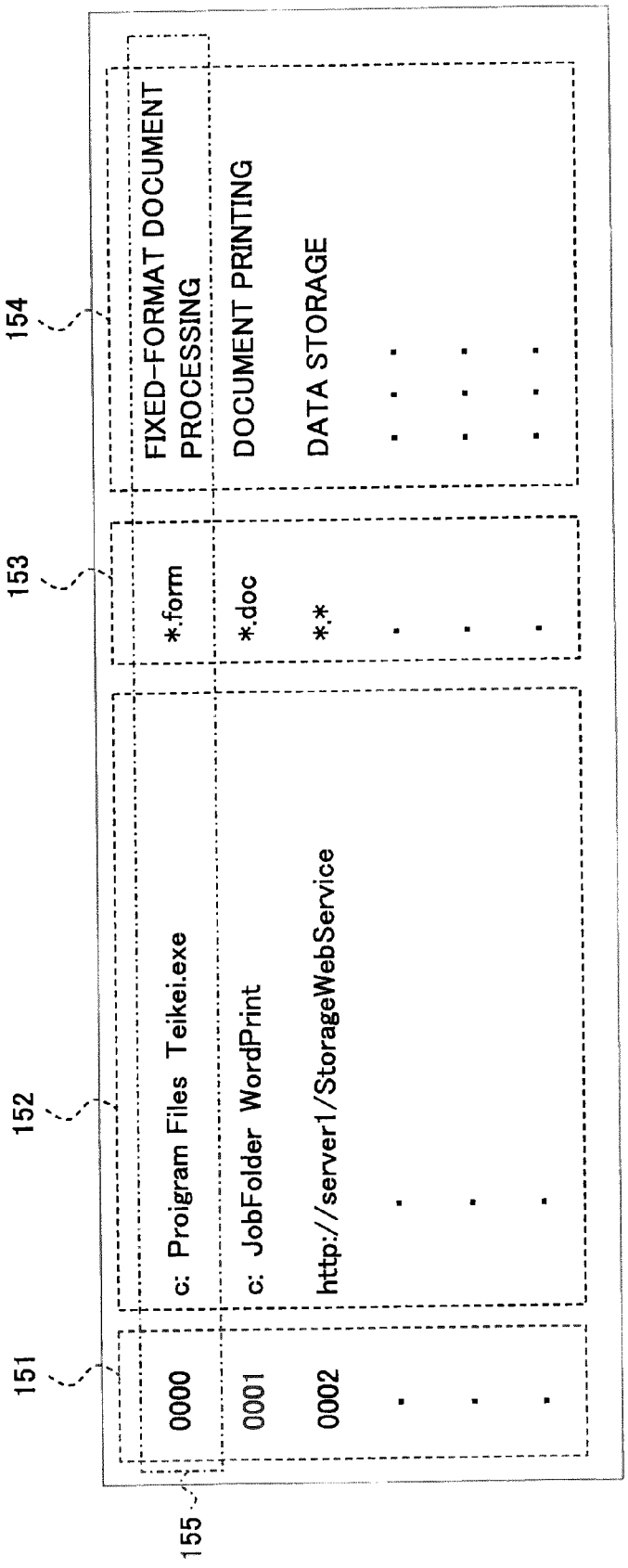
FIG. 54 is a view showing an example of a management table.

FIG. 54 is a view showing an example of a management table.

In FIG. 54, each line, for example, the line 155, is a unit of the external program corresponding to the process ID, and each of columns 151, 152, 153, 154 includes registered elements of the process IDs.

Listed in column 151 are the assigned process IDs. In column 152, there is the information for uniquely specifying an external program. For example, a file path of the external program is stored in the column 152 as the first item, and whereby the external program is uniquely specified. Stored in the second item of the column 152 is a path name indicating a name of a folder for storing jobs. Here, it is assumed that the external program processes files in one job folder, and the correspondence relation between them are uniquely defined, thereby the process IDs in the column 151 are associated with external programs.

The example shown by the second line in FIG. 54 says that a program for processing a fixed-format document is registered to have a process ID of 0001; the program receives, as a job in a folder "c:¥JobFolder¥WordPrint", written information from a paper document obtained by printing an electronic document *.doc.

In the third item of the column 152, a program in other computer is specified as a Web service by using its URL. The URL is connected to the process ID.

In the column 153, there is stored attribute information of electronic documents, by printing the electronic documents, paper documents are obtained, and the external program deals with the written information from paper documents. In the column 154, there are stored descriptions of the external programs. There may be more columns like the columns 153, and 154 for storing attribute information related to the external programs.

When a process ID is specified and management information of an external program is requested (referred to as "reference request"), the element H 128 searches for an appropriate process ID from the process IDs in the column 151 in FIG. 54. The element H 128 transmits, to the requester, an item of the registered element in the column 152 corresponding to the obtained process ID, which uniquely specifies a folder path name. At this time, the element H 128 may also transmit the attribute information in the column 153 and the subsequent columns simultaneously.

When the element H 128 is a program, the contents of the management table in FIG. 54 may be stored in the memory used by the program in execution. Alternatively, the contents of the management table may be stored as a file in a file system at a certain timing. Further, the contents of the management table may be stored in a database as digital information. In this case, one process ID and the corresponding attribute information form one record, and the process ID may be used as a key for storing or retrieving information related to the external programs, thereby enabling association of the process IDs with the external programs and enabling management of the information.

In this way, information of association of the process IDs with the external programs controlled by the element H 128 in the management table is stored not only in the memory used by executing programs, but also in a non-volatile storage device such as a hard disk as a file. Therefore, even when the power of the element H 128 is turned off, the association information may be evoked again for later use.

In addition, because the process ID and the name of the directory in which the external programs corresponding to the process ID works are stored and controlled by the element H 128, even if the name of the program or the program itself changes, the element H 128 can deal with this without changing the management information in the element H 128.

Furthermore, the element H 128 may be provided in a device independent from the device provided with the other elements, and the device having the element H 128 and the device having the other elements may be connected with each other by a communication network so that the device having the other elements can access the device having the element H 128. With this configuration, the element H 128 functions as RPC (Remote Procedure Call) or a Web service, and accepts registration requests or reference requests from other elements via the communication network.

In this case, information of the correspondence relation between the process IDs and the external programs held in the management table may be stored in the non-volatile storage device as a database able to be accessed via a communication network. Thereby, it is possible to provide more than one elements H 128 in the system, which registers or refers to the correspondence relation information in the same way.

Because even external programs on other devices can be specified via the communication network, it is possible to install the external programs to be executed on host devices respectively matching with the operational conditions of the external programs.

Because the device in the system having the element H 128 only is connected with the device having the other elements via the communication network, the device having the other elements can associate the process IDs and the external programs via the communication network, and manage the information. The devices having the other elements distributed on the communication network can also register or refer to the correspondence relation information in the same way in the system.

Next, a description is given to embodiments of the element I 129, which edits and manages a processing method and form layout information.

The element I 129 reads a paper document, converts recognized written information based on a layout defined by the paper document and processing information, and stores the conversion results in an information table described below.

FIG. 55 is a view of an example of a paper document (that is, a form). Shown in FIG. 55 is a filled-out registration form for entrance to or resignation from a club. This registration form may be the registration form 47 shown in FIG. 11B.

The registration form in FIG. 55 includes an input field A 170, an input field B 171, an input field C 172, an input field D 173, and an input field E 174. The registration form also includes a name label 175, a membership number label, a request label, and a comment label.

FIG. 56 is a view of an information table.

The information table stores registration information and processing information. The registration information includes IDs, names, and membership numbers. The processing information includes names, membership numbers, processing, and comments.

In other words, the information written down on the registration form is stored in the information table.

The information provided in the field A 170, field B 171, and field E 174 of the registration form is stored in columns of "name", "membership number", and "comment", respectively, of the information table shown in FIG. 56. The information provided in the field C 172 and field D 173 of the registration form is stored in items of "deletion" or "registration" depending on the check mark placed in the registration form.

Next, a description is given to a form creation program. In the following description, a file that defines a processing method and form layout information is called "form definition entity", and software that edits the form definition entity is called a form creation program.

Below, the system shown in FIG. 1 is used as the apparatus relevant to the form creation program.

The form creation program is executed on the computer 101 that prepares paper forms, and a database program is running on the data server 106. The database program controls input and output of the form definition entity generated by the form creation program, and carries out input and output of the information table used in form processing.

The form creation program defines a method of processing a form and layout information of a form, as illustrated in FIG. 55, as a form structure entity, and creates contents of the form definition entity.

FIG. 57 is a view showing a form structure entity.

The form structure entity shown in FIG. 57 divides the input field A 170 into sessions by meaning of properties, for example, it uses an element label <Layout> to manage the layout information of the form, an element label <Input> to manage recognition information, and an element label <Registration> to manage the storage address, and the contents of these labels are described by properties of XML.

Figure 58:
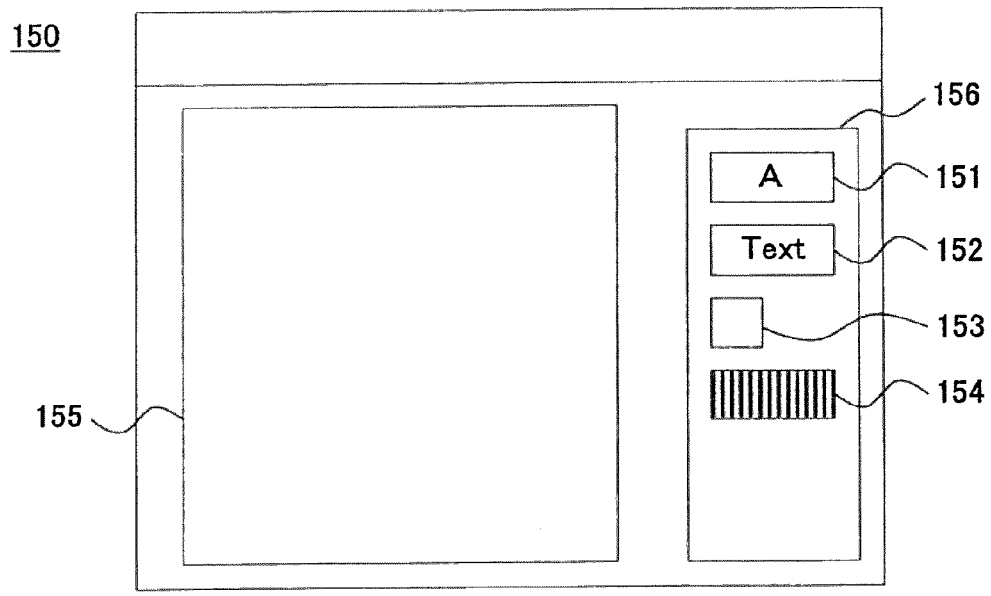
FIG. 58 is view for schematically showing an interface of the form creation program.

FIG. 58 is view for schematically showing an interface of the form creation program.

As illustrated in FIG. 58, the form creation program has a GUI (Graphical User Interface). This GUI includes a layout area 155, and a tool box 156. The tool box 156 includes a label tool 151, a text box 152, a check box 153, and a bar code 154.

A person who desires to create a form uses the tool box 156 to arrange labels and text boxes in the layout area 155, thereby creating a form.

The label tool 151 creates labels in the layout area 155, the text box 152 creates text boxes in the layout area 155, the check box 153 creates check boxes in the layout area 155, and the bar code 154 creates a bar code in the layout area 155.

In this way, contents corresponding to the components of the tool box 156 are arranged in the layout area 155, and their properties are set on the screen. Here, by "content", it means those objects arranged by the label tool 151, the text box 152, the check box 153, and the bar code 154.

Figure 59:
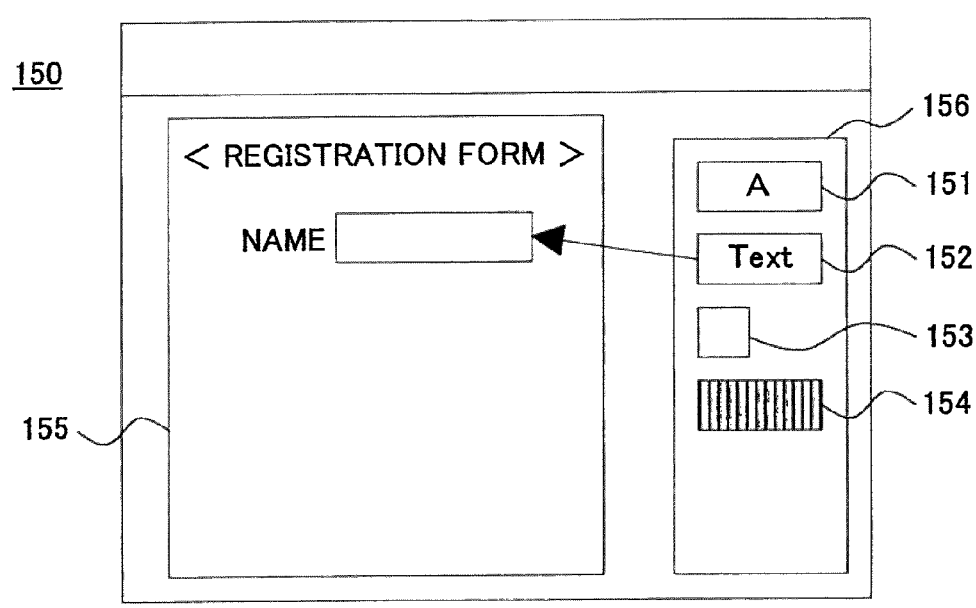
FIG. 59 is view for schematically showing creation of a field for inputting a name by using the text box 152.

FIG. 59 is view for schematically showing creation of a field for inputting a name by using the text box 152.

FIG. 60 is a view of a table including groups of properties of contents. These properties define the actual contents of the form and the methods of processing them.

FIG. 60 shows an example of properties corresponding to the name label 175 and the input field A 170 shown in FIG. 55. The properties are roughly classified into layout information 176 (from "content beginning" to "border"), recognition information 177 (from "input" to "recognition result"), and storage address information 178 (from "registered server" to "registered record").

The layout information 176 controls positions and sizes of contents, and state of characters and frame lines displayed there. The recognition information 177, when processing a form, controls the method for converting hand written information written in the input fields to data, and includes information used for character recognition.

The storage address information 178 controls storage address of conversion results by the recognition information 177 used when processing a form.

In FIG. 60, for example, for the content having an ID=0001, since its "type" is "Label", this is a label. Since "character" of this label is "Name", and "border" is "No", this label displays the character "Name" without a border. Since "Input" of this label is "disabled", no special processing is performed when the label is filled out. Since "Conversion" of this label is "No", no conversion is performed on the input characters. Since the storage address information 178 is empty, there are no data to be saved.

For the content having an ID=0002, its "type" is "Textbox", so this is a textbox. Since "character" of this textbox is empty, there is no character displayed. Since "border" of the textbox is "enclosing", this textbox displays an enclosing frame line. Since "Input" of this textbox is "enabled", some kind of special processing is performed for converting the characters displayed by "recognition information 1" to "recognition information 3", that is, "Japanese", "handwriting", and "Name". The recognized results are stored at places described in the storage address information 178.

As described above, by providing the form structure entity with such properties, the form layout information and processing method are defined.

Next, a description is given to embodiments of the element J 130, which decomposes the hand-written information into data based on form layout information and the processing method, and stores the decomposed hand-written data.

Figure 61:
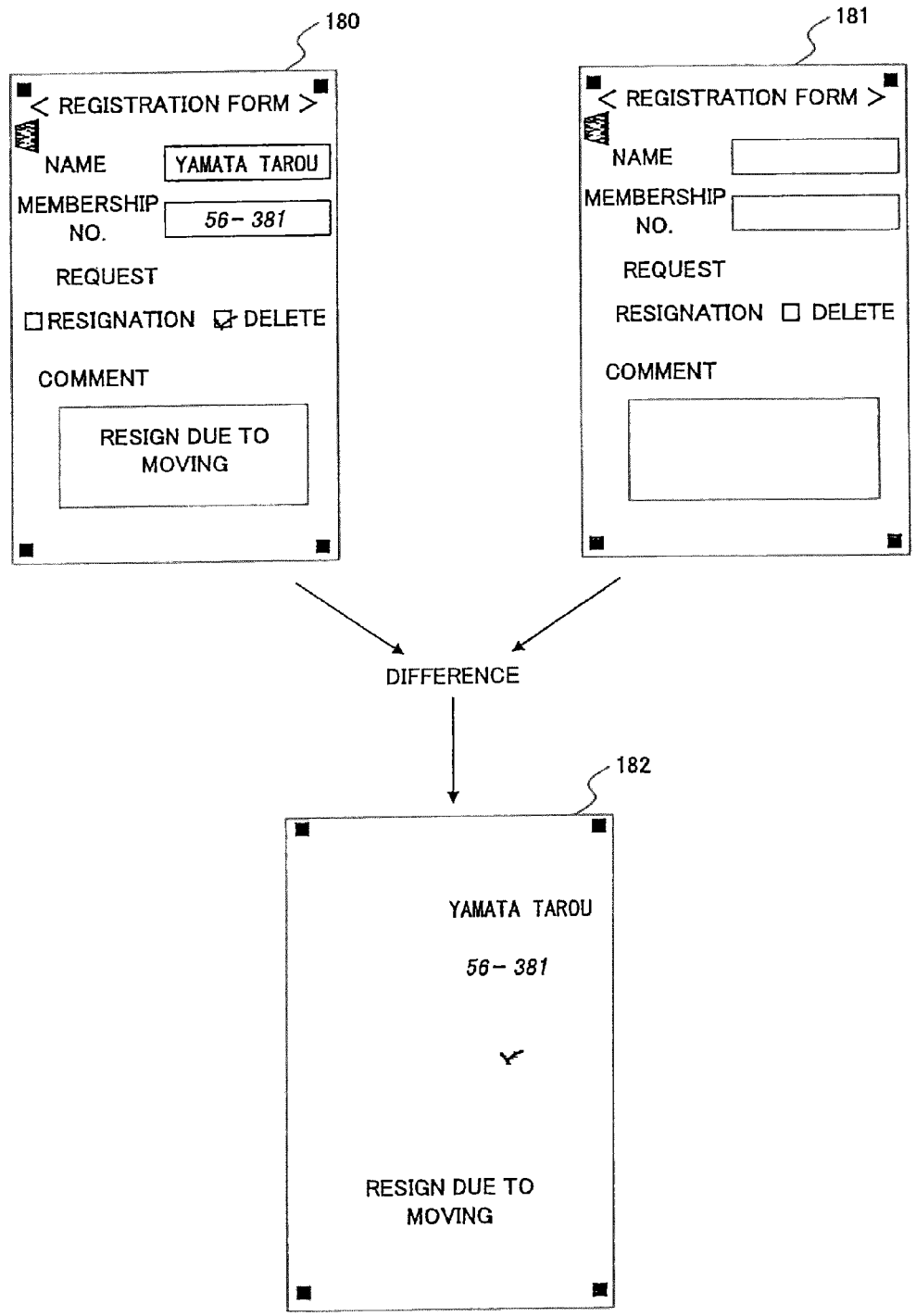
FIG. 61 is a view for schematically showing decomposition of hand-written information into data.

FIG. 61 is a view for schematically showing decomposition of hand-written information into data.

When a scanner is used as the element D 124, with the registration form for entrance to or resignation from a club in FIG. 61 as an example, the element J 130 compares the captured image 180 of the filled-out registration form and the image 181 of the unfilled-out registration form, and thereby obtains an image of the hand-written portion, which corresponds to a difference between the image 180 and the image 181. The element J 130 then decomposes the hand-written portion into name, membership and other contents and stores these contents.

When a coordinate input device is used as the element D 124, coordinates of the hand-written portion, that is, the hand-written information, can be obtained directly, and the element J 130 decomposes the hand-written portion into name, membership and other contents and stores these contents.

When processing an unfixed-format document, because the concept "format" is not used in this case, decomposition is not performed, but the document is stored as a whole.

When a scanner is used as the element D 124, as described above, the image of a filled-out form and the image of the unfilled-out form are compared to obtain a difference between the images to extract the hand-written portion.

When a coordinate input device is used as the element D 124, the hand-written information can be obtained directly.

Figure 62:
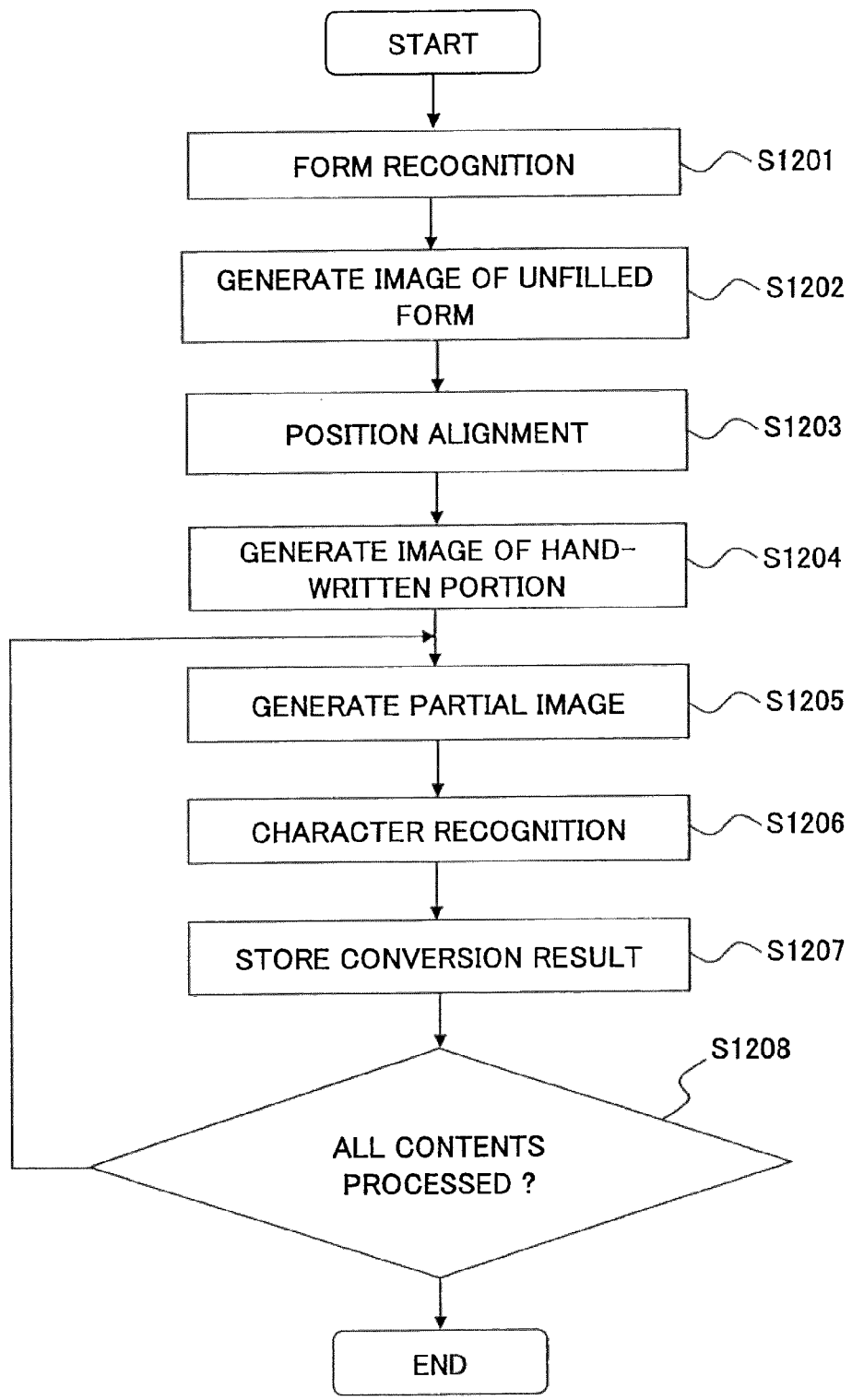
FIG. 62 is a flowchart showing the operation of decomposing hand-written information written down on a form into data.

FIG. 62 is a flowchart showing the operation of decomposing hand-written information written down on a form into data and storing the decomposed hand-written data.

In step S1201, the form is recognized.

In step S1202, an image of the unfilled-out form is generated. In this step, the image of the unfilled-out form is generated from the form definition entity called in the step 1201.

In step S1203, positions of the images of the unfilled-out form and the filled-out form are aligned. In this step, a timing mark is used to match the filled-out form with the unfilled-out form. The position and shape of the timing mark are obtained from the form definition entity.

If the timing mark does not exist, this step can be omitted.

In step S1204, an image of the hand-written portion is generated. In this step, the image of the filled-out form and the image of the unfilled-out form are compared, and the difference between the two images is obtained to extract the hand-written portion.

Step S1205 through step S1208 are performed for each content unit shown by the form definition entity.

In step S1205, partial images corresponding to the contents are generated. This step is carried out according to the properties of the content (layout information). For example, images of the contents "Yamata Tarou", "56-381" in FIG. 61 are generated.

In step S1206, character recognition is performed for each partial image. This step is carried out according to the properties of the contents (recognition information).

In step S1207, after character recognition, each partial image is converted into characters, and the obtained characters are stored.

In step S1208, it is determined whether all contents are processed. If un-processed contents exist, the routine goes to step S1205 to repeat the above steps. If all contents have been processed, the routine is finished.

Next, a description is given to embodiments of the element K 131, which converts the paper ID to the document ID and the process ID.

Figure 63:
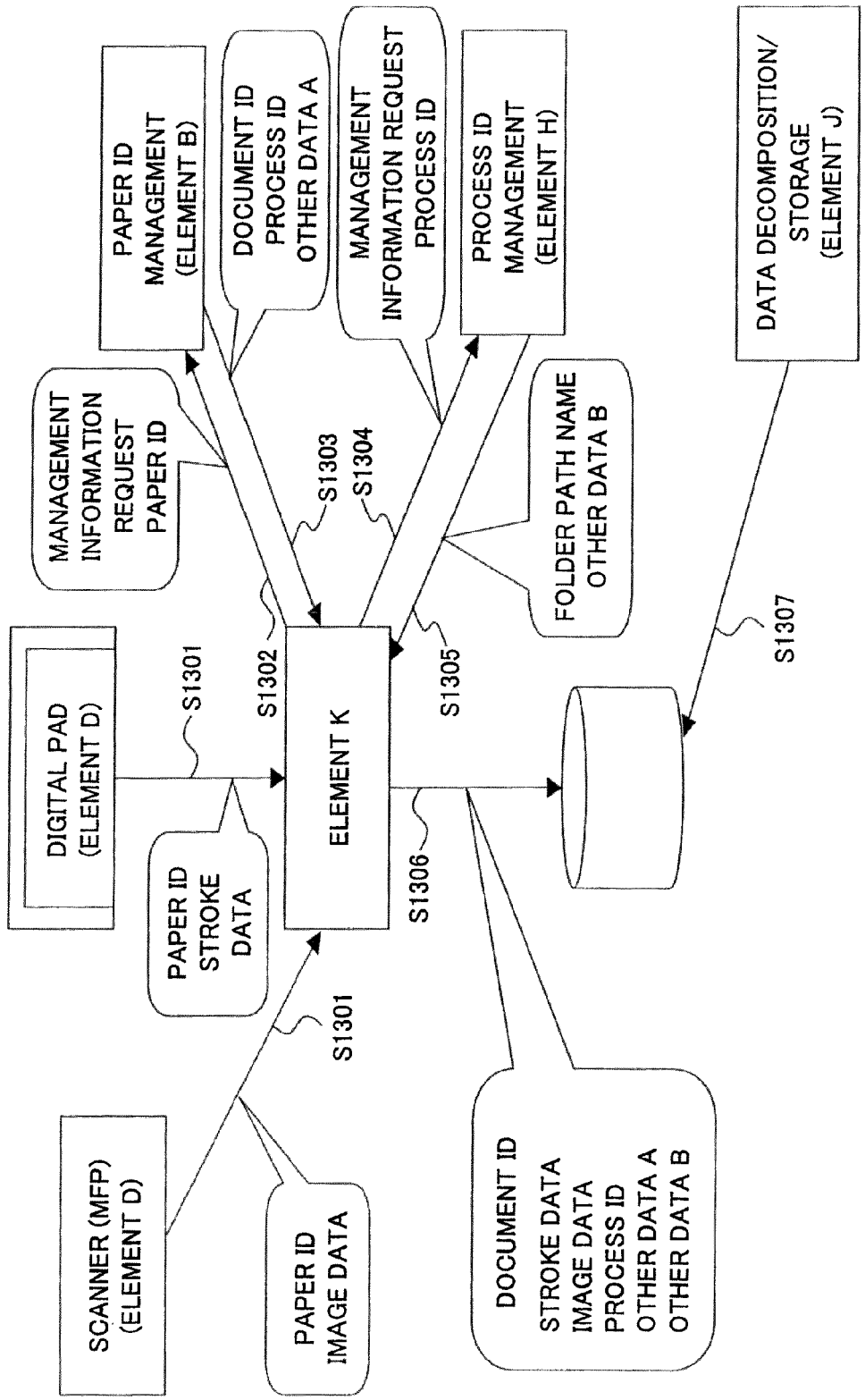
FIG. 63 is block diagram of the relation between the element K 131 with other elements.

FIG. 63 is block diagram of the relation between the element K 131 and other elements, showing the operation of the element K 131 for converting the paper ID to the document ID and the process ID.

As illustrated in FIG. 63, with the element K 131 at the center, the rectangles represent the elements A through L, the blowouts represent data or contents of requests, the arrows indicate the directions of the flow of the data or the requests, and the step numbers indicate the sequence.

In step S1301, the element K 131 acquires the paper ID and the written information from the D-PAD. Alternatively, the element K 131 uses the scanner or the scanner of a MFP to read a paper document that is hand written to acquire an image of the paper ID.

In step S1302, the element K 131 sends the paper ID to the element B 122, and requests management information related to the paper document.

In step S1303, the element K 131 obtains the process ID or the information for uniquely specifying the electronic document corresponding to the paper document. The step S1303 corresponds to the step of "associating the process ID with a program" as defined in the claims.

In step S1304, the element K 131 sends the process ID to the element H 128, and requests management information on the program for processing the paper document.

In step S1305, the element K 131 obtains the information for uniquely specifying a folder path name which is registered by using an identifier corresponding to the element H 128.

In step S1306, the element K 131 stores all information into a file, and stores the file in the folder specified by the folder path name obtained in step S1306. Here, the element K 131 stores in the file all information obtained by using an image input device, such as the D-PAD, or the scanner or the scanner of a MFP, through the element B 122 and the element H 128.

In step S1307, the routine proceeds to the next operation in which the element K 131 transmits jobs to the element J, which decomposes the hand-written information into data based on form layout information and processing methods and stores the decomposed hand-written data, or to a unfixed-format document processing program.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

What is claimed is:

1. A document processing system for processing a hand-written first document on a sheet, said document processing system comprising:
 an encoding unit configured to encode a sheet ID for identifying the first document to generate a coded sheet ID;
 a decoding unit configured to decode the coded sheet ID;
 a document-sheet ID association unit configured to associate the sheet ID with a document ID assigned to a computerized second document;
 a printing unit configured to acquire the sheet ID and print the coded sheet ID on the first document;
 a sheet ID management unit configured to manage the sheet ID;
 an information acquisition unit configured to acquire the sheet ID decoded by the decoding unit, and hand-written data from the first document on which the coded sheet ID is printed; and
 a process-sheet ID association unit configured to associate the sheet ID with a process ID of a process for processing the hand-written data acquired by the information acquisition unit.

2. The document processing system as claimed in claim 1, wherein the printing unit comprises a printing service unit that prints the first document based on the second document, wherein the printing service unit includes:
 a first unit that acquires the sheet ID assigned to the first document;
 a second unit that generates the coded sheet ID from the acquired sheet ID from the acquired sheet ID; and
 a third unit that superposes the coded sheet ID on the second document.

3. The document processing system as claimed in claim 1, wherein the printing unit includes:
 a first unit that acquires the sheet ID assigned to the first document;
 a second unit that sends the acquired sheet ID to the encoding unit to generate the coded sheet ID;
 a third unit that superposes the coded sheet ID on the second document; and
 a printing service unit that outputs the second document superposed with the coded sheet ID for printing the first document.

4. The document processing system as claimed in claim 1, wherein the printing unit comprises a printing service unit that prints the first document based on a printing image, wherein the printing service unit includes:
 a document conversion unit that converts the second document to the printing image;
 a first unit that acquires the sheet ID assigned to the first document;
 a second unit that sends the acquired sheet ID to the encoding unit to generate the coded sheet ID; and
 a third unit that superposes the coded sheet ID on the printing image.

5. The document processing system as claimed in claim 1, wherein the printing unit comprises:
 a document conversion unit that converts the second document to a printing image or a page description language sequence; and
 a printing service unit that prints the first document based on the printing image or the page description language sequence,
 wherein the printing service unit includes
 a first unit that acquires the sheet ID assigned to the first document;
 a second unit that sends the acquired sheet ID to the encoding unit to generate the coded sheet ID; and
 a third unit that superposes the coded sheet ID on the printing image.

6. The document processing system as claimed in claim 1, wherein the sheet ID management unit stores document-sheet ID association information in a non-volatile storage unit, said document-sheet ID association information being used for associating the second document with the sheet ID.

7. The document processing system as claimed in claim 6, wherein the document-sheet ID association information is accessible from a communication network.

8. The document processing system as claimed in claim 1, wherein the sheet ID management unit associates the second document with the sheet ID in response to a request transmitted from a communication network.

9. The document processing system as claimed in claim 8, wherein the sheet ID management unit associates a document title of the second document with the sheet ID.

10. The document processing system as claimed in claim 8, wherein the sheet ID management unit stores the second document associated with the sheet ID.

11. The document processing system as claimed in claim 1, wherein the information acquisition unit comprises:
an image pick-up unit that picks up an image of an object including the first document;
a driving unit that drives the image pick-up unit relative to the first document;
a control unit that controls the driving unit to divide the first document into a plurality of regions for image pick-up; and
a combination unit that combines images of the divided regions of the first document into one image.

12. The document processing system as claimed in claim 11, wherein the information acquisition unit comprises:
a sheet ID image pick-up unit that picks up an image of the coded sheet ID.

13. The document processing system as claimed in claim 1, wherein the information acquisition unit comprises:
an image pick-up unit that picks up an image of an object including the first document;
a driving unit that drives the image pick-up unit relative to the first document;
a detection unit that detects a position of the coded sheet ID on the object; and
a control unit that determines a position of the image pick-up unit so that the image pick-up unit is able to pick up an image of the coded sheet ID, and determines a magnification to be applied for picking up the image of the coded sheet ID;
wherein the image obtained by the image pick-up unit is associated with the sheet ID obtained from the image of the coded sheet ID.

14. The document processing system as claimed in claim 1, wherein the information acquisition unit comprises:
an image pick-up unit that picks up an image of an object including the first document; and
a sheet ID display unit provided in the object for displaying the coded sheet ID, said sheet ID display unit being storable and including the coded sheet ID.

15. The document processing system as claimed in claim 1, wherein the information acquisition unit comprises:
an image pick-up unit that picks up an image of an object including the first document; and
an optical projecting unit that optically projects the coded sheet ID so as to allow the image pick-up unit to pick up an image of the coded sheet ID.

16. The document processing system as claimed in claim 1, wherein the information acquisition unit comprises:
an image pick-up unit that picks up an image of an object including the first document; and
a display unit provided in the object for displaying an image of the coded sheet ID taken by the image pick-up unit.

17. A document processing system for processing a handwritten first document on a sheet, said document processing system comprising:
an encoding unit configured to encode a sheet ID for identifying the first document to generate a coded sheet ID;
a decoding unit configured to decode the coded sheet ID;
a document-sheet ID association unit configured to associate the sheet ID with a document ID assigned to a computerized second document;
a printing unit configured to acquire the sheet ID and print the coded sheet ID on the first document;
a sheet ID management unit configured to manage the sheet ID;
an information acquisition unit configured to acquire the sheet ID decoded by the decoding unit and hand-written data from the first document on which the coded sheet ID is printed;
a process-sheet ID association unit configured to associate the sheet ID with a process ID of a process for processing the hand-written data acquired by the information acquisition unit; and
an ID conversion unit configured to convert the sheet ID to the document ID and the process ID.

18. The document processing system as claimed in claim 17, wherein the information acquisition unit comprises:
an image pick-up unit that picks up an image of an object including the first document; and
a detection unit that detects a position of the coded sheet ID on the object;
wherein the sheet ID obtained from an image of the coded sheet ID taken by the image pick-up unit is associated with the document ID and the process ID by the ID conversion unit.

19. A document processing system for processing a handwritten first document on a sheet, said document processing system comprising:
an encoding unit configured to encode a sheet ID for identifying the first document to generate a coded sheet ID;
a decoding unit configured to decode the coded sheet ID;
a printing unit configured to acquire the sheet ID and print the coded sheet ID on the first document;
a document-sheet ID association unit configured to associate the sheet ID with a document ID assigned to a second document, said second document being a computerized document having a predetermined format;
a sheet ID management unit configured to manage the sheet ID;
an information acquisition unit configured to acquire the sheet ID decoded by the decoding unit and hand-written data from the first document on which the coded sheet ID is printed;
a process-sheet ID association unit configured to associate the sheet ID with a process ID of a process for processing the hand-written data acquired by the information acquisition unit;
a process ID management unit configured to manage the process ID; and
a decomposition storage unit configured to decompose the hand-written data acquired by the information acquisition unit based on layout information of the predetermined format and the process ID, and store the decomposed hand-written data.

20. The document processing system as claimed in claim 19, wherein the process ID management unit manages program-process ID association information that associates the process ID with a program for executing the process for processing the hand-written data.

21. The document processing system as claimed in claim 20, wherein the process ID management unit stores the program-process ID association information in a non-volatile storage unit.

22. The document processing system as claimed in claim 20, wherein the program-process ID association information is stored in a database accessible from a communication network.

23. The document processing system as claimed in claim 20, wherein the program-process ID association information includes information of a position of storing data to be processed by the program.

24. The document processing system as claimed in claim 20, wherein the program-process ID association information includes information of a position of a service to be provided by executing the program.

25. The document processing system as claimed in claim 20, wherein the process ID management unit associates the process ID with the program in response to a request transmitted from a communication network.

26. A document processing method for processing a hand-written first document on a sheet, said document processing method comprising the steps of:
    associating a sheet ID with a process ID, said sheet ID being used for identifying the first document, said process ID being used for indicating a process for processing hand-written data on the first document;
    associating the sheet ID with a document ID assigned to a computerized second document;
    assigning the sheet ID to the first document;
    encoding the sheet ID to generate a coded sheet ID; and
    acquiring the coded sheet ID and the hand-written data from the first document, the coded sheet ID being printed on the first document.

27. A document processing method for processing a hand-written first document on a sheet, said document processing method comprising the steps of:
    associating a sheet ID with a process ID, said sheet ID being used for identifying the first document, said process ID being used for indicating a process for processing hand-written data on the first document;
    associating the sheet ID with a document ID assigned to a computerized second document;
    associating the process ID with a program for executing the process for processing the hand-written data;
    assigning the sheet ID to the first document;
    encoding the sheet ID to generate a coded sheet ID;
    printing the first document with the coded sheet ID thereon;
    acquiring the coded sheet ID and the hand-written data from the first document, the coded sheet ID being printed on the first document; and
    converting the sheet ID to the document ID and the process ID.

28. A document processing method for processing a hand-written first document on a sheet, said document processing method comprising the steps of:
    associating a sheet ID with a process ID, said sheet ID being used for identifying the first document, said process ID being used for indicating a process for processing hand-written data on the first document;
    associating the sheet ID with a document ID assigned to a computerized second document having a predetermined format;
    assigning the sheet ID to the first document;
    encoding the sheet ID to generate a coded sheet ID;
    acquiring the coded sheet ID and the hand-written data from the first document, the coded sheet ID being printed on the first document; and
    decomposing the hand-written data based on layout information of the predetermined format and the process ID and storing the decomposed hand-written data.

29. A non-transitory computer-readable storage medium storing a program executable in a computer for processing a hand-written first document on a sheet, the program making the computer execute the steps of:
    associating a sheet ID with a process ID, said sheet ID being used for identifying the first document, said process ID being used for indicating a process for processing hand-written data on the first document;
    associating the sheet ID with a document ID assigned to a computerized second document;
    assigning the sheet ID to the first document;
    encoding the sheet ID to generate a coded sheet ID; and
    acquiring the coded sheet ID and the hand-written data from the first document, the coded sheet ID being printed on the first document.

30. A non-transitory computer-readable storage medium storing a program executable in a computer for processing a hand-written first document on a sheet, the program making the computer execute the steps of:
    associating a sheet ID with a process ID, said sheet ID being used for identifying the first document, said process ID being used for indicating a process for processing hand-written data on the first document;
    associating the sheet ID with a document ID assigned to a computerized second document;
    associating the process ID with a program for executing the process for processing the hand-written data;
    assigning the sheet ID to the first document;
    encoding the sheet ID to generate a coded sheet ID;
    printing the first document with the coded sheet ID thereon;
    acquiring the coded sheet ID and the hand-written data from the first document, the coded sheet ID being printed on the first document; and
    converting the sheet ID to the document ID and the process ID.

31. A non-transitory computer-readable storage medium storing a program executable in a computer for processing a hand-written first document on a sheet, the program making the computer execute the steps of:
    associating a sheet ID with a process ID, said sheet ID being used for identifying the first document, said process ID being used for indicating a process for processing hand-written data on the first document;
    associating the sheet ID with a document ID assigned to a computerized second document having a predetermined format;
    assigning the sheet ID to the first document;
    encoding the sheet ID to generate a coded sheet ID;
    acquiring the coded sheet ID and the hand-written data from the first document, the coded sheet ID being printed on the first document; and
    decomposing the hand-written data based on layout information of the predetermined format and the process ID and storing the decomposed hand-written data.

32. A document processing system for processing a hand-written first document on a sheet, said document processing system comprising:

a document-sheet ID association unit configured to associate a sheet ID for identifying the first document with a document ID assigned to a computerized second document; and a sheet ID management unit configured to manage the sheet ID based on document-sheet ID association information, said document-sheet ID association information being used for associating the second document with the sheet ID.

* * * * *